(12) United States Patent
Francoeur et al.

(10) Patent No.: US 9,484,140 B2
(45) Date of Patent: Nov. 1, 2016

(54) SYSTEM AND METHOD FOR TREATING AN AMORPHOUS METALLIC RIBBON

(75) Inventors: Bruno Francoeur, Beloeil (CA); Pierre Couture, Boucherville (CA)

(73) Assignee: HYDRO-QUEBEC, Montreal (CA)

( * ) Notice: Subject to any disclaimer, the term of this patent is extended or adjusted under 35 U.S.C. 154(b) by 493 days.

(21) Appl. No.: 13/510,942

(22) PCT Filed: Nov. 18, 2010

(86) PCT No.: PCT/CA2010/001844
§ 371 (c)(1),
(2), (4) Date: Oct. 5, 2012

(87) PCT Pub. No.: WO2011/060546
PCT Pub. Date: May 26, 2011

(65) Prior Publication Data
US 2013/0139929 A1 Jun. 6, 2013

Related U.S. Application Data

(60) Provisional application No. 61/262,603, filed on Nov. 19, 2009.

(51) Int. Cl.
*H01F 27/06* (2006.01)
*C21D 8/12* (2006.01)
*C21D 9/573* (2006.01)
*C22C 38/02* (2006.01)
(Continued)

(52) U.S. Cl.
CPC ............. *H01F 27/06* (2013.01); *C21D 8/0205* (2013.01); *C21D 8/125* (2013.01); *C21D 8/1272* (2013.01); *C21D 9/573* (2013.01); *C22C 38/02* (2013.01); *C22C 45/02* (2013.01); *F28D 21/00* (2013.01); *H01F 7/00* (2013.01); *H01F 27/00* (2013.01); *H01F 41/02* (2013.01); *H05B 6/105* (2013.01); *H05B 6/145* (2013.01); *C21D 2201/03* (2013.01); *F28D 11/02* (2013.01); *Y02P 10/253* (2015.11); *Y10T 29/49071* (2015.01); *Y10T 29/5187* (2015.01)

(58) Field of Classification Search
CPC ...... H01F 41/0226; H01F 27/06; H01F 7/00; H01F 27/00; C21D 8/0205; C21D 8/125; C21D 8/1272
USPC ........................................................ 148/561
See application file for complete search history.

(56) References Cited

U.S. PATENT DOCUMENTS 4,053,331 A 10/1977 Graham et al.
4,288,260 A 9/1981 Senno et al.
(Continued)

FOREIGN PATENT DOCUMENTS

CA 2279981 A1 8/1995
CN 101371321 A 2/2009

*Primary Examiner* — Alexander Polyansky
(74) *Attorney, Agent, or Firm* — Baker and Hostetler LLP

(57) ABSTRACT

A method and a system for continuously in-line annealing a forwarding ferromagnetic amorphous alloy ribbon in a curved shape to improve its magnetic properties without causing the ribbon to become brittle and which operates at significant high ribbon feeding rates. The amorphous alloy ribbon is fed forward, tensioned and guided along a path at a preset feeding rate and is heated at a point along the path at a rate greater than $10^{3\circ}$ C./sec to a temperature to initiate a thermal treatment. Then the ribbon is initially cooled at a rate greater than $10^{3\circ}$ C./sec until the thermal treatment ends. During the thermal treatment, a series of mechanical constraints is applied on the ribbon until the amorphous alloy ribbon adopts a specific shape at rest after the thermal treatment is ended. After the initial cooling, the amorphous alloy ribbon is subsequently cooled at a sufficient rate to a temperature that will preserve the specific shape.

6 Claims, 24 Drawing Sheets

(51) Int. Cl.
　　　*C22C 45/02*　　　(2006.01)
　　　*H01F 27/00*　　　(2006.01)
　　　*H01F 41/02*　　　(2006.01)
　　　*C21D 8/02*　　　(2006.01)
　　　*F28D 21/00*　　　(2006.01)
　　　*H01F 7/00*　　　(2006.01)
　　　*H05B 6/10*　　　(2006.01)
　　　*H05B 6/14*　　　(2006.01)
　　　*F28D 11/02*　　　(2006.01)

(56) References Cited

U.S. PATENT DOCUMENTS

| | | | | |
|---|---|---|---|---|
| 4,512,824 | A | * | 4/1985 | Taub .............................. 148/121 |
| 4,782,994 | A | * | 11/1988 | Raybould et al. .......... 228/235.3 |
| 4,995,919 | A | * | 2/1991 | Taub et al. .................... 148/561 |
| 5,069,428 | A | | 12/1991 | Li et al. |
| 5,495,037 | A | | 2/1996 | Leu |
| 5,568,125 | A | * | 10/1996 | Liu .............................. 340/551 |

* cited by examiner

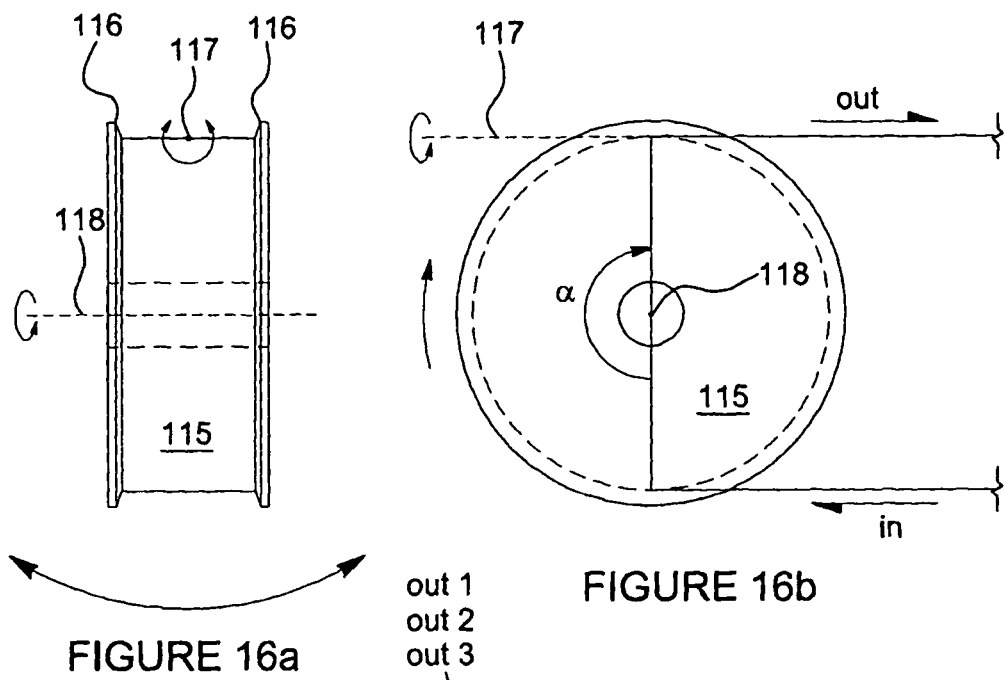
FIGURE 16a
FIGURE 16b
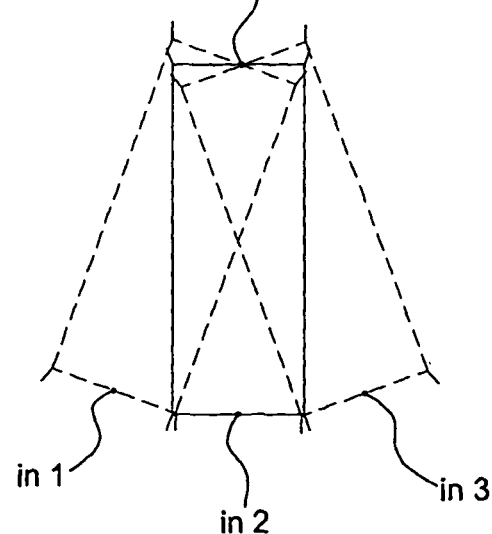
FIGURE 16c

SYSTEM AND METHOD FOR TREATING AN AMORPHOUS METALLIC RIBBON

CROSS-REFERENCE TO RELATED APPLICATIONS

This application is a National Stage of International Patent Application No. PCT/CA2010/001844, filed on Nov. 18, 2010, which claims priority to U.S. Patent Application No. 61/262,603, filed on Nov. 19, 2009, the contents of which are incorporated herein by reference in their entireties.

FIELD OF THE INVENTION

The present invention generally relates to amorphous materials. More particularly, it relates to a system and method for treating an amorphous alloy ribbon. More particularly, it also relates to a system and method for producing a magnetic core from a treated ductile amorphous alloy ribbon rolled up on a mandrel.

BACKGROUND OF THE INVENTION

Iron-based amorphous alloys are sought for their soft magnetic properties in applications such as the manufacturing of distribution transformer cores, pulse power cores, and other item. Iron-based alloys in this document are mainly iron alloyed with various small percentages of other metals. They are manufactured by continuous rapid solidification of a stream of molten alloy cast at speeds approaching 100 km per hour. With casting cooling rates on the order of $10^{6\circ}$ Celsius/second, the alloy atomic structure is solidified in a non-crystalline state (amorphous). With the proper atomic composition, amorphous alloy ribbons having excellent soft magnetic properties can be produced. Particularly, they offer: a high magnetic induction saturation level, herein referred as $B_{sat}$; a high permeability; a low coercive force; a low exciting power; and very low core loss. When designing distribution transformers, an alloy sheet candidate can be evaluated once it has been stacked or rolled up to form a core by considering the peak magnetic induction level B and associated core loss obtained at a peak applied AC magnetic field up to 80 A/m, herein referred as $B_{80}$. Properties obtained at values above this field, even if they are good, will require excessive exciting power thus, rendering the alloy less attractive. The magnetic properties of amorphous alloys when the ribbon is stacked or rolled up to form a core can also be evaluated by considering their $B_{80}/B_{sat}$ ratio. A $B_{80}/B_{sat}$ ratio close to 1 is sought for as it is indicative of an easy magnetization. A transformer produced with a magnetic core having a high $B_{80}$ will be smaller and will cost less. As a rule of thumb, an amorphous alloy, core having a $B_{80}$ greater than about 1.3 Tesla is worth considering for replacing conventional grain-oriented 3% silicon steels in the manufacturing of distribution transformers. Additionally, iron-based amorphous alloys produce about one third of the core loss of silicon steels. Also, a single step continuous casting method for producing an amorphous alloy ribbon has the advantage of being simpler and cheaper when compared to casting, annealing, quenching, rolling, decarburising and coating steps involved in producing a grain-oriented silicon steel sheet and which require larger equipments and more floor space. Iron-based amorphous alloys are the cheapest of all amorphous alloys because of the relative low cost for iron, its main constituent. With a rapid solidification process, the production of amorphous alloys is however limited to a very thin ribbon of various widths. More handling is therefore required to stack the increased number of layers when building the magnetic cores. Moreover, magnetic properties of amorphous alloys are highly sensitive to internal mechanical stresses. Core loss and exciting power deteriorate in presence of random stresses in the alloy. The origin of these stresses is either residual or applied. Residual stresses appear during ribbon casting, and applied stresses are produced from external forces imposed by bending or stacking the ribbon. These stresses must therefore be removed from the ribbon when it adopts a final configuration into a core or, at least accommodated to a certain extent. Stress removal from the amorphous alloy ribbon is generally accomplished by annealing the material in a furnace at an elevated temperature for a predetermined amount of time. Also, the useful magnetic properties of iron-based amorphous alloy ribbons are obtained if, during the annealing treatment, the alloy is subjected to a uniform magnetic field or a tensile stress in direction of the ribbon longitudinal axis. Field or stress annealing reduces coercive forces and induces uniaxial magnetic anisotropy. With field annealing, the resulting magnetic anisotropy is oriented parallel to the applied field while with stress annealing, it is either parallel or perpendicular depending on the alloy composition.

Field or stress annealing will increase the $B_{80}$ and $B_{80}/B_{sat}$ ratio. Furnace annealing of amorphous alloy cores with an applied magnetic field following the flux path is widely used to produce enhanced magnetic cores for distribution transformers. The ribbon is positioned within the core to have its longitudinal axis oriented following the circulating path of the induced magnetic flux.

When annealing an amorphous alloy, increasing the annealing temperature and annealing time will eventually lead to onset crystallization of its atomic structure and lost of their sought magnetic properties. Onset crystallization in amorphous alloys is a temperature-time-transformation (TTT) phenomenon. For example, the time to onset crystallization at core operating temperatures in distribution transformers must be well above the time life of the transformers. In an annealing treatment, time to onset crystallization will be influenced by the heating temperature rising rate, by the annealing temperature level and soaking time, and by the cooling temperature falling rate. High temperature heating and cooling rates combined with a short soaking time will allow use of a higher annealing temperature.

The amorphous alloy ribbon Metglas 2605SA1, from Hitachi-Metals, having a nominal chemistry $Fe_{80}B_{11}Si_9$, numbers being in atomic percent, is widely used in many applications including transformers and inductors at electrical AC frequencies of 50 and 60 Hz. This alloy has a $B_{sat}$ of 1.56 Tesla. When furnace annealed under an external applied magnetic field or tensile stress, the alloy will acquire an easy axis of magnetization parallel to the applied field or stress. When the ribbon is stacked or rolled up to form cores and then field annealed at 350° C. for two hours, the alloy has: a $B_{80}$ of 1.49 Tesla; a $B_{80}/B_{sat}$ ratio of 0.95; and the core loss is lower than 0.27 W/kg at 60 HZ at a magnetic induction of 1.3 Tesla. These values were reported by the alloy manufacturer in an article entitled "Audible Noise From Amorphous Metal and Silicon Steel-Based Transformer Core", in IEEE Transactions on Magnetics, vol. 44, no. 11, 4104-4106, and in an article entitled: "Advances in amorphous and nanocrystalline magnetic materials", published in Journal of Magnetism and Magnetic Materials, vol. 304, p. 187-191, 2006. Also, U.S. Pat. No. 5,873,954 teaches that, in order to benefit of such low core loss, the 2605SA1 alloy must be annealed under an applied magnetic field for two hours at a temperature between 330° C. and 380° C. as depicted in FIG. 2a. Minimal core loss is obtained at an annealing temperature between 350° C. to 360° C. Alternatively, the patent points to some references where improvements of magnetic properties of amorphous alloys were obtained by stress-annealing. However, the sample configuration for tensile stress annealing in the mentioned references has invariably been a flat strip. Therefore, the authors of the patent consider use of stress annealing in the production of amorphous alloy core transformers impracticable. Trying to furnace anneal the Metglas-SA1 alloy above 390° C. will lead to onset crystallization of the alloy and thereby, to deterioration of the magnetic properties as reported by Hsu et al. in an article entitled: "Effect of the annealing Temperature on Magnetic property for Transformer with Amorphous Core", Proceeding of the 2009 8$^{th}$ WSEAS International Conference on Instrumentation, Measurement, Circuit and Systems, page 171-175.

More recently in US patent application 2006/0180248, an iron-based amorphous alloy having a chemical composition $Fe_aB_bSi_cC_d$ where 80<a<84, 8<b<18, 0<c≤5 and 0<d≤3, numbers being in atomic percent, was identified. The alloy achieves a saturation magnetic induction greater than 1.60 Tesla wherein the alloy is heat-treated to be annealed at a temperature from 300° C. to 350° C. which is lower than the temperature required for the 2605SA1 material. Included in the chemical composition, the new Metglas 2605HB1 alloy ribbon from Hitachi-Metals, having a nominal chemistry $Fe_{81.8}B_{15.8}Si_{2.1}C_{0.3}$, has a $B_{sat}$ of 1.65 Tesla. When the ribbon is stacked or rolled up to form cores and then field annealed at 320° C. for one hour, the alloy has: a $B_{80}$ of 1.55 Tesla; a $B_{80}/B_{sat}$ ratio of 0.95; and the core loss is lower than 0.24 W/kg at 60 HZ at a magnetic induction of 1.3 Tesla, which is an improvement over the commercially available SA1 material. These values were reported by the alloy manufacturer in the articles cited above.

However, furnace annealing of most iron-based amorphous magnetic alloy ribbons undesirably affects the ribbon mechanical structure. The furnace annealing treatment weakens the alloy which becomes brittle and therefore complicates ribbon handling. Furthermore, amorphous alloy cores remain highly sensitive to external stresses after annealing. Care must therefore be taken to limit these stresses in order to keep the performances within an acceptable limit. Metglas 2605SA1 and 2605HB1 are known to embrittle following conventional field furnace annealing processes and their magnetic properties are very sensitive to applied stresses.

One known method for making a distribution transformer magnetic core with an amorphous alloy ribbon was disclosed by General Electric in many patents. U.S. Pat. Nos. 4,789,849, 5,050,294, 5,093,981 and 5,310,975 disclose steps involved in the making of amorphous alloy rectangular-wound-cut core distribution transformers which address all of the particularities related to amorphous alloys mentioned above. Basically, multiple amorphous ribbons are simultaneously unrolled from supply coils, piled and then rolled up again together to produce a master coil. Then, multiple master coils are unrolled and piled to form a composite strip which is forwarded, stopped and held stationary while it is cut by shear blades into segments of progressively reduced lengths which are successively stacked in appropriate staggered positions to produce a packet of composite strips. Multiple packets are then successively wrapped in piggyback on each other on a support frame. After sufficient numbers of packets have been wrapped, a conventional silicon steel sheet is wrapped around the formed core with both ends secured together. The frame is then removed and a second silicon steel sheet is affixed against the inner packet wall within the core window to prevent the core from collapsing internally. In the following step, the core is reformed into a rectangular shape with clamps and is secured in place with supporting members and straps, after which it is batch annealed in a furnace while applying an external magnetic field for a few hours. When annealing is completed, a coating is applied on the lateral edges of the core except in the region where the joints are located to secure the laminations together, and the strap and supporting members are removed. Finally, core lacing around the electrical coils is performed by manually opening the core to form a U-shape and by sliding the core through the window of preformed rectangular electrical coils and then re-forming the core into its rectangular shape by individually closing and jointing the expanded lapped sets. Because the core laminations get brittle from the annealing process, core lacing around the electrical coils must be achieved with great care to ensure that no broken fragments find their way into the electrical coils which could lead to short circuit failures. Overall, this known process for making a rectangular-wound-cut core distribution transformer from an amorphous alloy ribbon involves a great amount of discontinuous steps, which require a lot of time and floor space. Manufacturing of such rectangular-wound-cut core distribution transformer is realized at the distribution transformer manufacturing plant. This contributes significantly to increase transformer costs.

An alternative for producing a distribution transformer core with an amorphous alloy ribbon is disclosed by Allan et al. in U.S. Pat. No. 5,566,443. In this patent, a number of electric coils are preformed, each having a portion with a shape of a sector of a circle. The preformed coils are then assembled together so that their portions combine to form a circular limb and, in order to construct the magnetic core, a continuous thin amorphous alloy ribbon is rolled up on a circular hollow mandrel located around the circular limb to produce a circular core. Before being rolled up, the amorphous alloy ribbon has been previously annealed under magnetic saturation on a second circular mandrel having the same external diameter as for the circular hollow mandrel, thus requiring a transfer of the annealed ribbon between mandrels. It is believed that the power loss associated with the cuts in the above known cut core transformer is avoided. Rolling-up-after-annealing of an amorphous alloy ribbon will certainly introduce some stresses in the roll, which will introduce some additional core loss. However, it is believed that overall introduced stresses will be sufficiently small such that a worthwhile advantage is achieved in having an amorphous alloy circular-rolled-uncut core configuration. It is also believed that with a circular-rolled-uncut core transformer, all of the above-mentioned disadvantages associated with making a rectangular-wound-cut core transformer are avoided. Furthermore, the circular core provides a shorter mean path length for the magnetic flux which reduces the core and coils sizes and weight. Although this transformer is simpler to produce than a cut core transformer, numerous discontinuous steps are still involved in the making of the core, which are: rolling up to form a core; annealing the core in a furnace under magnetic saturation; unrolling and rolling up the ribbon again to form a core around a limb of the electrical coils. Also, direct transfer of the annealed amorphous alloy ribbon will introduce unnecessary bending stresses which will cause increased core loss as the ribbon is not rolled up again at the same layer position in the circular core (the first outer layer becomes first inner layer and vice versa). This can be overcome by transferring the ribbon on an intermediate mandrel first, as taught in U.S. Pat. No. 4,906,960 by Alexandrov but, this technique adds another step in the making of the core.

Rolling-up-after-annealing of amorphous alloy circular cores as described above, although simple in appearance, remains a difficult task. The fact that the alloy becomes brittle when annealed for a significant amount of time makes it less convenient when it needs to be rolled up again around a limb of the electrical coils. Silgailis et al. in U.S. Pat. No. 4,668,309 demonstrated in Table 2 of the patent that in each attempt to unroll and roll up again an iron-based amorphous alloy ribbon of a furnace annealed circular core weighting around 50 kg at speeds up to 0.3 meter per second, the ribbon broke more than 60 times. They also claimed in the disclosed invention that annealing the cores in a molten tin bath at a higher temperature for a shorter period of time does not degrade ductility as much as from conventional furnace annealing. Silgailis et al. showed in Table 2 that circular cores weighing around 18 kg and annealed by their method could be unrolled and rolled up again at a speed of 0.76 meter per second without breaking the ribbon more than 18 times. Even if Silgailis et al. were able to significantly reduce the number of breaks with their annealing method, it remains unacceptable. Encountering just one ribbon breakage during rolling up can eject tiny fragments that will be scattered all around the assembly line and that may end up within the electrical coils, which then requires a stop in production for clean-up and a decision on whether or not the coils should be scrapped. The task becomes more difficult when rolling up of the ribbon must be performed first on an intermediate mandrel. Annealing-after-rolling of the core around the coils could overcome the problem, but this would require use of high temperature insulating materials in the coils which would render the transformer cost-prohibitive. Rolling-up-after-annealing and annealing-after-rolling of amorphous alloy ribbon cores were both considered to produce large circular cores for a heavy ion fusion (HIF) driver. A HIF core must sustain a large flux swing in an extremely short amount of time which requires use of an inter-laminar insulation in the core. Even if rolling-up-after-annealing would avoid use of a high temperature insulating material, it was considered to be impractical due to the embrittlement of the ribbon and an annealing-after-rolling of a core incorporating a high temperature resistant insulation was rather adopted as reported in articles such as: "Induction Accelerator Development for Heavy Ion Fusion", L. L. Reginato, IEEE Proceedings of the 1993 *Particle Accelerator Conference*, vol. 1, p. 656-660, and: "Exciting New Coating For Amorphous Glass Pulse Cores", R. R. Wood, IEEE 1999 12$^{th}$ International *Pulsed Power Conference, vol.* 1, p. 393-396, and: "Induction Core Alloys for Heavy-ion Inertial Fusion-energy Accelerators", A. W. Molvik, The American Physical Society, Physical Review Special Topics—Accelerators and Beams, vol. 5, 080401, 2002. Production of circular core distribution transformers made with rolling-up-after-annealing of field furnace annealed amorphous alloy ribbon cores is impractical due to embrittlement of the alloy and therefore manufacturers are building field-furnace annealing rectangular-wound-cut core design as described above.

Thermal embrittlement of iron-based amorphous alloys induced by thermal annealing has been a recurring problem for a long time as recently stated by Kumar and al. in an article entitled: "Thermal embrittlement of Fe-based amorphous ribbons" published in 2008 in Journal of Non-Crystalline Solids, vol. 354, p. 882-888. Amorphous alloy ribbons show a ductile-to-brittle transition at a given temperature ($T_{db}°$) below which they are brittle and above which they are ductile as reported in an article entitled: "Absence of Thermal Embrittlement in some Fe—B and Fe—Si—B Alloys", A. R. Yavari, Materials Science and Engineering, vol. 98, p. 491-493, 1988. The fact that quenched iron-based amorphous alloy ribbons have a $T_{db}°$ lower than normal room temperature (20° C. to 25° C.) explains their ductility observed at normal room temperature. The degree of ductility at a given temperature can be estimated by observing at which bending radius the ribbon breaks or cracks, or by observing how the ribbon responds to shear cutting or tearing. An annealed ribbon having a high degree of ductility would alleviate the breaking problem and could be rolled up after annealing. Embrittlement of most iron-based amorphous alloy ribbons following thermal annealing is believed to be related to an increase of $T_{db}°$ associated to a temperature-time-transformation (TTT) dependent on the alloy composition. Keeping $T_{db}°$ below the handling temperature in order remain ductile is a target to achieve. Because the embrittlement an iron-based amorphous alloy is a TTT phenomenon during annealing, the degree of ductility of an annealed ribbon must therefore be evaluated once the core magnetic properties obtained following the annealing treatment are satisfactory or within expected results, otherwise the annealing treatment is incomplete and the degree of ductility is misleading. Shorter annealing times at higher annealing temperatures are believed to yield amorphous alloy ribbons with greater ductility. Silgailis and al. showed with their iron-based amorphous alloy ribbon cores annealed in molten tin at a higher temperature for a shorter time that brittleness could be reduced. However, there is a limit in trying to shorten the annealing time due to a limit in heat transfer capacity within the core. Higher heat transfer capacity becomes possible by heat treating a single forwarded ribbon in-line along a portion of its travelling path.

In-line annealing of amorphous alloy ribbon without thermal embrittlement has been explored. An understanding of the amorphous alloy, its annealing dynamics and its associated embrittlement has been proposed by Taub in an article entitled: "A New Method for Stress Relieving Amorphous Alloys to Improve Magnetic Properties", published in IEEE Transactions on Magnetics, vol. Mag-20, no. 4, July 1984, p 564-569°, and in U.S. Pat. No. 4,482,402. The document gives a general description on the nature of amorphous alloys, the way they are produced, the good magnetic properties of some classes of these alloys for application in distribution transformers and most importantly, discloses the necessity of stress relieving the material to benefit from its magnetic properties. According to Taub, mechanical stress relief in amorphous alloys is governed by flow and structural relaxation. Flow refers to homogeneous deformation in response to stress and structural relaxation is an atomic structure change towards an equilibrium configuration. Taub states in column 4, lines 9 to 15, "I have found that the competing material processes of flow and structural relaxation must be accounted for in order to optimize the development of soft magnetic properties in amorphous metals. Specifically, flow must be maximized and structural relaxation must be minimized. Once that state is obtained with the amorphous metal in its final shape, that state must be preserved."

A lower viscosity at an elevated temperature in an amorphous alloy provides a low flow resistance, which allows stresses to be relieved but, on the other hand, is believed to allow structural relaxation, which increases the viscosity with time at said temperature and therefore also increases the flow resistance as the atomic structure tends to adopt an equilibrium configuration. The temperature dependence below Tg° (glass transition temperature) of both the viscosity and the viscosity increase rate with time are believed to closely follow an Arrhenius law. The structural relaxation is considered as an unavoidable consequence of stress relief annealing, which is believed to be responsible for the embrittlement of the ribbon. Therefore, prior art suggests that it is desirable to stress relieve the amorphous alloy without allowing too much structural relaxation in order to have an annealed ductile ribbon. This would correspond to keep the resulting $T_{db}°$ increase below the ribbon's handling temperature.

Taub teaches that the only way to obtain benefits of minimized structural relaxation while stress relieving the alloy is to heat as rapidly as possible to a higher annealing temperature for a shorter time and to cool the alloy sufficiently rapidly from the annealing temperature to prevent any significant additional and detrimental structural relaxation. Taub also adds in column 10, lines 8 to 13, that: "It is essential that the ribbon not to be heated until after it has reached its final configuration; otherwise, structural relaxation will commence before all the winding stresses have been applied [ . . . ]". Structural relaxation is therefore believed to be a negative side effect of the amorphous alloy annealing process which can be minimized in rapid annealing conditions.

Taub disclosed a method and apparatus to perform in-line annealing on a forwarded ribbon of a predetermined shape. In his apparatus, a heat source, such as: heat beams; direct contact with a heating media; or resistance self-heating, heats a ribbon at a high temperature rising rate (more than 300° C./min) after it has attained its final configuration. The ribbon is then rapidly cooled (at least 100° C./min) by supplying a jet of cooling medium, such as air or an inert gas like nitrogen or streams of liquid quenchants, to the ribbon immediately after the ribbon exits the area of the heating region while still in its final configuration in order to freeze the as-annealed stress-free structure in the ribbon. The apparatus was tested on an iron-based amorphous alloy ribbon $Fe_{81.5}B_{14.5}Si_4$ which was then rolled up to form a core. For ribbon feeding rates up to a maximum of 26 cm/min (0.5 cm/sec), reported results show a core loss lower than 0.28 W/kg (0.13 W/lb) and an exciting power lower than 1.45 VA/kg (0.66 VA/lb) at an AC magnetic induction of 1.4 Tesla (14 kG) and a $B_{80}/B_{sat}$ ratio (equivalent in the document to $B_1/B_{100}$ using Oersted instead of Tesla) greater than 0.80. The reported $B_{80}/B_{sat}$ ratio is good considering the presence of some stresses in the roll. Above 26 cm/min (0.5 cm/sec), the magnetic properties get worse. Taub also reports achieving heating rates of 500° C./min. The resulting degree of brittleness or ductility of the iron-based amorphous alloy specimens annealed with this apparatus is not quantified.

Senno et al. in U.S. Pat. No. 4,288,260 claimed an apparatus for heat-treating an amorphous alloy ribbon continuously fed under a tensile stress at a predetermined speed in the range of 1 to 50 cm/sec with its surface sliding in contact against a stationary heating body or being pressed against the surface of a heating roller by an urging roller, which can be replaced by another heating roller, to enhance the magnetic properties and remove curlings of an amorphous alloy ribbon without causing any developments of brittleness of the ribbon. In the examples 1 to 6, Senno et al. disclose results showing magnetic improvements for ribbons of given atomic compositions that were passed over a heated stationary body at feeding rates between 3.5 cm/sec (1/v~0.28 sec/cm) and 9.1 cm/sec (1/v~011 sec/cm). Magnetic improvements are also disclosed in example 7 for a forwarded ribbon that has been pressed against the surface of a heating roller by another roller at a slower feeding rate of 1 cm/sec (1/v~1 sec/cm). This slower feeding rate is comprehensible as the pressed contact region between the two rollers is very small. No reference is made on using iron-based amorphous alloy compositions, as examples are shown only for cobalt-based alloys. No impacts on core loss, on exciting power, on the $B_{80}$, on the $B_{80}/B_{sat}$ ratio and on the degree of brittleness of an annealed iron-based amorphous alloy ribbon are quantified through experimental results. No comparison is made with the furnace annealing method. Based on FIG. 6, the heat treatment of the ribbon passed over a stationary heating body shows a deterioration of the coercive force with increase of ribbon speed above 10 cm/sec (1/v~0.1 sec/cm). Also, no details are disclosed on heating rates and no references are made about the cooling stage as the ribbon is simply collected on a take-up mandrel.

Gibbs discloses in UK patent application GB 2148751 a method by which a length of amorphous strip being rolled up onto a mandrel is simultaneously heated by a direct current passing through a portion of the strip that is approaching the mandrel. In this case, two spaced adjustable sliding contact electrodes (or one electrode and the mandrel) are used to supply the current. The strip is heated by joule losses from the flowing current and is either cooled before or after reaching the rolling point. However, no detailed information is disclosed on the configuration of the strip in the heat-treating and cooling zones other than optionally allowing the strip to cool on the mandrel. Gibbs only discloses reduced coercive forces measured on two non iron-based alloy samples forwarding respectively at 9 and 14 cm/sec and annealed with his method when compared to furnace annealing. There is no reference made on heating and cooling rates, to the core loss, the exciting power, the $B_{80}$, the $B_{80}/B_{sat}$ ratio, or the brittleness of the annealed ribbon.

Li et al. in the U.S. Pat. No. 5,069,428 disclose an annealing method by which an amorphous ribbon slowly forwarded is self-heated by applying an AC or pulsed high current through a ribbon passing between a pair of electrodes. The circulating current through the conducting resistance of the ribbon produces joule heating. The current is passed through the ribbon while being maintained in a predetermined configuration. For a curved ribbon, the ribbon is passed over an insulated roller, preferably made of ceramic, with a pair of spring-loaded electrode rollers pressing the ribbon respectively at the entry and exit point of the ribbon on the roller. In example 1, an iron-based amorphous alloy ribbon $Fe_{78}B_{13}Si_9$, alloy type 2605S2 known to have a $B_{sat}$ of 1.56 Tesla, annealed at a feeding rate of 0.3 cm/sec with this process shows an improvement of the magnetic induction from 0.85 to 1.27 Tesla (8.5 to 12.7 kG) under an applied magnetic field of 160 A/m (2 Oe) compared to an as-cast specimen. The annealing embrittlement of the tested specimen has a fracture strain between 0.9 and 1 by bending test compared to 7×10 to 5×10 for furnace annealed samples. The document does not specify if the magnetic properties measurements were performed on a core or on a single ribbon. However, the resulting core loss is not clearly disclosed and no reference is made on the exciting power. The iron-based samples annealed with this method has a $B_{80}$ only at about 1.0 Tesla as reported in FIG. 4 (1 Oe=80 A/m) which gives a low $B_{80}/B_{sat}$ ratio of 0.64. Also, no information is disclosed on the heating rates and on how the cooling is performed after treatment as the ribbon is simply collected onto a take-up mandrel. The authors claim a ribbon that can be annealed up to a feeding rate of 10 cm/sec with this method.

In French patent application FR 2673954, and in an article entitled "On the Optimization of Soft-Magnetic Properties of Metallic Glasses by Dynamic Current Annealing", IEEE Transaction on Magnetics, vol. 28, no. 4 1992, p. 1911-1916, Perron et al. disclosed a joule heating apparatus similar to Li et al. to anneal an amorphous alloy ribbon in a circular shape. The ribbon is passed over an insulated fixed drum or rotating roller, preferably made of quartz or alumina, with a pair of cooled copper electrodes contacting the ribbon respectively at the touching and separating point of the ribbon on the drum or roller. In addition to Li et al.'s method, the cooled electrodes are used as a cooling means to freeze the stress relieved ribbon before it separates from the drum or roller. In example 1, an iron-based amorphous alloy ribbon, alloy type 2605S2, annealed at a feeding rate of 1 cm/sec with this process shows an improvement of the magnetization curve compared to a furnace field annealed specimen as shown in FIG. 5 of the patent. The applied magnetic field is reduced to 10 A/m compared to 14 A/m at a measured magnetic induction of 1.0 Tesla. The document does not specify if the measurements were performed on a core or on a single ribbon. Perron et al. report an average heating and cooling rates of 70 C.°/second achieved with this apparatus. They claim that, with their invention, a ribbon could be annealed at speeds near 1 cm/sec. There is no reference made to the core loss, the exciting power, the $B_{80}$, the $B_{80}/B_{sat}$ ratio, or the brittleness of the annealed ribbon.

Waeckerle et al. in US patent application US2008/0196795 disclosed a ribbon annealing apparatus using an oven for heat treating a strip of an amorphous material to produce a nanocrystallized magnetic alloy of low permeability having sufficient reduced brittleness to carry out the rolling up of the strip to form cores without risk of breaking. The annealing process is carried out by forwarding the ribbon through a tunnel furnace in a flat position at a feeding rate greater or equal to 10 cm/sec and under a longitudinal tensile stress. Such heat treatment is intended for nanocrystallizing an amorphous alloy which is not sought for when the annealed amorphous ribbon must preserve its amorphous state once annealed. Also, no details are disclosed on heating rates and no references are made about the cooling stage as the ribbon is simply collected on a take-up mandrel.

If an in-line annealing apparatus was capable of annealing an iron-based amorphous alloy ribbon in a curved shape and to preserve its ductility then, the outputted ribbon could be efficiently rolled up to form a circular core around the coils of a transformer kernel such as the one disclosed by Allan et al. Using such an in-line annealing treatment would also avoid all the numerous discontinuous steps involved in making the core when using the furnace annealing method. However, this in-line annealing treatment must operate at a cost-effective ribbon feeding rate and the ribbon must acquire acceptable magnetic properties once the ribbon is rolled up to form a core. Even without considering the magnetic properties and the degree of ductility for all the in-line curved annealed amorphous ribbons of the above prior art documents, at annealing feeding rates in the 1 to 10 cm/sec range as mainly reported, a 22 cm wide and 25 µm thick ribbon (which is the widest size generally available for making conventional transformer cores) would be processed at a mass rate of 1.4 to 14 kg/hr (using the 7.2 g/cm³ material density of the Metglas 2605SA1 alloy). An average core size in a distribution transformer rated between 25 to 167 kVA weighs around 135 kg. At a mass rate of 1.4 to 14 kg/hr, this will take over 10 to 100 hours to in-line anneal the ribbon of a single transformer core. This feeding rate range is far too slow if one wants to render this process profitable. Too many annealing setups, labour and floor space would be required which increase costs. In order to be profitable, the ribbon feeding rate for a newly developed in-line annealing process must be significantly increased. Doing the treatment at a lower cost within an hour, which becomes more reasonable, requires a feeding rate above 1 m/sec, 10 to 100 times faster than the feeding rates reported above. To go beyond this rate, the heating and cooling temperature rates compared to those reported in the above methods must be greatly increased, and the annealing time must be shortened by further increasing the treatment temperature.

Performing annealing treatments in very short times on an amorphous ribbon have widely been reported in several scientific papers. Many experiments conducted on a ribbon segment have shown that the annealing time could be made much shorter. In these experiments, a ribbon specimen was generally placed between two electrodes, making contact at both ends, so that a high current pulse could be passed through the specimen using, for example, a discharge capacitor. Optionally, the experiment could be conducted in a liquid coolant for a quicker cooling. Using a suitable current density, very high heating rates can be obtained and, if followed with a rapid cooling, the annealing time can be reduced to a fraction of a second with the ribbon becoming less brittle than after conventional furnace annealing. Such experiment and results were reported by Kulik et al. in "Influence of Flash Annealing on the Magnetic Properties of a Co-based Alloy Glass", International Journal of Rapid Solidification, 1989, Vol. 4, 287-296, and by Matyja et al. in "Rapid heating of alloy glasses", Philosophical Magazine B, 1990, Vol. 61, No. 4, 701-713. These experiments use higher heating and cooling rates than those reported in the above prior art documents. However, the experiments were conducted on immobilized ribbon segments. Applying this method for continuously in-line annealing a forwarding ribbon is impracticable.

None of the prior art methods known to the Applicant teach a way to efficiently in-line anneal in a curved shape an iron-based amorphous alloy ribbon forwarded at a feeding rate greater than 1 m/sec and, none of them disclose circular cores made with said annealed ribbon which exhibit acceptable core loss and exciting power comparable to cores produced with conventional furnace field annealing and which have a $B_{80}$ greater than about 1.3 Tesla and a ratio $B_{80}/B_{sat}$ greater than 0.80 while remaining ductile for allowing efficient rolling-up-after-annealing.

SUMMARY OF THE INVENTION

Accordingly, it is an object of the present invention to provide methods and apparatus to overcome at least one drawback of the prior art.

According to the present invention, there is provided a method for treating an amorphous alloy ribbon, comprising steps of:

a) feeding forward, tensioning and guiding the amorphous alloy ribbon along a path at a preset feeding rate;

b) heating the amorphous alloy ribbon at a point along said path at a rate greater than $10^{3°}$ C./sec to a temperature to initiate a thermal treatment;

c) cooling the amorphous alloy ribbon at a rate greater than $10^{3°}$ C./sec until the thermal treatment ends;

d) applying a series of mechanical constraints on the ribbon during said thermal treatment until the amorphous alloy ribbon adopts a specific shape at rest after said thermal treatment; and e) cooling the amorphous alloy ribbon at a rate to preserve said specific shape, after said thermal treatment.

Preferably, according to one preferred embodiment of the present invention, the thermal treatment is performed to maintain an amorphous state of the ribbon.

Preferably, according to another preferred embodiment of the present invention, the thermal treatment is performed to initiate crystallisation of the amorphous alloy ribbon.

Preferably, according to another preferred embodiment of the present invention, the thermal treatment is performed to obtain partial crystallisation of the amorphous alloy ribbon.

Preferably, according to another preferred embodiment of the present invention, the thermal treatment is performed to obtain full crystallisation of the amorphous alloy ribbon.

Preferably, the preset feeding rate is greater than 1 m/sec.

Preferably, in step b), the heating is done at a rate greater than $10^{4\circ}$ C. per second.

Preferably, in step c), the cooling is done at a rate greater than $10^{4\circ}$ C. per second.

Preferably, according to one preferred embodiment of the present invention, the thermal treatment is performed during a period of time that is less than one second.

Preferably, according to another preferred embodiment of the present invention, the thermal treatment is performed during a period of time that is less than one tenth of a second.

Preferably, step e) cools the amorphous alloy ribbon to a handling temperature above a temperature threshold $T_{db}^{\circ}$ to which a complete ductility of the amorphous alloy ribbon is obtained.

Preferably, the handling temperature is above ambient temperature and below said temperature to initiate the thermal treatment.

Preferably, in step b) the amorphous alloy ribbon is in contact with at least one first cylinder having a first cylindrical surface located along said path; step b) further comprises a step of tensioning the amorphous alloy ribbon with respect to the first cylindrical surface to obtain a first static contact between the amorphous alloy ribbon and the first cylindrical surface, the first static contact stretching over a first contact angle around the first cylindrical surface; step b) further comprises a step of maintaining said first cylindrical surface at a temperature greater or equal to said temperature to initiate the thermal treatment; in step c) the amorphous alloy ribbon is in contact with at least one second cylinder having a second cylindrical surface located along said path; step c) further comprises a step of tensioning the amorphous alloy ribbon with respect to the second cylindrical surface to obtain a second static contact between the amorphous alloy ribbon and the second cylindrical surface, the second static contact stretching over a second contact angle around the second cylindrical surface; and step c) further comprises a step of maintaining said second cylindrical surface at a temperature lower than said temperature to initiate the thermal treatment.

Preferably, in step d) the amorphous alloy ribbon is in contact with at least one third cylinder having a third cylindrical surface located along said path; step d) further comprises a step of tensioning the amorphous alloy ribbon with respect to the third cylindrical surface to obtain a third static contact between the amorphous alloy ribbon and the third cylindrical surface, the third static contact stretching over a third contact angle around the third cylindrical surface; and step d) further comprises a step of maintaining said third cylindrical surface at said temperature to initiate the thermal treatment.

Preferably, the step of tensioning the amorphous alloy ribbon with respect to the cylindrical surfaces is done at a tension in the range of 25 to 200 MPa.

More preferably, the step of tensioning the amorphous alloy ribbon with respect to the cylindrical surfaces is done at a tension in the range of 50 to 100 MPa.

Preferably, the step of tensioning the amorphous alloy ribbon is done to favour the development of a magnetic anisotropy in the ribbon.

Preferably, the amorphous alloy ribbon is in contact with at least one guide roller proximate a selected one of the first, second or third cylinders, said guide roller having a radius that is smaller than the selected cylinder and being positioned proximate both an initial contact point and a final contact point between the ribbon and the selected cylinder to maximize said contact angle of said selected cylinder.

Preferably, in step d) the specific shape is curved and the method further comprises an additional step of:

f) rolling up a specific amount of the amorphous alloy ribbon onto a mandrel to form a core having an inner radius and an outer radius, wherein said specific shape has a radius of curvature selected between said inner radius and said outer radius.

Preferably, in step d) the specific shape is flat and the method further comprises an additional step of:

f) cutting and stacking segments of the amorphous alloy ribbon.

Preferably, in step d) the mechanical constraints change to vary a radius of curvature of the specific shape of the amorphous alloy ribbon along a length thereof, and the method further comprises an additional step of:

f) rolling up said length of the amorphous alloy ribbon onto a mandrel to form a core.

Preferably, the method further comprises an additional step before step f) of:

i) coating at least one side of the amorphous alloy ribbon with a dielectric material.

Preferably, the dielectric material is an organic dielectric material.

Preferably, in step i) coating is performed by means of electrodepositing.

Preferably, step i) further comprises steps of applying a voltage on the amorphous alloy ribbon and feed forwarding the ribbon in an emulsion of organic polymers and de-ionized water for a period of time.

Preferably, the method further comprises an additional step before step f) of:

i) coating at least one side of the amorphous alloy ribbon with a binder.

Preferably, a tension is increased or reduced along the path of the amorphous alloy ribbon by a tensioning apparatus, said tensioning apparatus comprising:

at least one motor having a shaft;

a circular device coupled to the shaft of the motor, said circular device having a surface making a static contact with the ribbon over an angle, the surface having a static friction coefficient with respect to the ribbon; and a controller for controlling torque of said motor shaft to increase or reduce a tensile stress in the amorphous ribbon.

Preferably, the tensioning apparatus is located along said path to increase the tensile stress in the ribbon before thermal treatment is initiated.

Preferably, the tensioning apparatus is located along said path to reduce the tensile stress after said thermal treatment.

Preferably, the tensioning apparatus is located along said path for controlling the tensile stress in the ribbon during said thermal treatment.

Preferably, the ribbon being fed along the path is delivered to a target position on a structure by a guiding apparatus, said guiding apparatus comprising:
- a body;
- a guide roller mounted on the body, having a flat peripheral surface lined with lateral guides for supporting and guiding the ribbon, the guide roller having a receiving section for receiving the ribbon and a delivering section for delivering the ribbon at the target position; and
- a pivot for pivotably mounting the body to the structure, the pivot having a pivot axis tangentially aligned with the delivering section of the roller; in operation, the body pivots with respect to the structure by means of the pivot so that the receiving section of the roller receives the ribbon and accommodates translations thereof to deliver via said delivering section the ribbon at the target position.

Preferably, in step e) the amorphous alloy ribbon is in contact with a plurality of spaced apart cooling cylinders each having a cooling cylindrical surface located along said path; step e) further comprises a step of tensioning the amorphous alloy ribbon with respect to the cooling cylindrical surfaces to obtain a cooling static contact between the moving amorphous alloy ribbon and the cooling cylindrical surfaces, the cooling static contact stretching over respective contact angles around the cooling cylindrical surfaces; and step e) further comprises a step of maintaining said cooling cylindrical surfaces at a temperature lower than said temperature to initiate the thermal treatment.

According to the present invention, there is also provided an iron-based amorphous alloy cast as a ribbon, heat-treated by in-line annealing at a temperature without reaching onset crystallization with heating and cooling at temperature rates greater than $10^{3\circ}$ C./sec, preferably greater than $10^{4\circ}$ C./sec.

Preferably, when said ribbon is stacked or rolled up to form a core, its $B_{80}/B_{80}$ is greater than 0.80 after annealing.

Preferably, when said ribbon is stacked or rolled up to form a core, its $B_{80}$ is greater than about 1.3 Tesla after annealing.

Preferably, under this treatment, the ribbon is ductile at normal room temperature and completely ductile above a temperature greater than normal room temperature According to the present invention, there is also provided an iron-based amorphous alloy cast as a ribbon comprising a nominal chemical composition $Fe_{80}B_{11}Si_9$, numbers being in atomic percent, with incidental impurities, heat-treated by in-line annealing at a temperature above 450° C. without reaching onset crystallization with heating and cooling at temperature rates greater than $10^{3\circ}$ C./sec.

According to the present invention, there is also provided an iron-based amorphous alloy, comprising a nominal chemical composition $Fe_aB_bSi_cC_d$ where $80<a<84$, $8<b<18$, $0<c\leq5$ and $0<d\leq3$, numbers being in atomic percent, with incidental impurities, heat-treated by in-line annealing at a temperature above 425° C. without reaching onset crystallization with heating and cooling at temperature rates greater than $10^{3\circ}$ C./sec.

Preferably, under this treatment, the ribbon is ductile at normal room temperature and completely ductile at a temperature greater than 80° C.

Preferably, the iron-based amorphous alloy comprises a nominal chemical composition $Fe_{81.8}B_{15.8}Si_{2.1}C_{0.3}$, numbers being in atomic percent, with incidental impurities.

According to the present invention, there is also provided a heat exchange system for exchanging heat with an article comprising:
- a support structure;
- a heat exchanger ring element capable of being heated;
- a heat diffuser ring element having an outer surface to be in contact with said article, said heat diffuser ring element having an inner surface in contact with said heat exchanger ring element; and
- a frame structure supporting said heat exchanger ring element and said heat diffuser ring element, said frame structure being rotatably mounted on the support structure.

Preferably, the heat exchanger ring element is a resistive element capable of being in sliding rotatable contact with an electrical power source.

Preferably, according to another embodiment of the invention, the heat exchanger ring element is a resistive element further comprising an antenna for heating by magnetic induction the heat exchanger ring element.

Preferably, the heat exchange system further comprises a slotted structure integrally formed with the heat exchanger ring element and laterally surrounding said heat exchanger ring element, the slotted structure having slots extending transversally to the heat exchanger ring element.

Preferably, the heat exchanger ring element is made of stainless steel and the heat diffuser ring element is made of copper and mounted by electrodeposition on the heat exchanger ring element.

According to the present invention, there is also provided a system for treating an amorphous alloy ribbon, comprising:
- a moving device for feeding forward, tensioning and guiding the amorphous alloy ribbon along a path at a preset feeding rate;
- a heating system for heating the amorphous alloy ribbon at a point along said path at a rate greater than $10^{3\circ}$ C./sec to a temperature to initiate a thermal treatment;
- a first cooling system cooling the amorphous alloy ribbon at an initial rate greater than $10^{3\circ}$ C./sec until the thermal treatment ends;
- a mechanical constraint application device for applying a series of mechanical constraints on the ribbon during said thermal treatment until the amorphous alloy ribbon adopts a specific shape at rest after said thermal treatment; and
- a second cooling system for cooling the amorphous alloy ribbon at a rate to preserve said specific shape, after said thermal treatment.

Preferably, the preset feeding rate is greater than 1 m/sec.

Preferably, the heating system heats at a rate greater than $10^{4\circ}$ C. per second.

Preferably, the first cooling system cools at a rate greater than $10^{4\circ}$ C. per second.

Preferably, the second cooling system cools the amorphous alloy ribbon to a handling temperature above a temperature threshold $T_{db}°$ that is sufficient to obtain complete ductility of the amorphous alloy ribbon.

Preferably, the heating system comprises at least one first cylinder in contact with the amorphous alloy ribbon, said at least one first cylinder having a first cylindrical surface located along said path, the system further comprising a first tensioning apparatus for tensioning the amorphous alloy ribbon with respect to the first cylindrical surface to obtain a first static contact between the amorphous alloy ribbon and the first cylindrical surface, the first static contact stretching over a first contact angle around the first cylindrical surface, a temperature of said first cylindrical surface being maintained at a temperature greater or equal to said temperature to initiate the thermal treatment, the first cooling system comprises at least one second cylinder in contact with the amorphous alloy ribbon, said at least one second cylinder having a second cylindrical surface located along said path, the system further comprising a second tensioning apparatus for tensioning the amorphous alloy ribbon with respect to the second cylindrical surface to obtain a second static contact between the amorphous alloy ribbon and the second cylindrical surface, the second static contact stretching over a second contact angle around the second cylindrical surface, a temperature of said second cylindrical surface being maintained at a temperature lower than said temperature to initiate the thermal treatment.

Preferably, the mechanical constraint application device comprises in contact with the amorphous alloy ribbon, said at least one third cylinder having a third cylindrical surface located along said path, the system further comprising a third tensioning device for tensioning the amorphous alloy ribbon with respect to the third cylindrical surface to obtain a third static contact between the amorphous alloy ribbon and the third cylindrical surface, the third static contact stretching over a third contact angle around the third cylindrical surface, a temperature of said third cylindrical surface being maintained at said temperature to initiate the thermal treatment.

Preferably, the tensioning apparatuses tension the amorphous alloy ribbon with respect to the cylindrical surfaces at a tension in the range of 25 to 200 MPa.

More preferably, the tensioning apparatuses tension the amorphous alloy ribbon with respect to the cylindrical surfaces at a tension in the range of 50 to 100 MPa.

Preferably, wherein the tensioning apparatuses tension the amorphous alloy ribbon to favour the development of a magnetic anisotropy in the ribbon.

Preferably, the system further comprises at least one guide roller to which the amorphous alloy ribbon is in contact, proximate a selected one of the first, second or third cylinders, said guide roller having a radius that is smaller than the one of the selected cylinders and being positioned proximate both an initial contact point and a final contact point between the ribbon and the selected cylinder to maximize said contact angle of said selected cylinder.

Preferably, according to one embodiment of the present invention, the system further comprises a mandrel onto which a specific amount of the amorphous alloy ribbon is rolled up, said mandrel having an inner radius and an outer radius, said specific shape having a radius of curvature selected between said inner radius and said outer radius.

Preferably, according to another embodiment of the present invention, the system further comprises a cutter and stacking device for cutting and stacking segments of the amorphous alloy ribbon.

Preferably, according to one embodiment of the present invention, the mechanical constraint application device apply constraints to vary a radius of curvature of the specific shape of the amorphous alloy ribbon along a length thereof, and the system further comprises a mandrel onto which a specific amount of the amorphous alloy ribbon is rolled up.

Preferably, the system further comprises a coating system for coating at least one side of the amorphous alloy ribbon with a dielectric material.

Preferably, the dielectric material is an organic dielectric material.

Preferably, the coating system is an electrodepositing system.

Preferably, the system further comprises a voltage application device for applying a voltage on the amorphous alloy ribbon, and a bath system comprising an emulsion of organic polymers and de-ionized water through which the ribbon is fed forward for a period of time.

Preferably, the system further comprises a binder application system for coating at least one side of the amorphous alloy ribbon with a binder.

Preferably, the system further comprises a tensioning apparatus for increasing or reducing a tension in the amorphous alloy ribbon along the path, said tensioning apparatus comprising:
- at least one motor having a shaft;
- a circular coupled to the shaft of the motor, said circular device having a surface making a static contact with the ribbon over an angle, the surface having a static friction coefficient with respect to the ribbon; and
- a controller for controlling torque of said motor shaft to increase or reduce a tensile stress in the amorphous ribbon.

Preferably, the second cooling system comprises a plurality of spaced apart cooling cylinders in contact with the amorphous alloy ribbon, said spaced apart cooling cylinders each having a cooling cylindrical surface located along said path, the system further comprising a tensioning system for tensioning the amorphous alloy ribbon with respect to the cooling cylindrical surfaces to obtain a cooling static contact between the moving amorphous alloy ribbon and the cooling cylindrical surfaces, the cooling static contact stretching over respective contact angles around the cooling cylindrical surfaces, a temperature of said cooling cylindrical surfaces being maintained at a temperature lower than said temperature to initiate the thermal treatment.

A non-restrictive description of a preferred embodiment of the invention will now be given with reference to the appended drawings.

BRIEF DESCRIPTION OF THE DRAWINGS

FIG. 15b is a perspective view of some elements comprised in the hollow portion of the cold roller shown in FIG. 15a;

FIG. 16 is a schematic view of a system to deliver a ribbon at a precise location on a guiding roller according to a preferred embodiment of the present invention;

PREFERRED EMBODIMENTS OF THE PRESENT INVENTION

Figure 1:
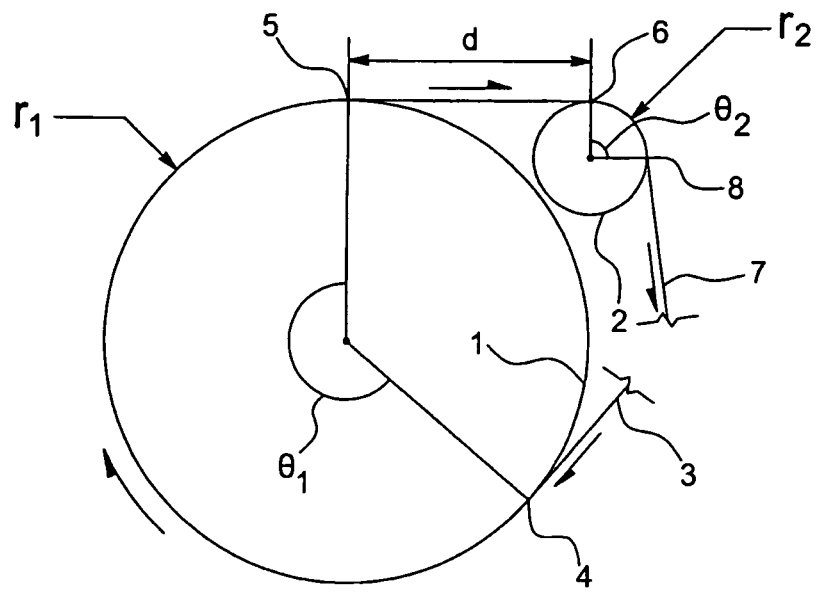
FIG. 1 is a schematic view of a system for in-line annealing an amorphous alloy ribbon in a curved shape by forwarding the ribbon over a hot and then over a cold roller, in accordance with a preferred embodiment of the present invention.

Different preferred objects of the present invention will now be presented.

It is an object of the present invention to provide an in-line annealing method and apparatus for heat treating an amorphous alloy ribbon at high ribbon heating and cooling rates.

It is another object of the present invention to provide an in-line annealing method and apparatus for heat treating an amorphous alloy ribbon to adopt a specific shape at rest after the thermal treatment.

Preferably, is another object of the present invention to provide a curved annealed and ductile iron-based amorphous alloy ribbon that can be used to manufacture circular magnetic cores at low cost.

Preferably, it is another object of the present invention to provide a low cost process for in-line annealing an amorphous alloy ribbon.

Preferably, it is another object of the present invention to provide a process for in-line annealing an amorphous alloy ribbon which is compact.

Preferably, it is another object of the present invention to provide a process for in-line annealing an amorphous alloy ribbon which operates at high ribbon feeding rates.

Preferably, it is another object of the present invention to provide a flat annealed and ductile iron-based amorphous alloy ribbon that can be used to manufacture stacked magnetic cores at low cost.

Preferably, it is another object of the present invention to provide an in-line annealed an iron-based amorphous alloy ribbon which exhibit acceptable magnetic properties for manufacturing cores for distribution transformers, HIF, pulse power cores, and other items.

The present invention is based on the idea that it is not essential to heat, treat and cool a ferromagnetic amorphous alloy ribbon in the same shape as it will have after treatment in order to get a ribbon to have acceptable magnetic properties for making distribution transformers, HIF, pulse power cores, and other items. It is believed that an amorphous alloy ribbon can be in-line annealed with the ribbon following a series of different predetermined configurations while being forwarded along the treatment. This is done by controlling the flow sequence occurring in the alloy at the treatment temperature to ensure its progression towards a structural state where most of the residual stresses and applied bending stresses will be alleviated when the ribbon will be bent close to a final shape after treatment. With the apparatus of the present invention, an amorphous alloy ribbon is in-line annealing to adopt a desired final shape after treatment. In the present invention, the treatment temperature must be sufficiently high and must last sufficient long so that the obtained reduced viscosity will allow sufficient flow to occur along the series of imposed configurations in order to affect the resulting final shape after treatment. With the present invention, it is possible to provide a heat transfer rate much higher than the ones obtained with the above methods of the prior art. Preferably, a high heat transfer rate is provided by using a prolonged direct static contact between one of the two side surfaces of the forwarded ribbon and along a significant peripheral portion of a thermally conductive circular rotating body (a static contact is referred in this document to a non-slipping direct mechanical contact between two surfaces). Using higher heat transfer rates for heating and cooling will improve the ribbon temperature rising or falling rate. With the present invention, it is possible to heat or cool a 20 to 30 μm thick metal ribbon at a temperature rising or falling rate greater than $10^3$ C/seconds, and preferably, in certain cases, even greater than $10^4$ C/seconds. With the present invention, cooling is subdivided in two consecutive stages: There is a first stage cooling operating at a high temperature falling rate, which will serve to quickly bring the ribbon temperature sufficiently below the treatment temperature, in order to sufficiently slow flow and structural relaxation and therefore stopping the thermal treatment. The first stage is followed by second stage cooling at a sufficient temperature falling rate which will serve to bring down the ribbon temperature to a point where the ribbon structural state at the end of the thermal treatment will be preserved. Preferably, after first stage cooling, flow and structural relaxation are slowed to a point where no significant structural change will further occur to the alloy due to the ribbon handling occurring in the second stage cooling. With the present invention, according to preferred embodiments, it is possible to limit structural relaxation in the in-line annealing treatment to get a ductile ribbon. With the present invention, according to preferred embodiments, it is possible to in-line anneal an iron-based amorphous alloy ribbon at a treatment temperature above conventional furnace annealing temperatures without reaching onset crystallization. With the present invention, it is possible to use stress annealing in the production of amorphous alloy cores usable to manufacture cores for distribution transformers, HIF, pulse power cores, and other items. With the present invention, according to preferred embodiments, it is possible to continuously in-line anneal a forwarding ribbon in a period less than a second, preferably less than one tenth of a second, to limit structural relaxation and therefore to get a ductile ribbon. With the present invention, according to preferred embodiments, it is also possible to in-line anneal an amorphous ferromagnetic alloy ribbon at feeding rates greater than 1 m/sec, even at feeding rates greater than about 5 m/sec, even in the $10^1$ m/sec rate range, therefore allowing a high mass production rate of annealed ribbon material for making rolling-up-after-annealing cores. With the present invention, according to preferred embodiments, the size of the in-line annealing apparatus is small and requires minimal floor space, which significantly contributes to reduce costs. With the present invention, according to preferred embodiments, it is possible to produce rolling-up-after-annealing cores that exhibit lower core loss compared to conventional annealing-after-rolling cores. With the present invention, according to preferred embodiments, it is possible to produce rolling-up-after-annealing cores that exhibit a $B_{80}$ greater than about 1.3 Tesla. With the present invention, according to preferred embodiments, it is possible to produce rolling-up-after-annealing cores that exhibit a $B_{80}/B_{sat}$ greater than 0.80. With the present invention, according to preferred embodiments, it is possible to in-line anneal an iron-based amorphous alloy ribbon which is cuttable after treatment, for allowing easy rolling-up-after-annealing. With the present invention, according to preferred embodiments, it is possible to in-line anneal an iron-based amorphous alloy ribbon which is foldable on at least one side after treatment. With the present invention, according to preferred embodiments, it is possible to in-line anneal an iron-based amorphous alloy which remains ductile after treatment. With the present invention, according to preferred embodiments, it is possible to in-line anneal an iron-based amorphous alloy which can be handled in a complete ductile state after treatment. With the present invention, according to preferred embodiments, it is possible to in-line anneal an iron-based amorphous alloy in a completely ductile state during the whole treatment process to minimize risk of breakage. With the present invention, according to preferred embodiments, it is possible to in-line anneal an iron-based amorphous alloy ribbon where $T_{db}°$ remains below the normal room temperature after treatment. With the present invention, according to preferred embodiments, it is possible to in-line anneal an iron-based amorphous alloy ribbon which can be punch, cut or torn, after treatment.

In the present invention, according to preferred embodiments, there is provided an iron-based amorphous alloy, when cast in a ribbon, such an amorphous alloy heat-treated by in-line annealing at temperatures without reaching onset crystallization with heating and cooling at temperature rates greater than $10^{3°}$ C./sec, preferably greater than $10^{4°}$ C./sec, has a $B_{80}/B_{sat}$ greater than 0.80 when the ribbon is stacked or rolled up to form a core. In addition, such an amorphous alloy is ductile at normal room temperature. In addition, such an amorphous alloy is completely ductile above a temperature slightly greater than normal room temperature.

In the present invention, according to preferred embodiments, there is provided an iron-based amorphous alloy having a nominal chemical composition $Fe_{80}B_{11}Si_9$, numbers being in atomic percent, with incidental impurities. When cast in a ribbon, such an amorphous alloy heat-treated by in-line annealing at temperatures above 450° C. without reaching onset crystallization with heating and cooling at temperature rates greater than $10^{3°}$ C./sec, preferably greater than $10^{4°}$ C./sec, has a $B_{80}/B_{sat}$ greater than 0.80 when the ribbon is stacked or rolled up to form a core. In addition, such an amorphous alloy is ductile at normal room temperature. In addition, such an amorphous alloy is completely ductile above a temperature slightly greater than normal room temperature, preferably above 100° C. In addition, such an amorphous alloy in a core has a $B_{80}$ greater than about 1.3 Tesla. In addition, such an amorphous alloy in a core has a core loss lower than 0.25 W/kg at 60 Hz at a magnetic induction of 1.3 Tesla.

In the present invention, according to preferred embodiments, there is provided an iron-based amorphous alloy having a chemical composition $Fe_aB_bSi_cC_d$ where 80<a<84, 8<b<18, 0<c≤5 and 0<d≤3, numbers being in atomic percent, with incidental impurities. When cast in a ribbon, such an amorphous alloy heat-treated by in-line annealing at temperatures above 425° C. without reaching onset crystallization with heating and cooling at temperature rates greater than $10^{3°}$ C./sec, preferably greater than $10^{4°}$ C./sec, has a $B_{80}/B_{sat}$ greater than 0.80 when the ribbon is stacked or rolled up to form a core. In addition, such an amorphous alloy is ductile at normal room temperature. In addition, such an amorphous alloy is completely ductile above a temperature slightly greater than normal room temperature, preferably above 80° C. In addition, such an amorphous alloy in the core has a $B_{80}$ greater than about 1.3 Tesla, even greater than about 1.4 Tesla, even greater than about 1.5 Tesla. In addition, such an amorphous alloy in the core has a core loss lower than 0.25 W/kg at 60 Hz at a magnetic induction of 1.5 Tesla.

In the present invention, according to preferred embodiments, there is provided an iron-based amorphous alloy having a nominal chemical composition $Fe_{81.8}B_{15.8}Si_{2.1}C_{0.3}$, numbers being in atomic percent, with incidental impurities. When cast in a ribbon, such an amorphous alloy heat-treated by in-line annealing at temperatures above 425° C. without reaching onset crystallization with heating and cooling at temperature rates greater than $10^{3°}$ C./sec, preferably greater than $10^{4°}$ C./sec, has a $B_{80}/B_{sat}$ greater than 0.80, preferably greater than 0.90, when the ribbon is stacked or rolled up to form a core. In addition, such an amorphous alloy is ductile at normal room temperature. In addition, such an amorphous alloy is completely ductile above a temperature slightly greater than normal room temperature, preferably above 80° C. In addition, such an amorphous alloy in the core has a $B_{80}$ greater than about 1.3 Tesla, even greater than about 1.4 Tesla, even greater than about 1.5 Tesla. In addition, such an amorphous alloy in the core has a core loss lower than 0.25 W/kg at 60 Hz at a magnetic induction of 1.5 Tesla.

Referring to FIG. 1, there is shown an apparatus for in-line annealing an amorphous alloy ribbon comprising: a hot roller 1 having an outer radius r1; a cold roller 2 having a smaller outer radius r2 and rotating in parallel and at a selected distance d from roller 1. The hot and cold rollers outer surfaces are constituted of a material having a thermal conductivity and a thermal inertia. The hot and cold rollers comprise a heat source and/or heat sink for controlling the heat flux entering in or exiting out from each roller. The flow of heat between the heat source and/or heat sink and a roller can be performed using a heat transfer fluid, or gas, circulating in contact with the thermally conductive inner surface of a sealed hollow roller and passing through the roller via entry and exit holes located in the center of the shaft. For heat flux entering in a roller, the heat transfer fluid, or gas, can be substituted by a flame from a burner or by an electrical heating element in contact with the thermal conductive inner surface of a hollow roller. The electrical heating element can be connected to an electrical power supply via sliding contacts provided on the roller shaft, or preferably, by using a fixed High frequency (HF) magnetic induction heating antenna located within the hollow portion of the roller and in close proximity to the inner roller surface which has an electrical conductivity, the HF magnetic induction antenna being connected to an HF electrical source through an opening in the roller shaft.

A thin amorphous alloy ribbon is fed at entry point 3 at a given ribbon feeding rate, a temperature $T_{in}°$ and under a first mechanical tensile stress S1 applied along the ribbon longitudinal axis. The ribbon is then guided through a selected path along which it will be subjected to a series of physical deformations and thermal treatments before leaving at exit point 7 at the same feeding rate, at a temperature $T_{out}°$ and under a second applied mechanical tensile stress S2. Preferably, the ribbon entering at point 3 shows little structural change compared to its as-cast state. The treatment sequence can be best described by selecting a segment of the ribbon located at entry point 3 and to follow the series of thermal and structural changes while moving along the travelled path. From point 3 and moving along, the ribbon first makes a static contact at point 4 on the outer surface of hot roller 1 where it bends to radius r1. From this point, the ribbon starts to heat up at a high temperature rising rate and is kept in contact with hot roller 1 for a given rotation angle $\theta_1$, up to point 5. While rotating along with hot roller 1 outer surface, the ribbon temperature goes up to a treatment temperature below or equal to the hot roller 1 outer surface temperature. At point 5, the hot ribbon breaks contact with hot roller 1 and goes through in a flat configuration and at the treatment temperature to point 6 located at a travel distance d from point 5 to make a second static contact with the outer surface of cold roller 2 parallel to roller 1 and, where it bends on the same side again to radius r2. From this point, the ribbon starts to cool down at a high temperature falling rate. The ribbon is kept in contact with cold roller 2 for a given rotating angle $\theta_2$ up to point 8. While rotating along on cold roller 2, the ribbon temperature goes down to a temperature $T_{out}°$ above or equal to the cold roller 2 outer surface temperature. After leaving cold roller 2, the ribbon is either taken-up on a mandrel and slowly cools down to normal room temperature or, is moved away for further cooling (for example: additional cold rollers) or processing before being rolled on a take-up mandrel.

The setup apparatus of FIG. 1 is best suited to continuously stress relieve a forwarding thin amorphous alloy ribbon to adopt a curved shape. Normally, the amorphous alloy ribbon will have a thickness up to 50 μm, more typically at about 20 to 30 μm. In the present invention, the post-process natural bending radius $r_a$ in a rest position at which the ribbon will show maximum alleviated stress is greater than radius r2 after treatment. In order to be so, the ribbon temperature must go up to a treatment temperature for a sufficient period of time in order to relieve the residual and applied bending stresses due to increased flow and to the presence of a tensile stress in the ribbon. The controlling of the flow sequence occurring in the alloy at the treatment temperature is controlled by the sequence of bending stresses imposed on the ribbon with rollers rotating in contact with the forwarded ribbon along the thermal treatment path. During treatment, the ribbon successively changes configuration from being bent to radius r1, then being flat and, being bent again on the same side to radius r2. A portion of the stress relieving is occurring on roller 1 when the treatment temperature is reached. The travel path from point 5 to point 6 on cold roller 2 is done in a flat configuration at the treatment temperature and an added unbending applied stress is getting relieved. Once point 6 reached, stress relief action of the reapplied bending stress imposed at a small radius r2 on the same bending side as on roller 1 is occurring while the ribbon's temperature is still near the treatment temperature during the initial portion of the first cooling stage. This way, the ribbon will regain a substantially alleviated stress condition when bent close to radius $r_a$ which is greater than r2. When leaving the roller at point 8, the first cooling stage is done and the ribbon temperature $T_{out}°$ has dropped sufficiently below the treatment temperature to allow further ribbon handling while continuing to cool down in the second cooling stage without provoking further significant detrimental stress relief. As the alloy's viscosity increases with the reciprocal of the temperature by closely following an Arrhenius law, a drop of a few tens of degrees from the treatment temperature is sufficient. Second stage cooling can be done when the ribbon is rolled on the take-up mandrel or preferably, using any additional cooling means such as additional cold rollers, or a cooling jet of gas, before being taken-up on a mandrel. The resulting natural bending radius $r_a$ in a rest position after treatment becomes a function of ribbon thickness and feeding rate, temperatures of rollers 1 and 2, radius r1 and r2, contacting angles $\theta_1$ and $\theta_2$ and distance d. Also, a tensile stress is maintained all along the displacement of the ribbon during treatment to induce a magnetic anisotropy oriented along or perpendicular to the ribbon longitudinal axis, depending on the alloy composition.

Figure 7:
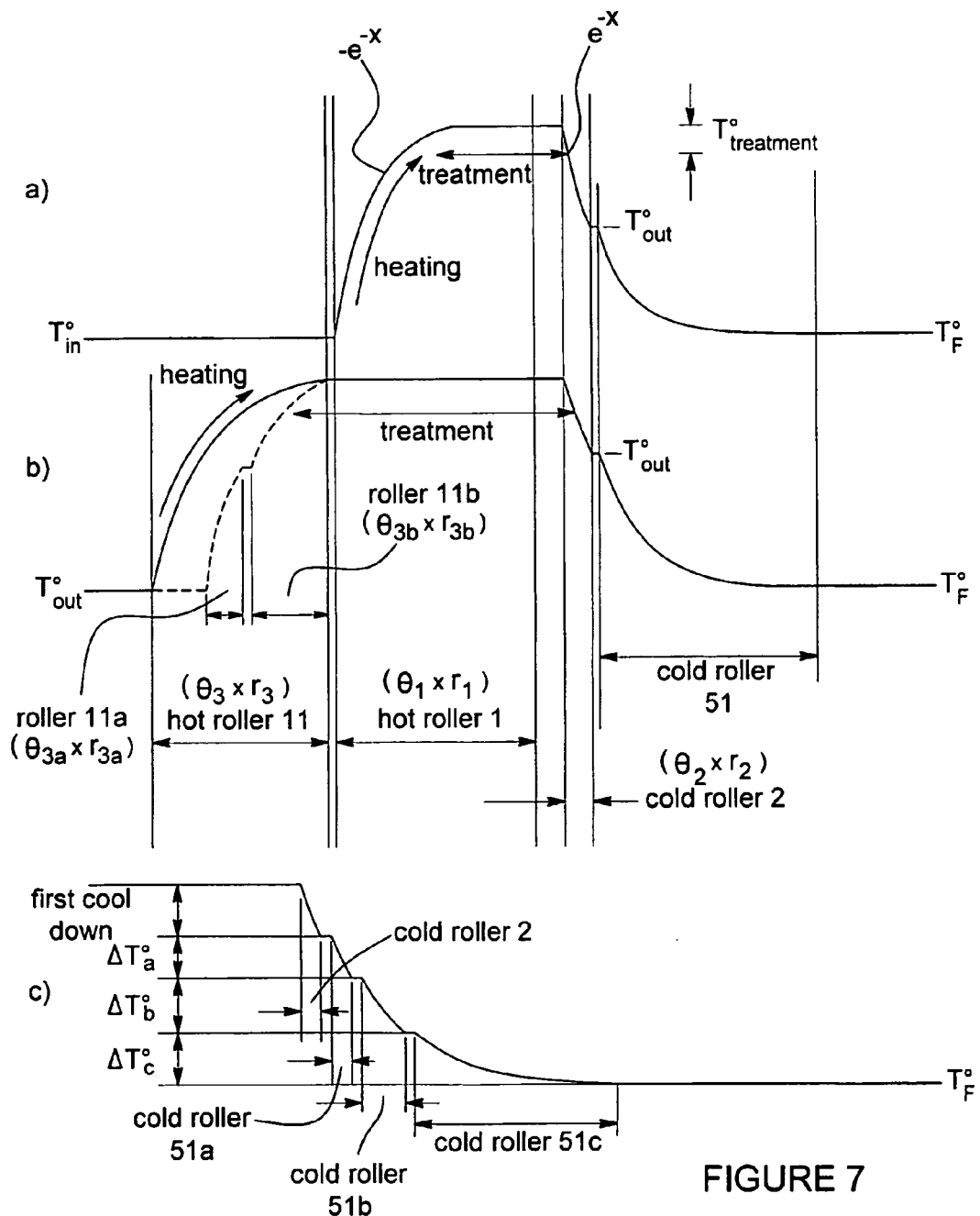
FIG. 7a is a graph showing the temperature profile of the ribbon while moving along a travelling path within the system shown in FIG. 24 when not using pre-heating.
FIG. 7b is a graph showing the temperature profile of the ribbon while moving along a travelling path within the system shown in FIG. 24 when using pre-heating.
FIG. 7c is a graph showing the temperature profile of the ribbon while passing over the cold rollers shown in FIG. 5.

In the apparatus of FIG. 1, the highest ribbon feeding rate that can be achieved, while keeping an acceptable annealing treatment, is limited by the heat transfer rate between a roller and the ribbon, by the ribbon thickness, by the angular distance ($\theta \times r$) of the contact region, and by the roller temperature. The heat transfer rate between a roller and the ribbon is dependent on the contact area between both mating surfaces. Due to some roughness characteristics of both mating surfaces, the contact area is reduced to a fraction which is influenced by the applied contact pressure. The contact area will be improved if some pressure is applied. Also, a reduced viscosity at elevated temperature will improve the contact area under the pressuring force. Furthermore, the contact area will improve for amorphous alloy ribbons having a reduced surface roughness. In the shown apparatus, a contact pressure is exerted by the applied mechanical tensile stress in the forwarded ribbon in order to strangle the roller. This strangling force creates a contact pressuring force which is proportional to the tensile stress and inversely proportional to the roller radius. The radius r2 of roller 2 being smaller than radius r1 of roller 1, the ribbon will have a higher contact area on roller 2 at cool down. Also, the temperature rate of change in the ribbon while in contact with a roller evolves closely following a negative exponential decay: $-e^{-x}$ (heating ribbon), or positive exponential decay: $e^{-x}$ (cooling ribbon), as the temperature gap between the ribbon and the roller surface diminishes, as shown in FIG. 7a. Preferably, the surface temperature of roller 2 is well below the treatment temperature to take benefit of the higher falling temperature rate occurring at the initial portion of the closely followed positive exponential decay ($e^{-x}$). The maximum ribbon feeding rate for maintaining the same annealing curvature is achieved when the temperature $T_{out}^\circ$ has not dropped sufficiently below the treatment temperature at point 8 to allow further ribbon handling while continuing to cool down in the second cooling stage without provoking further significant detrimental stress relief. In this case, thermal treatment is not ended and the first cooling stage must be continued by contacting on a second cold roller 2 in close proximity to the first cold roller 2. The resulting final curved shape will be determined by considering the effect of this added roller on the thermal treatment.

Preferably, the annealing process of the present invention is carried out to minimize structural relaxation in order to get a ductile ribbon. It is believed that the dependence to the reciprocal of the temperature of the amorphous alloy instantaneous viscosity and rate of viscosity increase with time closely follow an Arrhenius law for temperatures below $T_g^\circ$. At an elevated temperature but still below $T_g^\circ$, the reduced viscosity will cause flow to increase in response to stress. For an initial applied or residual stress, the effect of flow will gradually relieve the stress with time with an associated time constant. In a constant structure (i.e.: with no structural relaxation), this time constant is exponentially proportional to the reciprocal temperature of the alloy. The higher the temperature, the shorter the required stress relief time will be. Furthermore, if there is a constant applied stress, there will be a constant flow. However, with structural relaxation also occurring, there will be an increasing resistance to flow due to a continuing increase of the viscosity as the alloy atomic structure rearranges towards an equilibrium state. This will stretch the time constant to relieve the stresses which will be irreversible since there has been a structural change in the alloy. Due to the effect of structural relaxation, the required time to stress relieve a sudden applied stress on an amorphous alloy specimen at a predetermined temperature below $T_g^\circ$ will increase depending on the thermal history the specimen was subjected to. In a preferred embodiment of the present invention, the heating time, the annealing time, the treatment configurations' sequence and the cooling method are realized based on how the structural change will affect the annealing time constant and the ductility of the ribbon. The thermal treatment is performed for the minimum time required to adequately relieve the residual and the series of applied stresses, which is dependent on the time constant associated with a chosen treatment temperature and with the evolution of the structural state during treatment. Going beyond this minimum time is unnecessary and will allow too much structural relaxation to occur which will be detrimental to the ductility of the ribbon. The shorter time constant available for alleviating applied stresses occurs at the beginning of the treatment once the treatment temperature is reached. Accordingly, the residual and applied bending stresses are mainly relieved when reaching point 5 in FIG. 1. Preferably, the travelling distance d is kept short by placing roller 2 very close to roller 1 to limit further structural relaxation. Preferably, the choice of roller 2 radius r2 is determined in order to obtain a cooled alloy ribbon showing maximum alleviated stress when bent at a curved radius close to r1 after treatment.

Preferably, the in-line annealed amorphous alloy ribbon is still in its amorphous state once the thermal treatment ends. However, in another embodiment, the thermal treatment temperature and time may be increased in order to reach onset crystallization of the alloy. The choice of treatment temperature and time can be set to end the thermal treatment with the alloy being partially or completely crystallized. Such use of the in-line annealing apparatus of the present invention can be advantageous for amorphous alloys requiring crystallization annealing.

Figure 2:
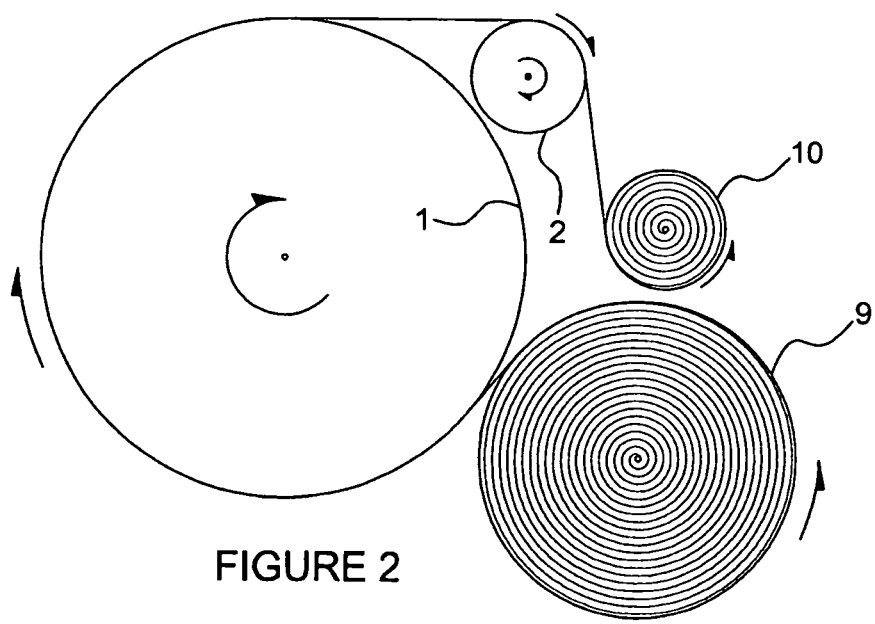
FIG. 2 is a schematic view of the system shown in FIG. 1 with the addition of a ribbon feeding reel and a take-up mandrel.

Referring now to FIG. 2, the apparatus further preferably comprises a feeding ribbon reel 9 and a take-up mandrel 10. The ribbon reel mandrel and the other mandrel are respectively coupled via a shaft to a motor. In operation, one of the motors rotates to adjust the ribbon speed while the other is in torque control mode to regulate the mechanical tensile stress in the forwarding ribbon. Rollers 1 and 2 are free to rotate and are driven by the ribbon acting as a driving belt and the tensile stresses S1 and S2 are the same.

Figure 3A:
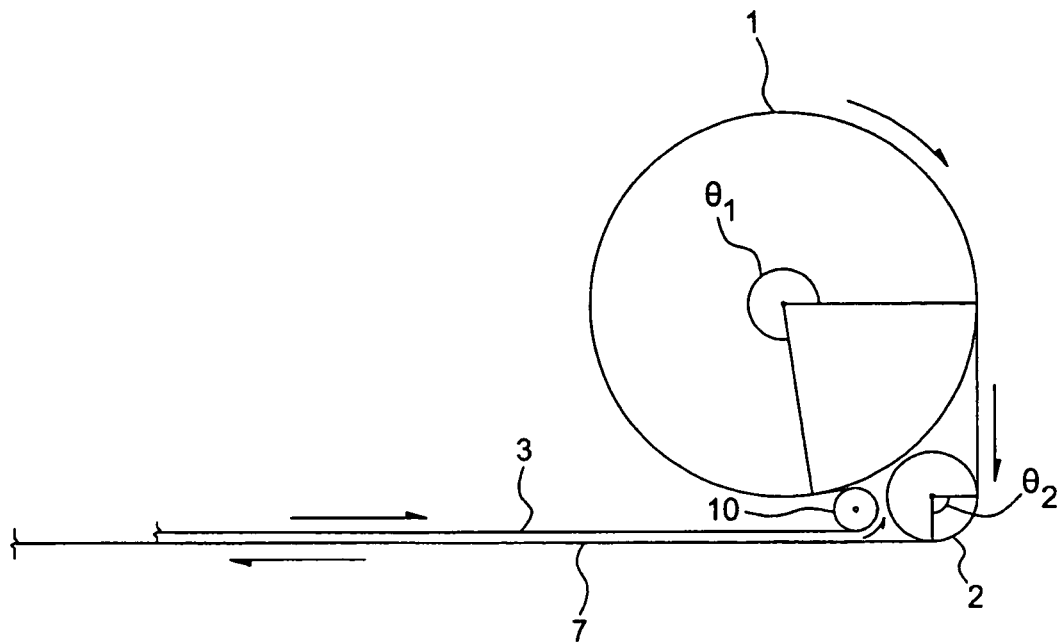
FIGS. 3a and 3b are schematic views of the system shown in FIG. 1 with the addition of a small guide roller for increasing contact angle over the rollers.
Figure 3B:
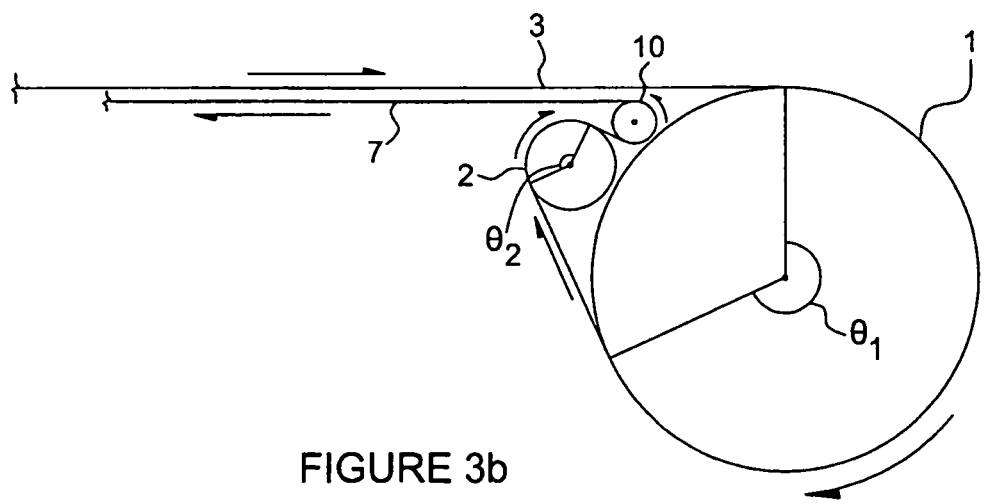

In the apparatus of FIG. 1, the treatment time on roller 1 at a given ribbon feeding rate is proportional to contact angle $\theta_1$ and the cooling time on roller 2 is proportional to contact angle $\theta_2$. Referring now to FIGS. 3a and 3b, there are shown modified versions of the apparatus shown in FIG. 1 which provides a wider contact angle $\theta_1$ or $\theta_2$ by adding a small guide roller 10 rotating in parallel and in close proximity to hot roller 1 or 2. The guide roller 10 can either be located just after the entry point 3 or just before the exit point 7 of the ribbon in its travelling path. In both apparatus, the ribbon feeding and take-up mandrels can be located at a remote location. The guide roller radius is preferably small to maximize $\theta_1$ or $\theta_2$. With the modified apparatus of FIGS. 3a and 3b, the ribbon feeding rate can be increased while keeping the same treatment time and temperature on hot roller 1 as for the apparatus shown in FIG. 1. In FIG. 3b, $\theta_2$ is also increased.

Since the stress relief action occurs mainly when the ribbon is near the treatment temperature, no significant stress relief is occurring while the ribbon is heating up starting from $T_{in}^\circ$ to reach the treatment temperature as shown in FIG. 7a. The full angular distance ($\theta_1 \times r1$) can be employed for alleviating stresses if the ribbon temperature $T_{in}^\circ$ is near the treatment temperature when making contact at point 4 and preferably, in a state where structural relaxation has not made significant progress compared to its initial structural condition characterizing its as-cast state. This way, the treatment time on roller 1 at a given ribbon feeding rate and roller temperature can further be increased.

Figure 4A:
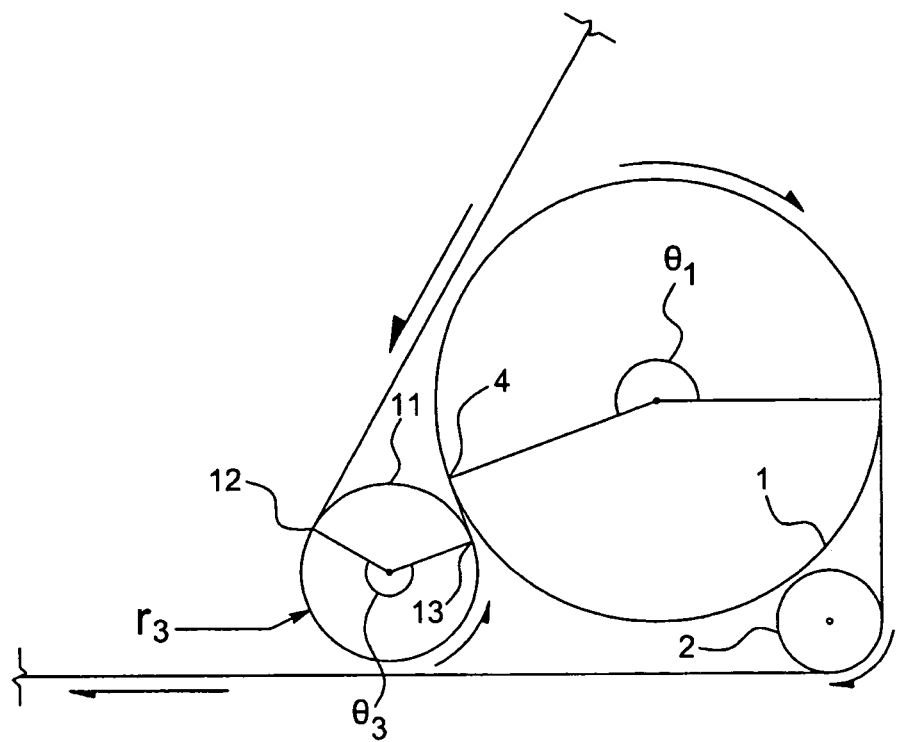
FIG. 4a is a schematic view of the system shown in FIG. 1 with the addition of a hot roller for pre-heating the ribbon.
Figure 4B:
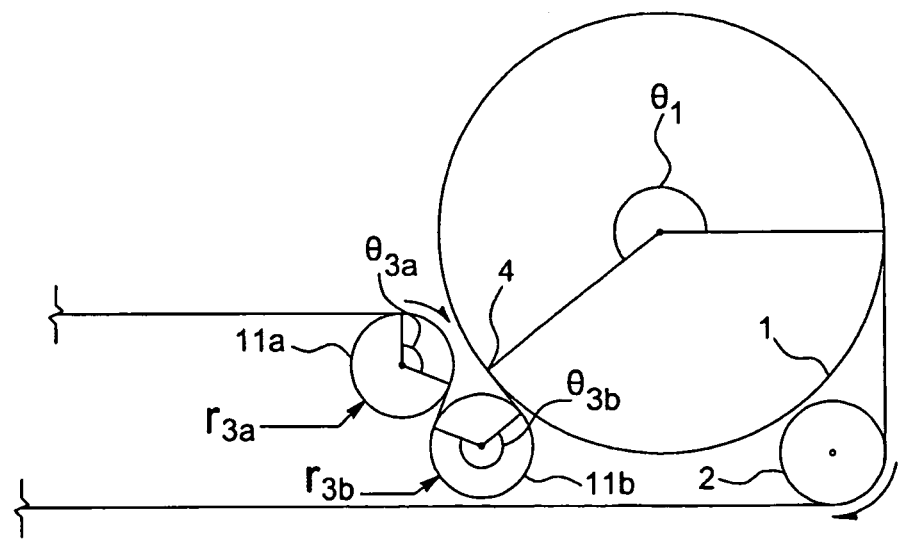
FIG. 4b is a schematic view of the system shown in FIG. 1 with the addition of two hot rollers for pre-heating the ribbon.

In another preferred embodiment, the heating of the ribbon is performed before subjecting the ribbon to a series of treatment configurations. It is true that the structural relaxation will commence, but the heating time in the present invention is comparable to the treatment time and, considering that the structural relaxation progression speed increases exponentially with the reciprocal of temperature and that the temperature is in a rising mode while being heated, no significant structural relaxation will occur if the rising temperature gets near the treatment temperature just a moment before the ribbon makes contact with hot roller 1. Referring now to FIG. 4a, there is shown a modified version of the apparatus of FIG. 1, where a second hot roller 11 having a radius r3 and rotating in parallel and in close proximity to roller 1 has been added. The travelling path of the ribbon has been modified to add the hot roller 11 in its path. Before making contact with roller 1 at point 4, the ribbon makes a static contact with the hot surface of roller 11 at point 12, where it also bends to the hot roller radius r3 and starts to heat up at a high temperature rising rate. The ribbon is kept in contact with the hot roller surface for a given rotation angle $\theta_3$. While moving along with the hot roller 11 surface in rotation, the ribbon temperature goes up to a temperature below or equal to the hot roller 11 temperature. At point 13, the hot ribbon breaks contact with hot roller 11 and goes through in flat configuration to point 4 of the hot roller 1 and follows the same route path as described for FIG. 1. The resulting temperature profile is shown in FIG. 7b. Preferably, while rotating along in contact with roller 11, the ribbon temperature is constantly in a rising mode. More preferably, when breaking contact with roller 11 at point 13, the ribbon temperature has substantially reached the treatment temperature. The hot roller 1 heat sourcing or sinking is then adjusted to keep the incoming ribbon at the treatment temperature while in contact for the whole rotating angle $\theta_1$. Also, the hot roller 11 is placed in close proximity to roller 1 to minimize the travelled path length between points 13 and 4 in the flat configuration between roller 11 and roller 1. The choice of roller 11 surface temperature, outer radius r3 and contact angle $\theta_3$ is optimized to reduce temperature rising time in order to limit the progression of the structural relaxation before reaching point 4. A reduced temperature rising time is possible by setting the temperature of roller 11 above the treatment temperature with the ribbon leaving roller 11 when its temperature gets near the treatment temperature in order to benefit from the higher temperature rising rate of the initial portion of the negative exponential decay $(-e^{-x})$ closely followed by the ribbon temperature. Furthermore, any slow progressive change in the ribbon thickness, which would affect the temperature rising rate on roller 11 and therefore the ribbon temperature at the leaving point, can be compensated by correcting the temperature of roller 11. Such thickness changes can be easily detected by monitoring the power supplied to roller 1 for maintaining the treatment temperature on the incoming pre-heated ribbon. Another way to further reduce temperature rising time is to use more than one hot roller 11 having a smaller outer radius and being disposed side by side and in parallel for pre-heating the ribbon which follows a snaking path from one roller to the other. A ribbon snaking around multiple smaller hot rollers will heat up alternately from each side of the ribbon and more rapidly at a given tensile stress as the pressuring contact on a roller increases in an inversely proportional manner with respect to its outer radius. Alternately heating from each side of the ribbon also reduces the gradient temperature through the thickness as compared with heating from only one side, thus offering a more uniform temperature increasing rate through the ribbon thickness. At equivalent ribbon temperature rising rates, smaller rollers can therefore be used to reduce the ribbon tensile stress, thus lowering the risk of a breakage during treatment. In FIG. 4b, the hot roller 11 of FIG. 4a has been replaced by two smaller rollers 11a and 11b of radius r3a and r3b. With this modified apparatus, the sum of the angular distances of both rollers 11a and 11b, $(\theta_{3a} \times r3a + \theta_{3b} \times r3b)$ can be made smaller than the angular distance $(\theta_3 \times r3)$ of FIG. 4a for equivalent ribbon tensile stresses as the ribbon temperature rises more rapidly as shown in FIG. 7b, thus further limiting the progression of the structural relaxation before reaching point 4.

In the present invention, the operation of heating and cooling the amorphous alloy ribbon by a direct static contact between one of the two side surfaces of the ribbon, or alternately on each side, and along a significant peripheral portion of a thermally conductive roller has to take into account the thermal expansion or contraction of the alloy. When submitted to a temperature change, the alloy seeks to expand while its temperature is rising, or to contract while its temperature is falling. This phenomenon will create concentrated surface shearing stresses at the anchoring contact points of the ribbon with the surface of the roller which are preventing the ribbon from slipping. During the heating stage of the in-line annealing process, as the ribbon seeks to expand with the temperature getting higher, the alloy viscosity drops and the appearing surface shearing stresses are getting relieved with increasing flow. Therefore, no significant surface shearing stresses will build-up while the ribbon is heating up. However, this is a different story at the cooling stages using cold rollers.

Figure 5:
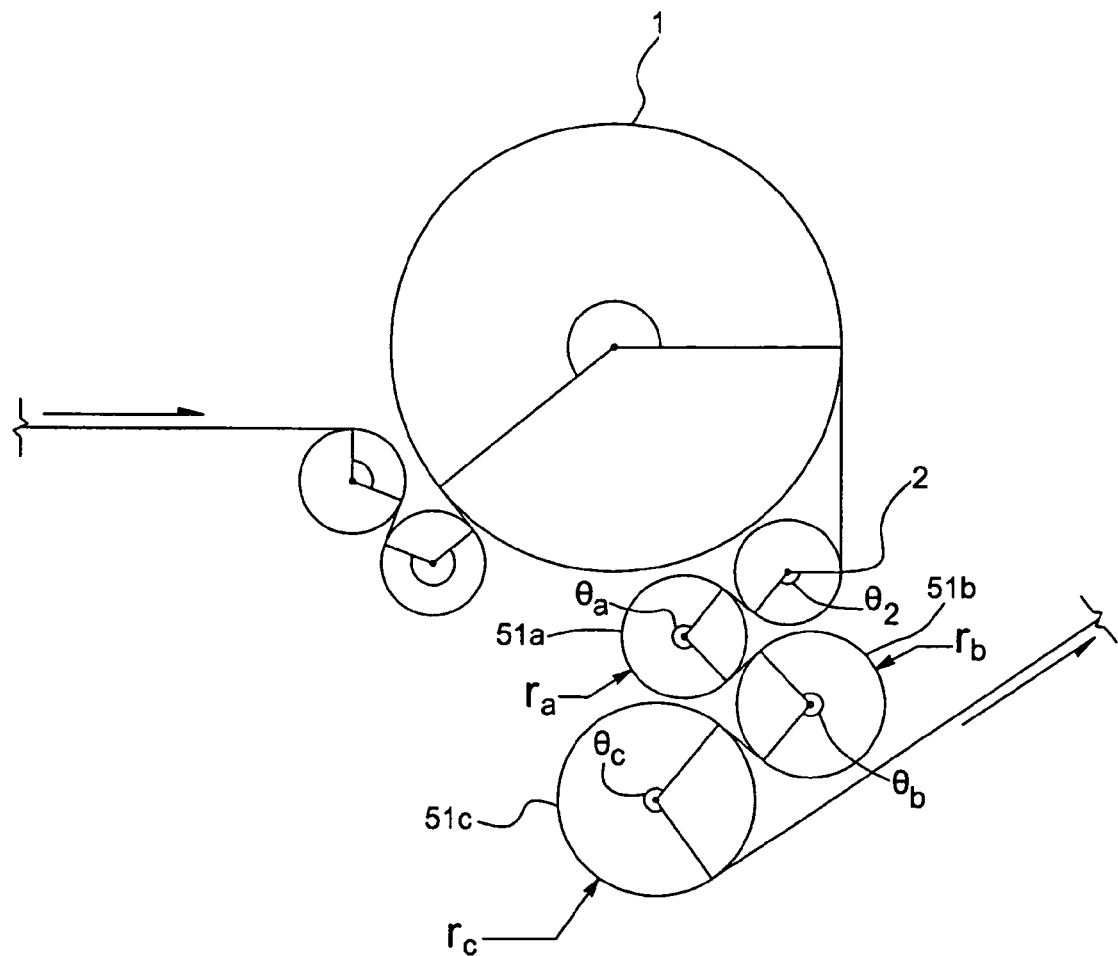
FIG. 5 is a schematic view of the system shown in FIG. 4b with the addition of three cold rollers for further cooling of the ribbon.

As the temperature is falling, the ribbon seeks to contract while its viscosity increases rapidly. This will introduce increasing concentrated surface shearing stresses which can cause collapsing of the anchoring contact points and therefore an abrasive wear of the surface of the cold roller will occur. In the present invention, this abrasive wear problem can be significantly attenuated by snaking the ribbon through multiple cold rollers over a series of small angular distances ($\theta \times r$) during the decrease in the ribbon temperature as shown in FIG. 5. Jumping over multiple cold rollers will null the accumulating concentrated shearing stresses at each jump before they get to a point on the roller where the abrasive wear becomes a serious problem. If cold rollers are used in the second cooling stage, their number and each angular distance ($\theta \times r$) may be chosen according to a maximum admissible temperature drop $\Delta T°$ on each roller as shown on FIG. 7c and on the final temperature $T_F°$ at which the ribbon will be taken-up on a mandrel. As for cold roller 2 in FIG. 1 to 5, it is preferable to minimize the angular distance ($\theta_2 \times r2$) until the ribbon temperature $T_{out}°$, when leaving the roller at point 8, has dropped sufficiently below the treatment temperature to allow further ribbon handling while continuing to cool down without provoking further significant detrimental stress relief, otherwise avoidable abrasive wear will occur if dropping further below that point. Also, repetitively nulling the accumulating concentrated surface shearing stresses will attenuate introduction of residual stresses which contribute in deteriorating the magnetic properties of the ribbon after treatment.

Figure 6A:
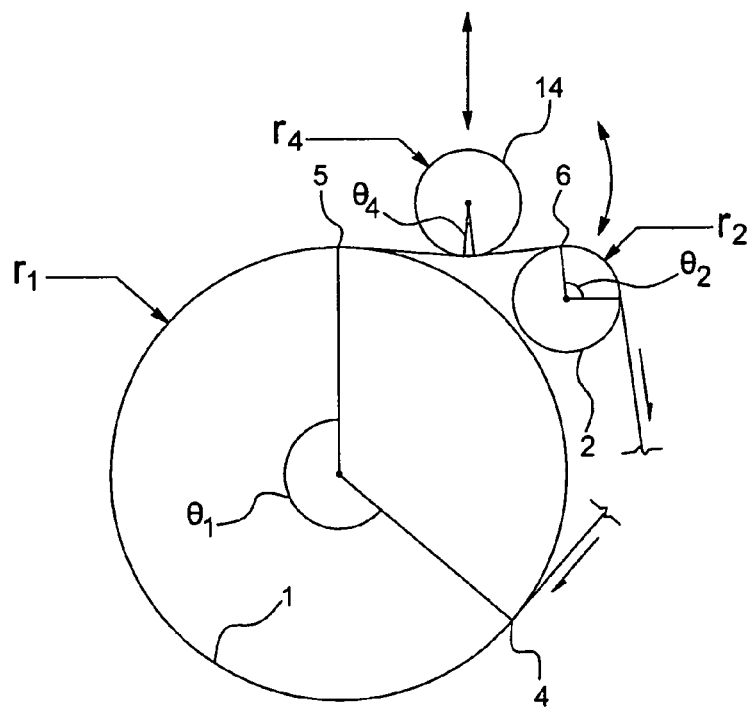
FIG. 6a is a schematic view of the system shown in FIG. 1 with the addition of a hot roller for annealing the alloy ribbon at variable curvatures.

Referring now to FIG. 6a, there is shown a modified version of the apparatus shown in FIG. 1 which is used for in-line annealing an amorphous alloy ribbon that will show maximum stress relief after treatment at a programmable radius $r_a$. The controlling of the flow sequence occurring in the alloy at the treatment temperature is modified by further bending the ribbon on an additional roller rotating in contact with the forwarded ribbon along the thermal treatment path. The apparatus further comprises a roller 14 having a predetermined radius r4 and contacting the ribbon somewhere between point 5 and point 6 and parallel to rollers 1 and 2. While going from roller 1 to roller 2, the ribbon bends backwards on roller 14 on a contact angle $\theta_4$ to relieve bending stresses opposite to the treatment bending side on roller 1. Depending on ribbon thickness and feeding rate, the choice of rollers' radius r1, r2 and r4, the temperature of rollers 1, 2 and 14 and the covering angle $\theta_1$, $\theta_2$, $\theta_4$ are determined in order to obtain a cooled alloy ribbon showing maximum alleviated stress when bent to a radius $r_a$ greater than r2 after treatment. The radius $r_a$ can be programmed by either displacing roller 14 perpendicularly against the ribbon or by displacing roller 2 around roller 14 to increase or decrease the contact angle $\theta_4$.

This way, an amorphous ribbon could be in-line annealed to a radius $r_a$ progressively increasing as material is forwarded and contacting angle $\theta_4$ is increased in order to match the increasing bending radius when it is rolled to form a circular core.

Figure 6B:
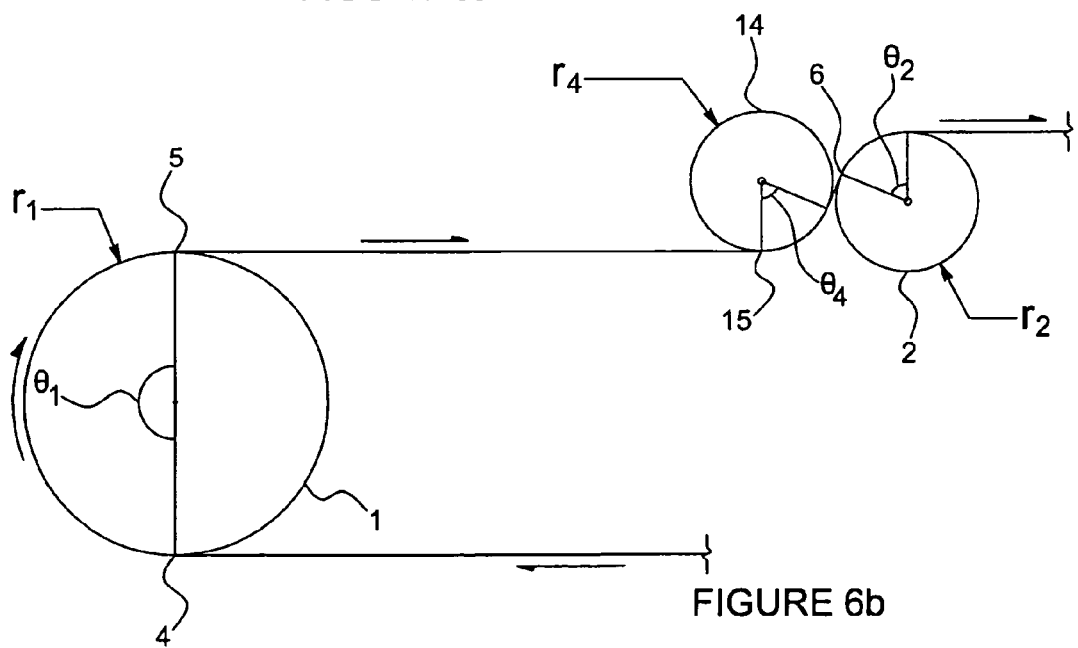
FIG. 6b is a schematic view of the system shown in FIG. 1 with the addition of a hot roller for annealing the alloy ribbon in a flat bend form.

Referring now to FIG. 6*b*, there is shown an apparatus of the present invention which is used for in-line annealing an amorphous alloy ribbon in a flat configuration. This apparatus is similar to the apparatus shown in FIG. 6*a*, but configured to in-line anneal the ribbon at an infinite radius $r_a$. Roller 1 serves mainly to heat up the ribbon in a similar manner as explained for roller 11 in FIG. 4*a*. When the ribbon breaks contact with hot roller 1 at point 5 and at the treatment temperature, it progresses forward at high speed in a flat configuration for a predetermined distance before making contact at point 15 with roller 14. In this case, the desired stress relief is occurring while travelling at the treatment temperature in a flat configuration towards roller 14. The flat configuration treatment time becomes a function of the ribbon travelling distance from point 5 to point 15 at a given ribbon feeding rate. The required flat configuration treatment time is very short in respect to the temperature decay time constant while travelling from point 5 to 15, so that no significant temperature drop will have occurred when point 15 will be reached. Although the flat treatment zone of the ribbon could be located within a furnace to maintain temperature, this is not necessary in the present invention. When the hot ribbon touches roller 14, added bending stresses are relieved. The added relieved bending stresses will then be reverted when it will be bent backwards at initial cool down on cold roller 2. Preferably, roller 14 and roller 2 are in close proximity. Depending on ribbon thickness and feeding rate, the choice of radius r2 and r4, the temperature of roller 2 and 14, the covering angle $\theta_2$ and $\theta_4$ and the travelling distance between point 13 and 15 are determined in order to obtain a cooled alloy ribbon showing maximum alleviated stress in a flat configuration.

The apparatus of the present invention shown in FIGS. 1 to 6 are best suited to in-line anneal in a normal atmosphere an amorphous alloy ribbon such as iron-based Metglas 2605SA1 and 2605HB1 under an applied tensile stress with post-annealing limited or no acquired embrittlement. Magnetic properties of amorphous alloy ribbons 2605SA1 and 2605HB1 have been greatly improved after they were in-line annealed at high speed with the apparatus of the present invention. Magnetic performances of rolling-up-after-annealing circular cores compare favourably to circular cores processed using the conventional field furnace annealing method.

Figure 11:
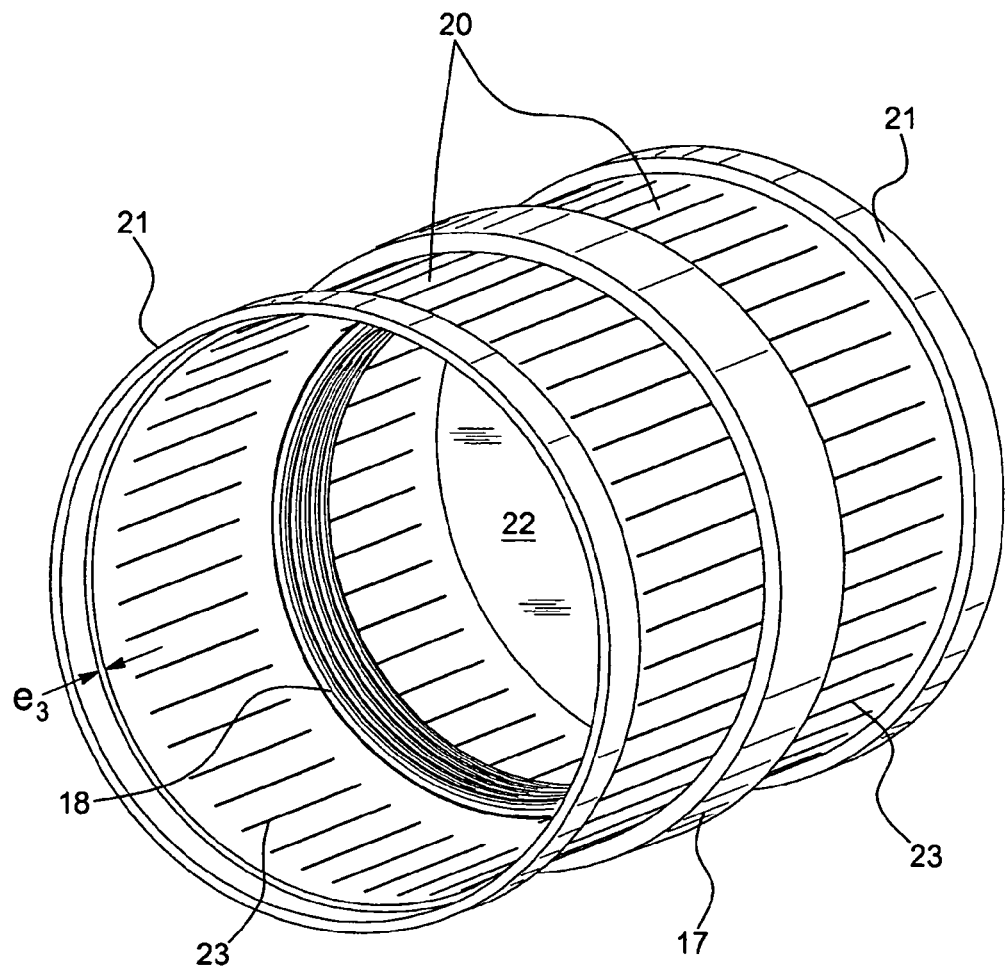
FIG. 11 is a perspective view of a hot roller construction according to a preferred embodiment of the present invention.
Figure 12:
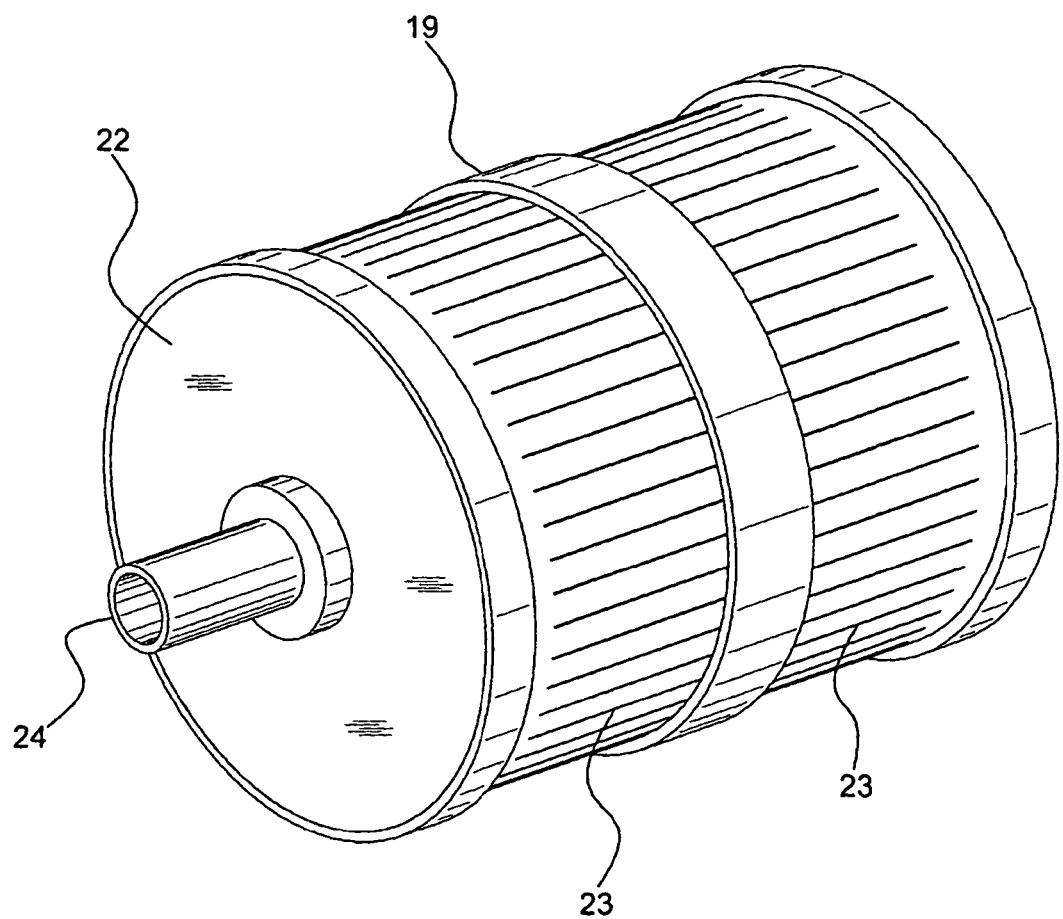
FIG. 12 is a perspective view of a hot roller shown in FIG. 11 with a flange and a hollow shaft.
Figure 13A:
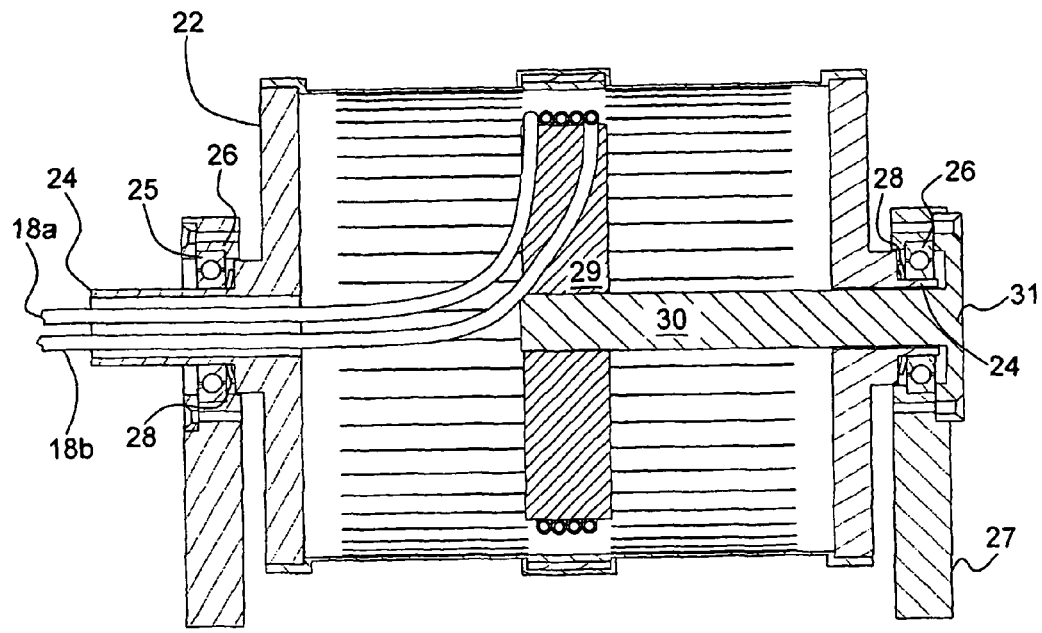
FIG. 13 is a side cross-section view and a detailed view respectively of the hot roller according shown in FIG. 12 mounted on a supporting member.
Figure 13B:
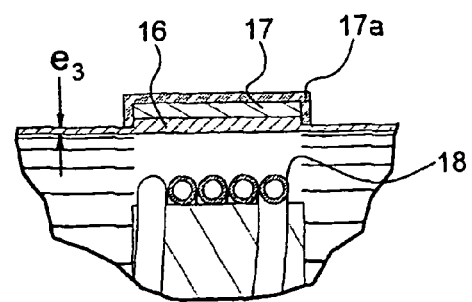

Referring now to FIGS. 9 to 13, there is shown a detailed construction of a hot roller. The hot roller comprises an inner heat source ring 16 and an outer cladding heat diffuser ring 17 rotating together around a central axis 13. The outer cladding ring 17 is made of a good thermal conductive material, such as copper, and has a predetermined thickness $e_2$. If the chosen material is prone to severe oxidation at high temperatures which eventually leads to mechanical degradation, as it is the case for copper, its exposed surface may be plated with a thin metal film 17*a* having a substantial stainless property, such as nickel, to protect its surface from severe oxidation. The inner ring 16 is made of an electrically resistive conductor material. The electrical resistive conducting nature of the inner ring 16 serves as a means to produce heat by a joule effect of circulating currents. Ring 16 could be omitted if a burning flame would be used to heat the thermal diffuser from underneath. With ring 16, such produced heat may be generated by an electrical self heating element ring 16 provided with two electrical conductors that are connected outside of the ring to a current source via a pair of sliding contacts located somewhere along the ring rotating axis 13. Preferably, the inner ring 16 is made of an electrically resistive conductor material such as stainless steel, and has a predetermined thickness $e_1$. To provide an efficient heat transfer and from the inner ring 16 to the outer cladding ring 17, preferably, the outer cladding ring 17 is welded or is build up on ring 16 by using an electroplating process after which the outer surface of the ring 17 is machined. Heat can also be produced by electrical induced internal AC currents which are looping in the ring. The current loops are induced by a high frequency fluctuating magnetic field produced with an induction heating antenna 18 and are looping following the circular path delimited by the ring 16. The induction heating antenna 18 is essentially made of insulated copper tubing which is cylindrically coiled, aligned, centered and fixed within the hollow portion of ring 16 and which is also separated from it by an air gap 18*a*. Coolant is allowed to flow within the antenna copper tubing to evacuate the coil conducting joule losses. Preferably, the thickness $e_1$ of ring 16 is greater than the skin depth of the induced AC currents at the antenna power supply frequency. The copper cladding thickness $e_2$ is chosen to be thick enough so to act as a thermal diffuser to ensure uniform heat distribution and transfer from the heated inner ring 16 to the ribbon in contact with the outer cladding ring 17. The two-ring assembly 19 has a much greater thickness when compared to the ribbon thickness and serves, with its thermal inertia, as a heat buffer reservoir to level the temperature all around the periphery when heating a ribbon that is moving along in contact with the roller surface in rotation. The two-ring assembly 19 is at least as wide as the ribbon width. To support the two-ring assembly in rotation, extending thin tube walls 20 having a thickness $e_3$ protrude from both sides of the inner ring 16. The tube walls 20 are preferably made of a poor thermal conducting material such as stainless steel and the wall thickness $e_3$ is made sufficiently thin to limit heat leakage towards the tube walls opposite extremities but, is made sufficiently thick to support the pulling forces exerted by the ribbon in tension on the roller surface in order to maintain concentricity while the roller is rotating. The tube walls opposite extremities each have a thicker wall 21 for receiving holding flanges 22. If the tube walls 20 material are made of stainless steel, as it is preferably the case, induced current loops will extend beyond both sides of the inner ring 16. This side effect will generate parasitic heat within the tube walls. Therefore, the tube walls 20 are provided with axial periodically spaced slots 23, slotted from the edges of both sides of the stainless steel ring 16 on a length long enough to break the circular path loop for induced current to flow through within the vicinity of the two-ring assembly 19. Moreover, these slots create finger-like supporting means for holding both sides of the two-ring assembly and which can bend radially to accommodate thermal radial expansion of the two ring assembly 19 while keeping it concentric with the rotating axis. As shown in FIGS. 12 and 13, each side flange 22 comprises a hollow shaft 24 supported on bearing 25 which is inserted in an opening of wall 27. In an inverted version, the opening 26 may be localised in flange 22 with shaft 24 being incrusted in wall 27. To allow the axial thermal expansion of the two-ring assembly 19 and of the tube walls 20, a spring 28 is inserted on the shaft 24 between flange 22 and bearing 25, and the shaft and bearing are allowed to slide one onto the other. The induction heating antenna 18 is supported in its central hollow portion by the supporting means 29 which is attached to the shaft 30 that passes freely through the hollow portion of the shaft 24 in order to be held from outside of the roller by the plate 31 which is secured on the supporting structure wall 27. The two insulated copper tubing ends 18a and 18b of the induction heating antenna 18 extend freely through the opposite hollow shaft 24 to reach the HF electrical AC power supply. Therefore, the hot roller is allowed to rotate on both supporting bearings while the induction heating antenna 18 remains fixed without physical interference with the hot roller.

Figure 14:
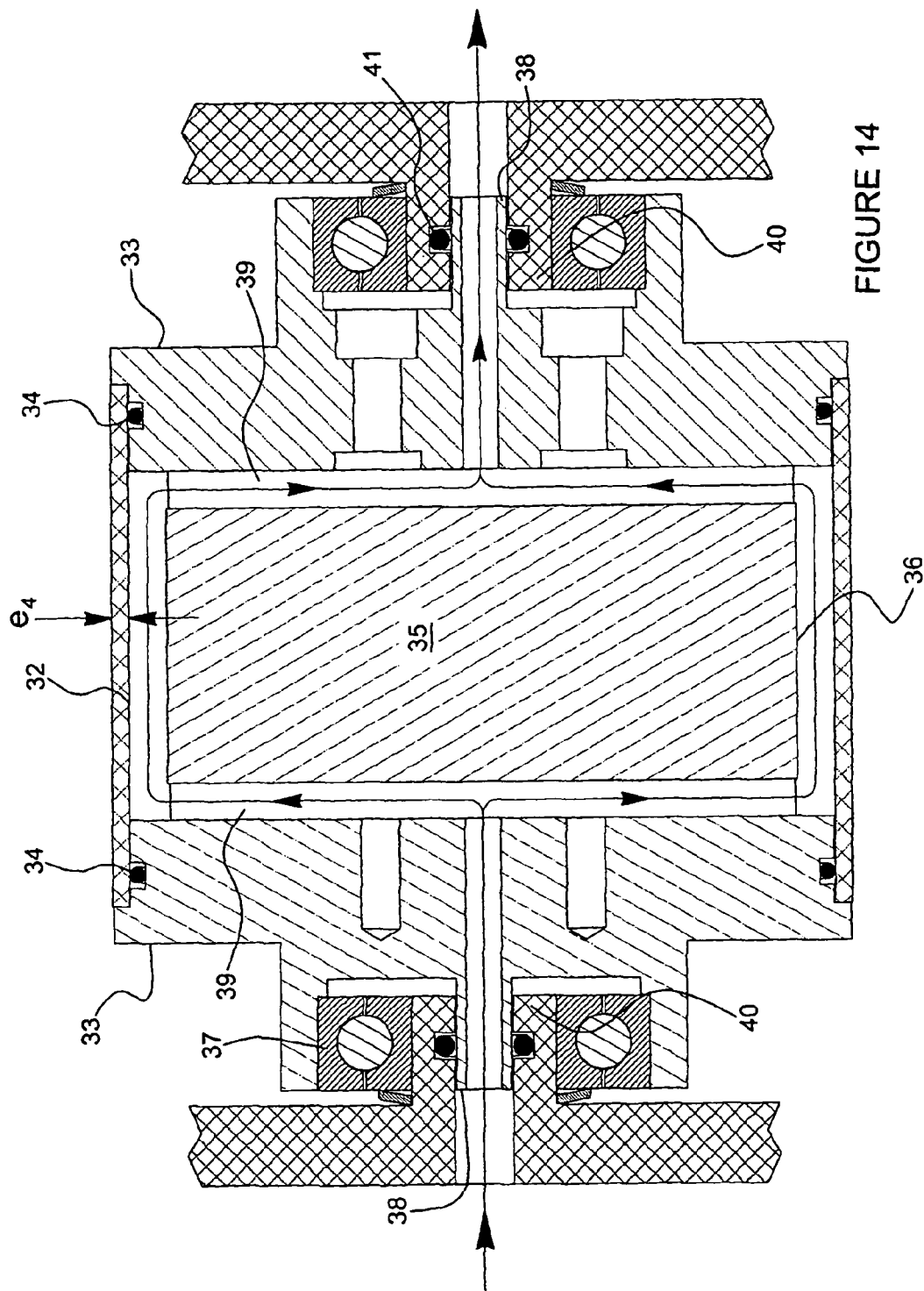
FIG. 14 is a side cross-section view of a cold roller according to a preferred embodiment of the present invention.

Referring now to FIG. 14, there is shown a cut view of a detailed construction of a cold roller. The cold roller comprises a thermal conducting ring 32 having a thickness $e_4$ and being supported by side flanges 33. The junctions between the thermal conducting ring 32 and the flanges 33 are provided with a seal 34. The cold roller also comprises an inner part 35 having an outer cylindrical surface 36 centered within the hollow portion of the thermal conducting ring 32 and from which it is separated by a small gap. The inner part 35 is held by the two side flanges 33 with attaching means. The side flanges 33 are each provided with a central recess to insert and hold the outer rotating part of a bearing 37. The side flanges 33 also comprise a tube tip 38 protruding from the center of the flange to allow a coolant to pass through. At least one opened path link 39 is provided within both extremities of the inner part 35 to allow the coolant flowing in the tube tip to reach the gap.

Therefore, coolant entering in one of the two tube tips 38 will be guided through the gap in contact with the inner surface of the thermal conducting ring 32 to exchange heat. Then, the coolant follows its way out via the other tube tip at the opposite flange location. The cold roller assembly is supported by the inner rotating part of the bearings 37 on two hollow shafts 40 fixed to a wall structure. The tube tip 38 rotates in the hollow portion of the shaft 40 separated from the shaft inner wall by a sliding seal 41. Preferably, the coolant fluid is water. A higher ribbon cooling rate can be obtained using a sub-zero temperature fluid such as glycol.

Figure 15A:
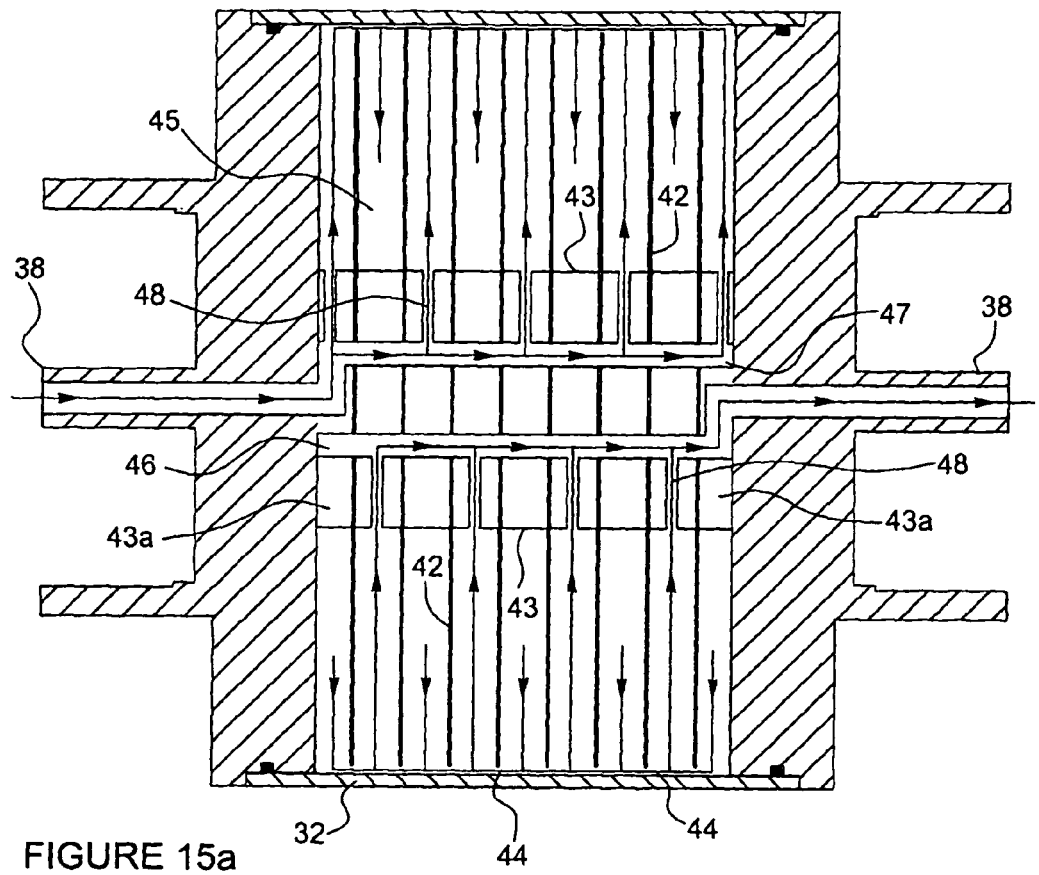
FIG. 15a is a side cross-section view of a cold roller according to another preferred embodiment of the present invention.
Figure 15B:
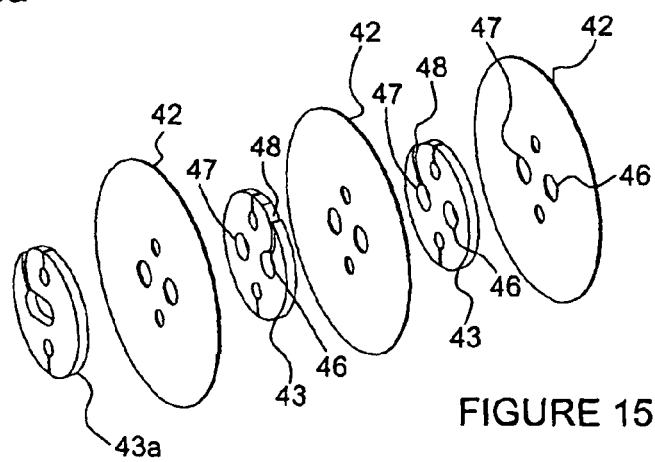

In the cold roller of FIG. 14, the ribbon falling temperature is quicker on one side of its edge as the coolant is getting hotter while flowing underneath the thermal conducting ring 32 from one side to the other. Referring now to FIGS. 15a and 15b, there is shown a modified version of the cold roller that distributes incoming coolant uniformly underneath the thermal conducting ring 32. The central portion 36 has been replaced by a stack of thin disc separators 42 spaced apart by spacers 43 and 43a. The disc separators 42 diameter is slightly smaller than the thermal conducting ring 32 inner diameter in order to create a small gap 44. The spacers 43 and 43a have a smaller diameter than the discs 42 to create a gap 45 for distributing to and collecting coolant from gap 44. Two series of parallel aligned openings 46 and 47 are perforated through the center portion of the stacked arrangement with each of the spacers having a transverse opening 48 between the corresponding gap 45 and one of the two parallel openings in an alternate stacked order. The parallel and transverse openings 46, 47 and 48 then form two manifolds, one intake and one outtake. Two spacers 43a are respectively located at both ends of the stacked arrangement to connect each tube tip 38 to a corresponding manifold which will allow coolant flowing in one tube tip 38 to be distributed via the outtake manifold in one out of the two gaps 45 and to reach the inner wall of the thermal conducting ring 32. The coolant will then return to the intake manifold via the small gap 44 and the corresponding gaps 45 and will exit the roller via the tube tip at the other extremity of the roller.

When processing a ribbon unrolled from a reel, the ribbon may travel with some sideways instability due to some factors like the sourcing reel being warped. If the ribbon necessarily has to pass by a precise location on a roller, as required on a hot roller of the present invention, a mechanism must be used to fix the ribbon trajectory. Preferably, the present invention further comprises a device to deliver a ribbon at a precise location on a guiding roller.

Figure 17:
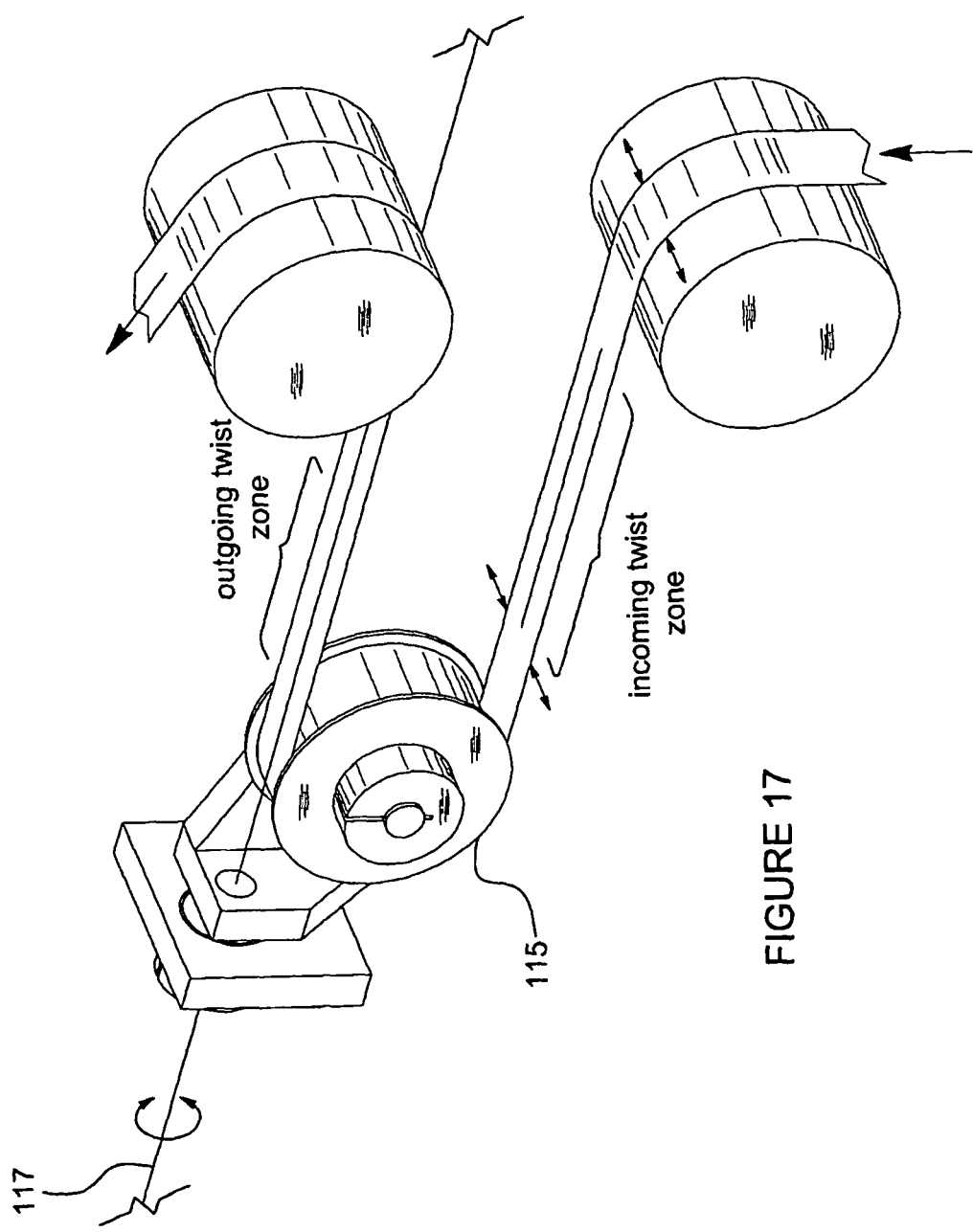
FIG. 17 is a perspective view of a system to deliver a ribbon at a precise location on a guiding roller according to another preferred embodiment of the present invention.

Referring to FIG. 16, there is shown a pivoting roller 115 rotating on an axis 118 and provided with two guiding side flanges 116 that are each inclined and which are separated by a distance just slightly greater than the ribbon width. The roller 115 also has a swivel axis 117 tangential to its peripheral surface and located at midpoint between the flanges 116. The ribbon is guided onto the roller surface over a given angle α up to the tangential point with the swivel axis where it exits. The travel trajectory is best corrected if the ribbon entry point on the roller is at 180 degrees with respect to the exit point. From an observer view point looking at the roller from the left as shown in FIG. 16, a ribbon entering the roller with some sideways instability (for example: ribbon axis fluctuating back and forth from position in1, in2, in3) will swivel the roller by pushing on the roller flanges with its edges so that the entry point will continuously be aligned with the incoming ribbon axis, and the outgoing ribbon will always exit the roller on the same axis (out1, out2 and out3 aligned together). The radius of the swivel guiding roller is chosen in relation to the ribbon width and to the magnitude of the lateral instability. A bigger roller diameter will swivel less to correct the same sideways instability. When the roller swivels, the incoming and outgoing portions of the ribbon will slightly twist on their axis. Therefore, the swivel roller must be located at some distance from other guiding rollers in order to allow some free space for the ribbon to slightly twist as it approaches or exits the roller as shown on FIG. 17.

When processing a ribbon at a high feeding rate with an added tensile stress, trying to control said tensile stress by controlling the torque on the unrolling source reel and the torque on the rolling up take-up mandrel as shown in FIG. 2 is less convenient because of the following reasons: large quantity of rolled up material have a high inertia; a ribbon loosely rolled up on a mandrel may suddenly slip when unrolled with a tensile stress; and it may be desired to roll up the ribbon at a lower tensile stress than required for treatment to limit the tightening radial force accumulating in the rolled up ribbon. Preferably, the present invention comprises an apparatus to drag a ribbon and to change the mechanical tensile stress in a forwarding ribbon at a passage point in its traveled path. The drag and tensioning system uses the static friction between two surfaces in contact with each other.

The ratio of the maximum applicable force $F_S$ that can be applied on an object leaning on a surface without slipping to the normal force $F_n$ exerted by the object on the surface is the coefficient of static friction $\mu_S$. As long as the applied, force is inferior to $F_S$, the object will not move.

$$F_S = \mu_S \times F_n$$

Figure 18A:
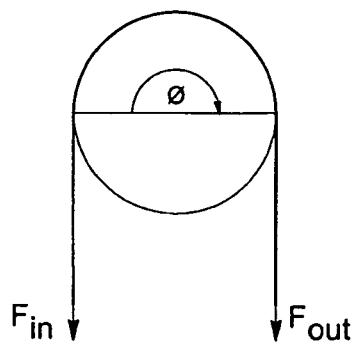
FIG. 18a is a schematic illustration of a ribbon passing over a capstan wheel.

The static frictional force also acts on a ribbon surrounding the outer perimeter of a wheel over an angle Ø with a tensile force. FIG. 18a illustrates this situation. In this case, we are assuming that the wheel cannot rotate. Two tensile forces, $F_{in}$ and $F_{out}$, of different values are exerted on the ribbon on either side of the wheel. By these forces, the ribbon strangles the wheel and also exerts a normal force to the surface of the wheel that puts in action the mechanism of static friction. As for the object on a surface, the difference of the two forces is opposed by a static friction force of same amplitude between the wheel and the ribbon surfaces that prevents the ribbon from slipping. When the difference in applied forces reaches the static frictional limit force, the ribbon starts to slip on the wheel. The maximum exerted forces between the input and the output closely follows this equation:

$$F_{out} = F_{in} e^{\mu_S \phi}$$

Figure 18B:
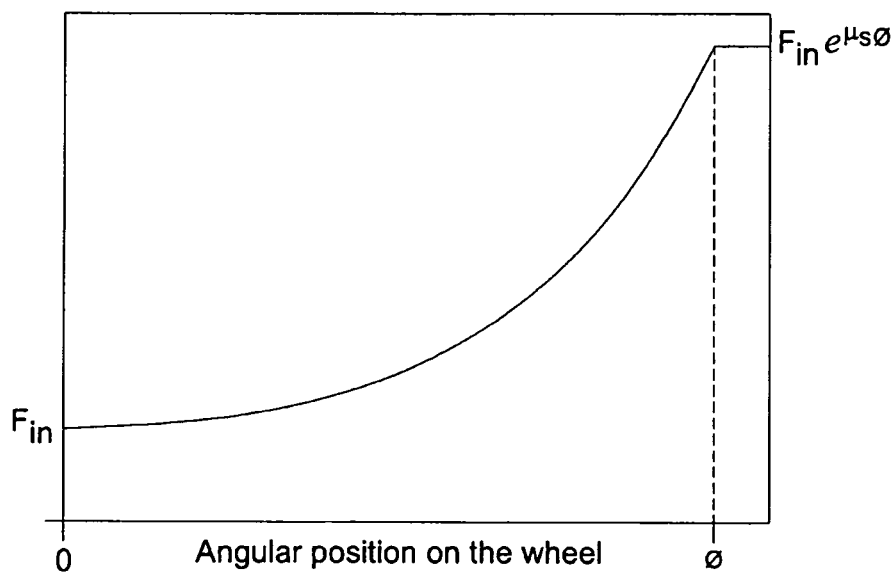
FIG. 18b is a plotted curve of the tensile force vs. angular position applied by a capstan wheel on a ribbon.

Therefore, for two tensile forces exerted on the ribbon on either side of the wheel over an angle Ø, the ribbon will start to slip when the output force will be superior to $F_{out}$ for a given input force $F_{in}$ and static coefficient of friction $\mu_S$. The tensile force in the ribbon along the surface of the wheel will have an exponential profile as shown in FIG. 18b. This is known as the capstan effect.

Static frictional capstan drives are used in the present invention to drag the ribbon at a high travelling speed either to control its speed or to increase or reduce the mechanical applied tensile stress. The dragging apparatus allows:

1. Smoother tensile stress transition.
2. Uniform distribution of the applied tensile stress along the width of the ribbon.
3. Precise control on the added tensile stress amplitude.
4. Precise control of the ribbon feeding rate.
5. The amplitude of the desired added tensile stress can be independent from the static friction coefficient.

1. Smoother Tensile Stress Transition

Any attempts to increase the tensile stress in a forwarding and tense thin alloy ribbon within a short distance on a point along a travelled path will create a continuous step up stress transition level on the ribbon material. If the ribbon is forwarded at great speed, the transition time will be very short and, if the added tensile stress is high, the ribbon will be submitted to a strong mechanical shock and therefore risks breakage. In the present case, a tensile force is gradually added along the covering angle of the capstan wheel in contact with the ribbon. Therefore, the stress step-up transition time can be considerably increased by using either a large diameter capstan wheel or by using multiple cascaded smaller capstan wheels, thus ensuring a continuous high speed reliable feeding of a tight ribbon:

2. Uniform Distribution of the Applied Tensile Stress Along the Width of the Ribbon For large ribbons, uniformly distributing the increasing tensile stress along the width of the very thin ribbon is necessary. For high tensile stresses, a non-uniform distribution of the stress combined to any potential physical defects, like a small inclusion at the ribbon edge, can tear the ribbon apart from the edge. With the capstan drive, the ribbon lies on a uniform surface and the tensile stress is progressively added over a significant length, thus avoiding any significant imbalance of tensile forces along the width of the ribbon.

3. Precise Control on the Added Tensile Stress Amplitude

The added tensile stress on the ribbon is performed by applying a clockwise or counterclockwise torque on the capstan wheel. High precision torque can be easily provided by a torque regulated electrical motor mechanically coupled to the capstan wheel axis of rotation.

4. Precise Control of the Ribbon Feeding rate

By using a capstan wheel in static friction mode with the ribbon, the wheel surface tangential speed is synchronised with the ribbon feeding rate. It is therefore easy to precisely control the ribbon feeding rate by controlling the capstan wheel rotating speed. In a system where a ribbon is unrolled from a reel to another while following a path through a series of rollers and capstan static friction drives, it is possible to control the feeding rate of the ribbon if rotation of one of the capstan drives is speed-controlled and that all other drives are torque-controlled. The speed control of the capstan wheel can easily be performed using a speed controlled motor drive mechanically coupled to the wheel axis of rotation.

5. The Amplitude of the Desired Added Tensile Force can be Independent from the Static Friction Coefficient Regardless of the coefficient of static friction, any amount of tensile stress can be added or subtracted from a point along the path of the forwarded ribbon. The maximum tensile stress that can be applied for a given coefficient of static friction is limited by the number of capstan wheels encountered by the ribbon on its travelling path.

Figure 19A:
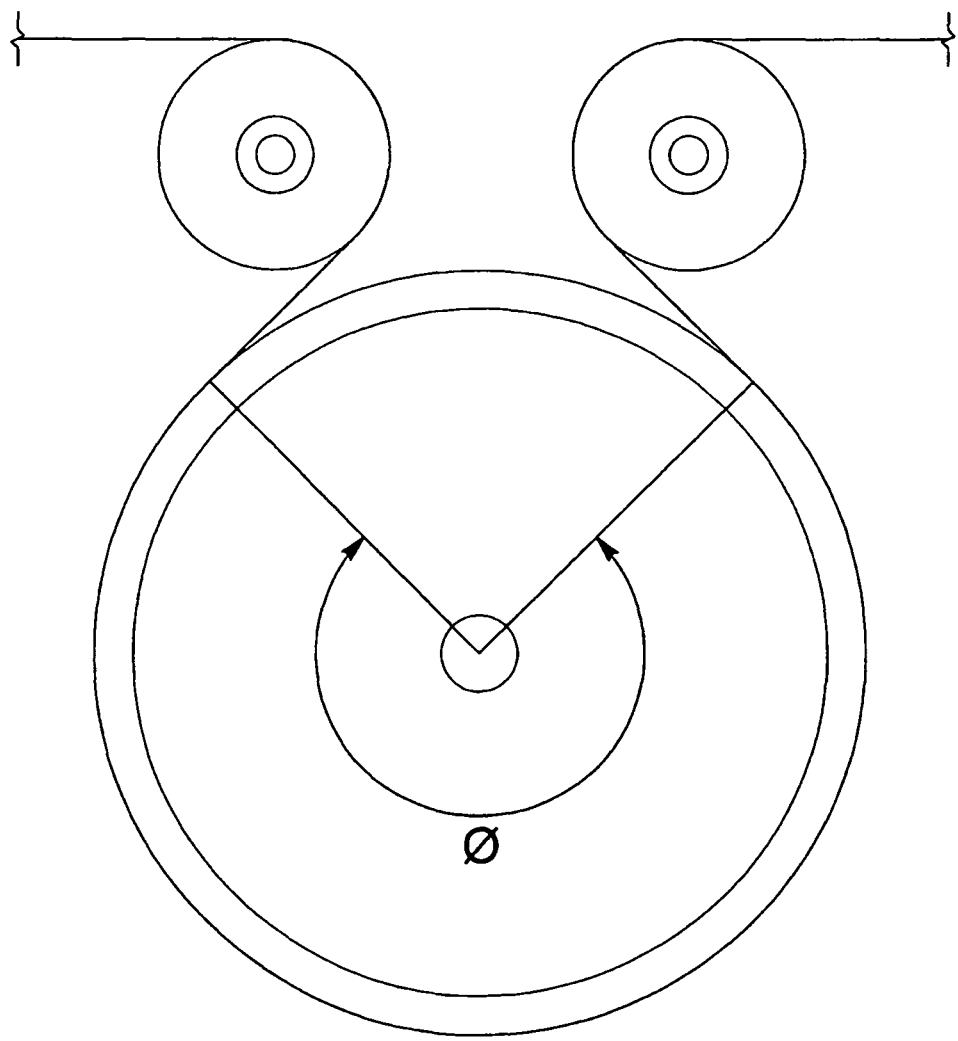
FIGS. 19a and 19b are a front view and a perspective view of a capstan drive according to a preferred embodiment of the present invention.
Figure 19B:
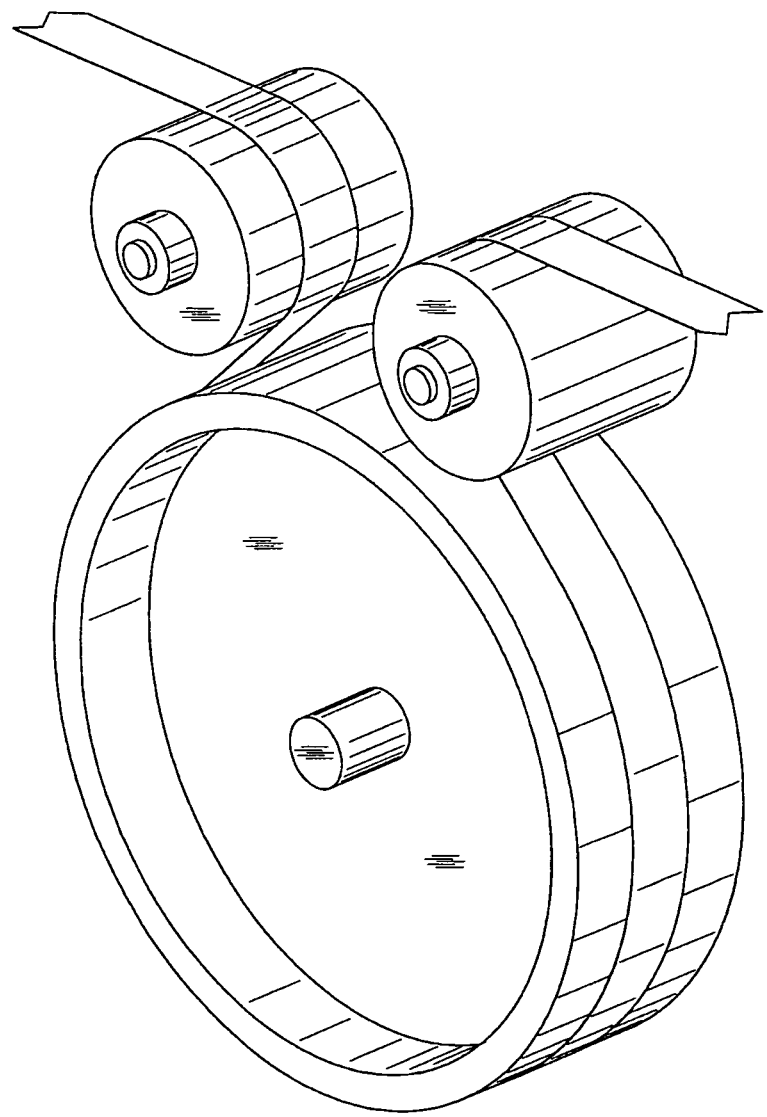
Figure 20A:
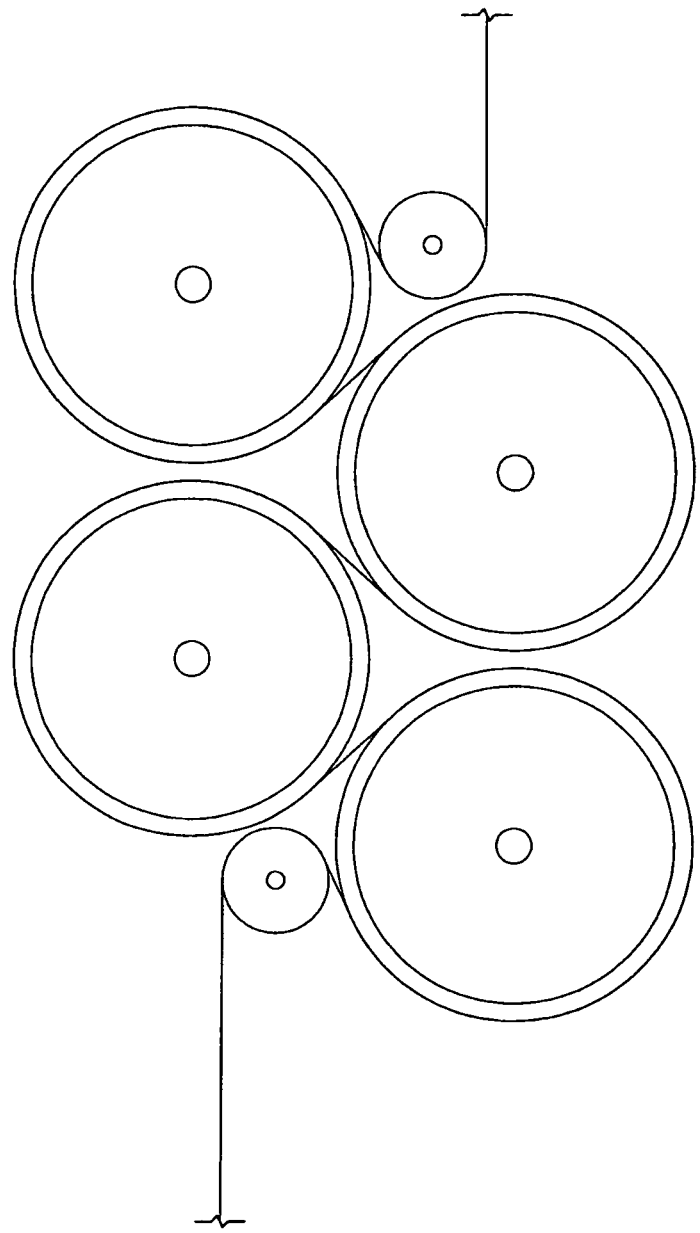
FIGS. 20a and 20b are a front view and a perspective view of four capstan drives according to another preferred embodiment of the present invention.
Figure 20B:
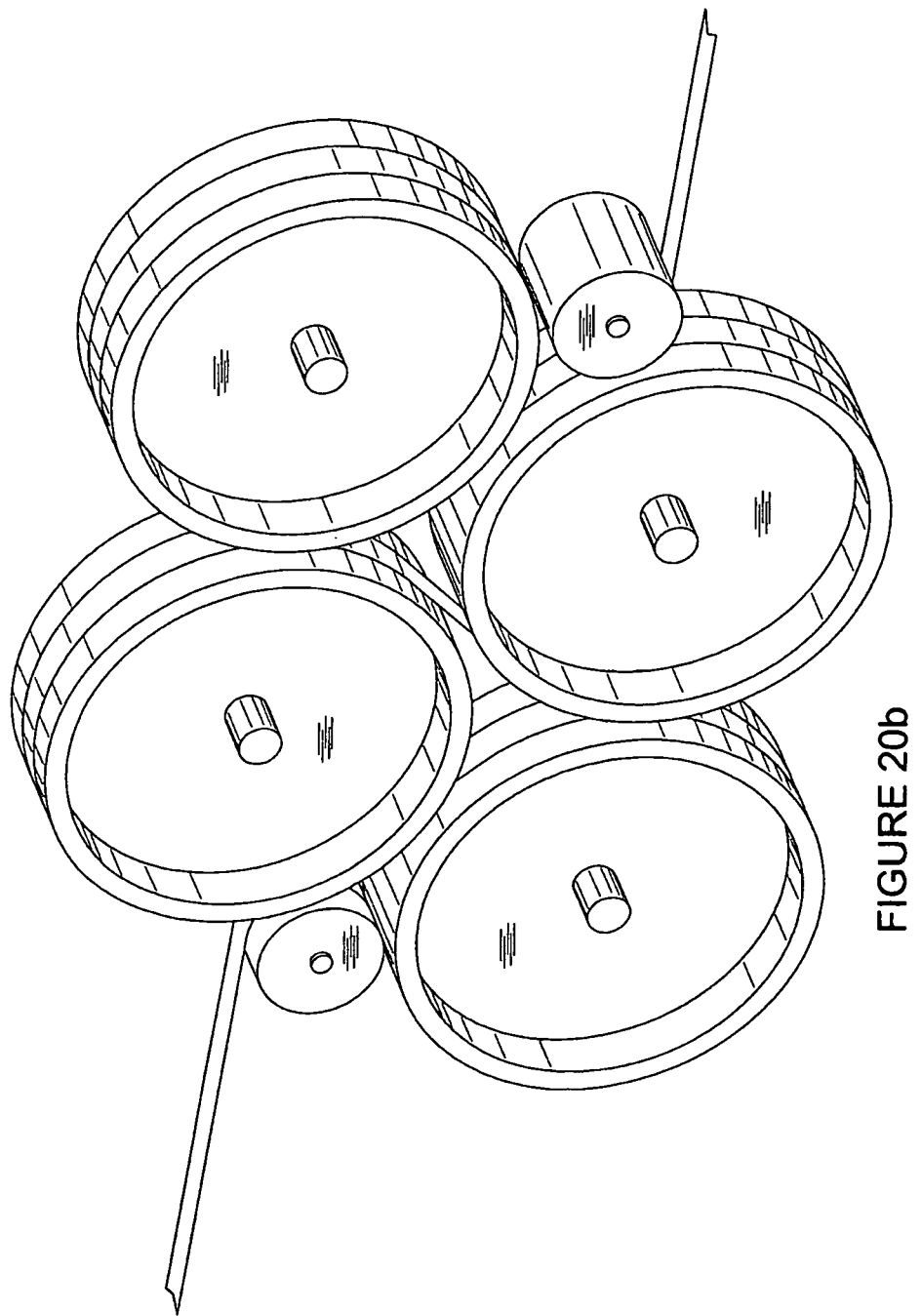

FIGS. 19a/19b and 20a/20b show examples of a static friction capstan drive used for adding or subtracting a tensile stress on a forwarded amorphous alloy ribbon having a given tensile stress. The capstan wheel is made of aluminum and its outer periphery is covered with rubber to increase the coefficient of static friction. Two rollers are placed side by side near the outer periphery of the capstan wheel to guide the ribbon in and out of the wheel surface.

Figure 21:
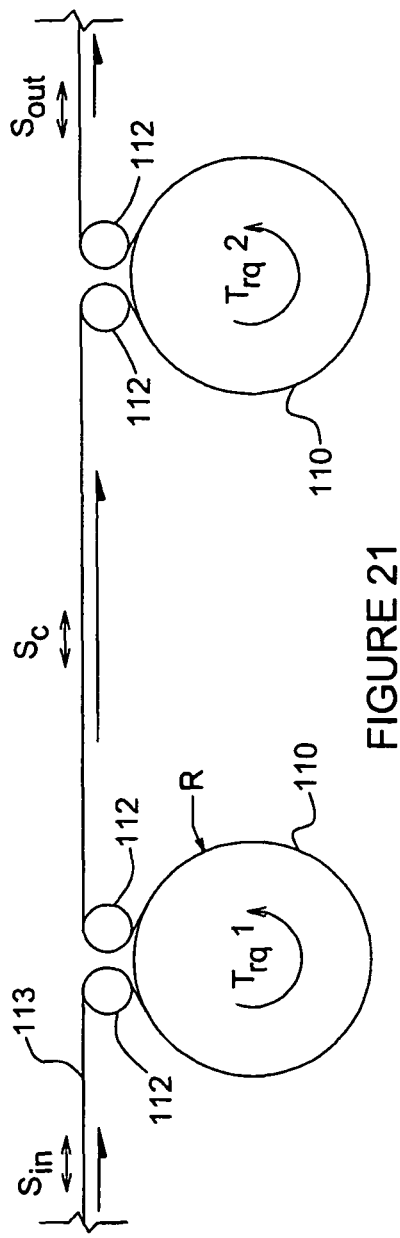
FIG. 21 is a schematic view of a ribbon tensioning apparatus with two capstan drives, according to a preferred embodiment of the present invention.
Figure 22:
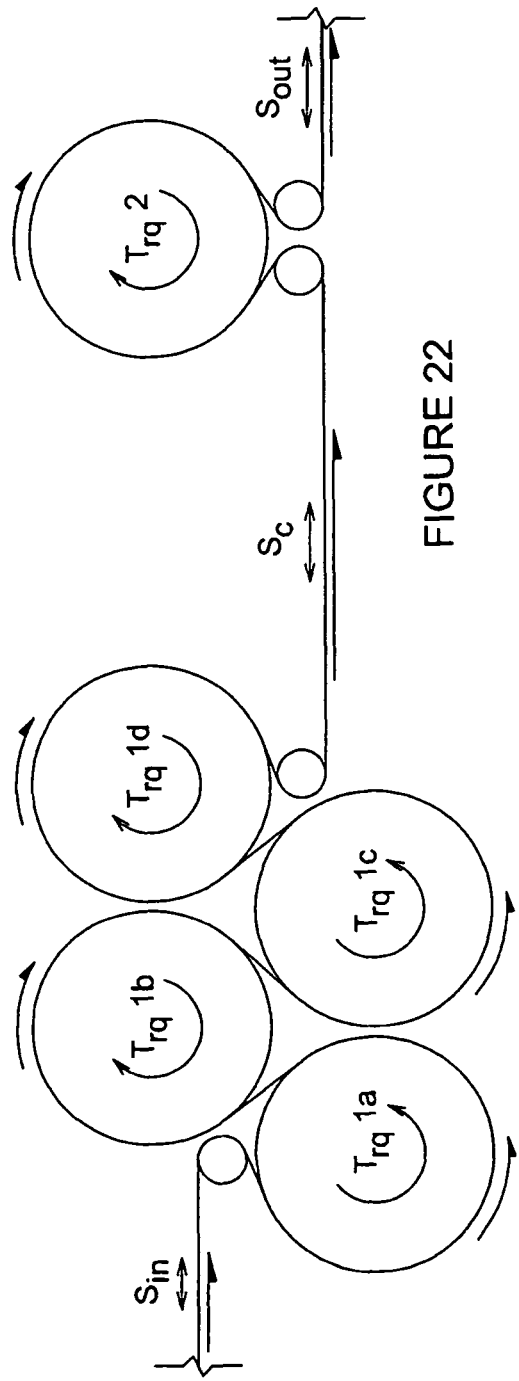
FIG. 22 is a schematic view of a ribbon tensioning apparatus with a plurality of capstan drives, according to another preferred embodiment of the present invention.

Referring to FIG. 21, there is shown a static capstan ribbon drive apparatus to impose a mechanical tensile stress $S_C$ between an incoming ribbon having an input tensile stress $S_{IN}$ and the outgoing ribbon having an output tensile stress $S_{OUT}$. The apparatus comprises two capstan static friction driving wheels 110 each provided with a pair of guiding rollers 112. Preferably, the outer surface periphery of each capstan wheel is covered with a high friction coefficient material such as silicon rubber. The incoming ribbon is guided by the guiding rollers 112 to wrap around each capstan wheel 110 over the maximum covering angle possible. Each capstan wheel is mounted on a shaft of a motor. To control $S_C$, the shaft torque Trq1 is adjusted to produce a tangential force at the radius r of the wheel that will be added on the incoming ribbon having an input tensile stress $S_{IN}$ in order to get the desired tensile stress $S_C$ once the ribbon exits from the capstan wheel. The tensile stress is changed again to an output value $S_{OUT}$ by passing over the second capstan wheel, in which the shaft torque is adjusted to Trq2. For example, to increase the tensile stress on a ribbon between the two capstan wheels, a positive counter-clockwise Trq1 and a clockwise torque Trq2 is required. For ribbons travelling at high speeds, multiple capstan wheels are used as shown in FIG. 22. The ribbon travels in a snake path around the wheels, each driven by a fraction Trq1(a-d) of the total torque Trq1 in order to add the tensile stress in a series of smaller steps. Use of multiple capstan wheels for decreasing the tensile stress is not necessary as the ribbon can easily withstand a sudden step down in tensile stress. Referring back to FIG. 1 to 6, any of the rollers included in the in-line annealing apparatus can be provided with a shaft coupled directly or via a drive-belt to a motor to add or subtract a tensile stress on the guided ribbon. It has been found that the reduced viscosity at elevated temperature of an amorphous alloy ribbon significantly increases the friction coefficient with the roller surface it is in contact with. Therefore, the tensile stress within the ribbon can be changed along the treatment path by applying a torque on rollers 1, 2 11 or 14 to improve annealing and the magnetic the properties of the alloy.

Figure 23:
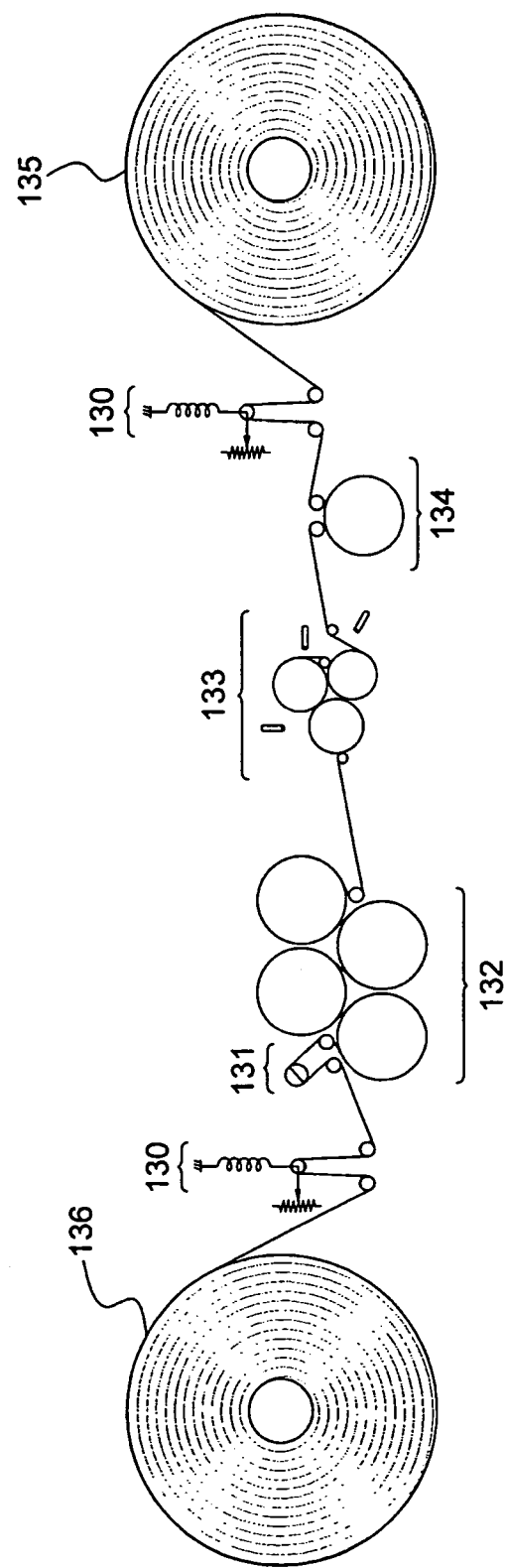
FIG. 23 is a schematic view of an in-line annealing apparatus comprising: a system for in-line annealing an amorphous alloy ribbon in a curved shape; a ribbon tensioning apparatus, a system to deliver a ribbon at a precise location on a guiding roller; a feeding reel; and a take-up mandrel according to a preferred embodiment of the present invention.

FIG. 23 discloses an apparatus to continuously in-line anneal a ferromagnetic alloy ribbon unrolled from a reel 136 which will then be rolled up on a mandrel 135. The apparatus comprises: two tensioner rollers 130; an apparatus to laterally reposition an incoming ribbon 131; a first drag and tensioning system for a moving thin ribbon 132; an apparatus to in-line anneal a forwarding ribbon 133; a second drag and tensioning system for a moving thin ribbon 134; and a take up mandrel 135. A tensioner roller 130 is commonly used in the art for providing easier control on the tension of a ribbon unrolling from or rolling up on a large roll of ribbon. Preferably, the feeding rate of the ribbon within the apparatus is controlled by controlling the capstan wheel rotating speed in the drag and tensioning system 134.

Preferably, the in-line annealing process of FIG. 23 includes an automated ribbon switcher to provide uninterrupted forwarding of ribbon at the entry of the treatment process, and continuous rolling up onto take-up mandrels of outgoing treated ribbon. Continuous forwarding of ribbon can be provided by bringing a new reel of ribbon in rotation in proximity of the emptying reel, and by launching and welding the ribbon end of the new reel to the trailing end of the ribbon leaving the emptying reel. Continuous rolling up of outgoing treated ribbon can be provided by bringing a new mandrel in rotation in proximity of the filling mandrel, and by cutting the ribbon and fixing the incoming ribbon end to the new mandrel while the filled mandrel is moved away.

Figure 24:
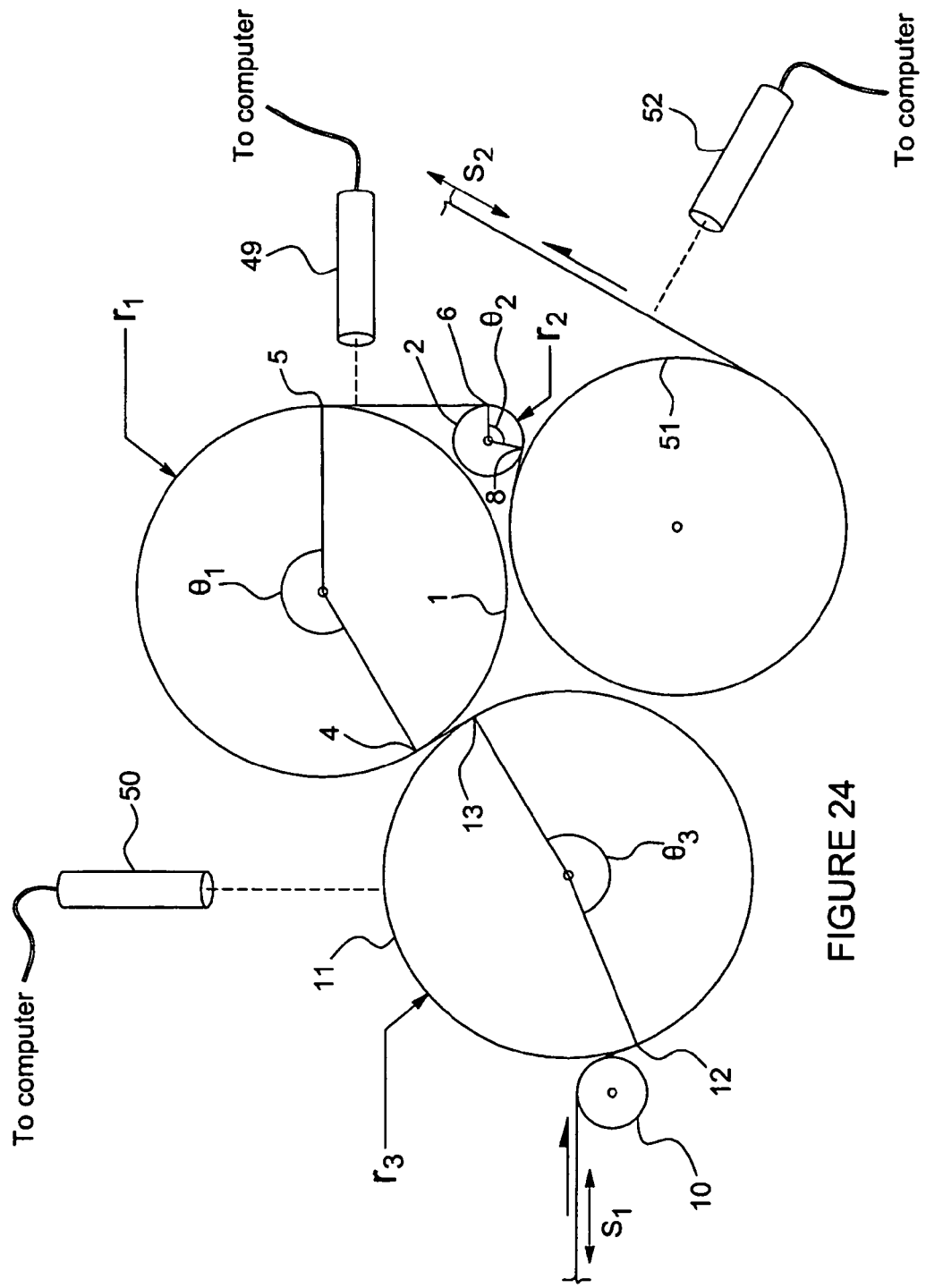
FIG. 24 is a schematic view of a system for a system for in-line annealing an amorphous alloy ribbon in a curved shape according to another preferred embodiment of the present invention.

A prototype was built according to the above-described in-line annealing process of FIG. 23 to process a one-inch wide amorphous alloy ribbon at a constant ribbon feeding rate. Referring now to FIG. 24, there is shown the detailed configuration of the in-line annealing setup 133. It comprises two identical hot rollers 1 and 11 built using wall thickness $e_1$ and $e_2$ of 100 mils and $e_3$ of 25 mils. The heat source two-ring assembly 19 is 1.10 inches wide and the roller outer radius is 3¾ inches. The slotted walls 20 are a few inches long on both sides of the two-ring assembly 19 and are supported on flanges and bearings. FIGS. 11, 12 and 13 are scaled perspective and cut views of the hot roller built according to the present invention. Both hot rollers are located in order to be separated by a gap smaller than 1/32 inch when hot. Each hot roller comprises an induction antenna connected to a HF power supply operating respectively at a frequency of 80 kHz and 150 kHz to avoid magnetic coupling interferences between proximity antennas. The hot roller 11 acting as a ribbon heating roller could also be disabled just by shutting off its corresponding HF power supply if no pre-heating was desired, in which case it was simply used as a guiding roller. The setup also comprises two cold rollers 2 and 51.

Cold roller 2 has a ⅝ inch radius and is used for first stage cooling. Cold roller 51 has a 3 inches radius and is used for the second stage cooling to bring the temperature towards or above the water temperature. The ribbon leaving roller 51 will be taken-up on a mandrel where it will slowly go back to normal room temperature. Both rollers were supplied with cooling water at 20 degrees Celsius. When snaking the ribbon around roller 1 and 2, the contact angle $\theta_1$ on the hot roller 1 is near 210 degrees and $\theta_2$ on cold roller 2 is near 120 degrees. A first infrared pyrometer 49 was installed to measure the ribbon temperature just after leaving roller 1. A second infrared pyrometer 50 was also installed to measure the temperature on the outer surface of the pre-heating roller 11. The pyrometers were connected to a computer used as a controller to adjust the antennas respective input power in order to read the desired temperature at each pyrometer. When pre-heating on roller 11 was activated, the roller temperature and the contact angle $\theta_3$ were adjusted by relocating a guide roller 10 around roller 11 until the rising temperature reached the treatment temperature a few angular degrees before reaching exit point 13. The treatment temperature was then maintained on hot roller 1. The treatment setup of FIG. 24 is intended to in-line anneal an iron-based amorphous ribbon in a curved shape having a natural bending radius in a rest position close to 3¼ inches after treatment. Such a bending radius is close to the average bending radius found in a circular core of a 25 kVA distribution transformer as disclosed in U.S. Pat. No. 5,566,443. The ribbon was unrolled at a tensile stress of a few MPa from a source reel and forwarded at different feeding rates snaking around four capstan wheel drives to increase the ribbon tensile stress to S1 before going through the treatment and then, after leaving treatment at the same tensile stress S2=S1, it went over one capstan wheel drive to reduce the ribbon tensile stress to a few MPa before being taken-up on a mandrel. All source reel mandrel, rolling mandrel and capstan wheels were coupled to motors controlled by a drive system and a main computer. The whole setup including motors and drives, except for the HF power supplies and computer, was mounted on a 4'×8' table, thus illustrating the compactness of the apparatus of the present invention. FIGS. 7a and 7b give the two temperature approximate profiles that the ribbon was subjected to while moving along its travelling path within the setup. In FIG. 7a, no pre-heating on roller 11 is performed. The ribbon is heated and treated only on hot roller 1. For a given ribbon tensile stress, the heating rising time interval is independent of the ribbon feeding rate. Therefore, for high feeding rates, the heating temperature rising time will start to dominate as the time period the ribbon rotates along the surface of hot roller 1 gets shorter (due to the increasing feeding rate) and therefore leaving less time for the treatment time interval on roller 1 to act. The ribbon will have an upper feeding rate limit where the treatment efficiency on roller 1 dramatically deteriorates. In FIG. 7b, the added pre-heating roller 11 eliminates the heating time interval from the time period the ribbon rotates along the surface of hot roller 1 which now serves exclusively for treatment. This setup will push-up the ribbon feeding rate limit for a treatment time on roller 1 identical to the situation in FIG. 7a if the initial cool down on roller 2 is sufficient to end the thermal treatment.

Series of treatments at applied different tensile stresses (S1=S2) ranging from 25 to 200 MPa and at different treatment temperatures above 400° C. and feeding rates ranging from 1 to 5 m/sec were conducted with the apparatus on the amorphous alloy ribbon Metglas 2605SA1 and 2605HB1 supplied by Hitachi-Metals. At 1 m/sec, the thermal treatment was lasting less than a second in the built apparatus. At 5 m/sec, the thermal treatment was lasting less than one tenth of a second. During treatment, it is desired to subject the ribbon to the smallest tensile stress which provides acceptable magnetic properties improvements, as further increasing the tensile stress will only increase the risk of rupturing the ribbon. The heating temperature rising rate starting at tensile stresses of 25 MPa and at the hot roller mentioned diameter was found to be greater than $10^{3\circ}$ C./sec, above $10^{4\circ}$ C./sec at about 75 to 125 MPa, therefore showing the high heat transfer capacity of the pressure static contact of the thin ribbon on the hot roller. For the first cooling stage, the temperature falling rate was found to be greater than $10^{4\circ}$ C./sec and close to $10^{5\circ}$ C./sec on cold roller 2. Following the treatment, the natural bending radius in a rest position was measured. Then, approximately 1 kg of the treated material was rolled at a chosen tensile stress on a stainless steel hub having an outer radius of 2.9 inches. With the amount of rolled up material, the final circular core had a mean radius at about 3¼ inches, which is close to the radius of roller 1 in the apparatus of FIG. 24. The rolled up ribbon was then placed in a circular shell and two copper wires were coiled around the shell to form a drive and a sense coil. The shell served as a support frame for the coils to avoid any outside stress to be applied onto the core. The drive and sense coil were then connected to a Walker Scientific AMH-25 instrument which serves to characterize the magnetic properties of coiled ferromagnetic cores. Before performing a measurement, parameters related to the circular core net cross sectional area and mean path length, the drive and sense coil respective turns and the material density, were entered in the instrument software. The sample was then magnetized with a sinusoidal magnetic induction waveform at a frequency of 60 Hz. From the recorded hysteresis loop, the following parameters were computed: the material core loss; the exciting power; and the peak magnetic field, all at specific magnetic induction levels and, the $B_{80}$ and $B_{80}/B_{sat}$ ratio were noted. Significant effects of the thermal treatments on the amorphous alloys were observed at treatment temperatures above 425° C.

For the Metglas 2605SA1 material, good results were obtained at treatment temperatures above 425° C., more preferably above 450° C., more preferably at about 480° C., and increasing with ribbon feeding rate. Going beyond this temperature until onset crystallization was reached and at the corresponding feeding rate did not provide further significant improvements to the magnetic properties of the alloy. It rather unnecessarily prolonged structural relaxation, which was detrimental to the ductility of the ribbon. An efficient induced magnetic anisotropy was obtained at tensile stresses between 25 and 200 MPa, preferably between 75 and 125 MPa.

For the Metglas 2605HB1 material, an efficient induced magnetic anisotropy was obtained at tensile stresses between 25 and 200 MPa, preferably between 50 and 100 MPa. Low core loss was obtained at treatments temperatures above 400° C., more preferably above 425° C., more preferably at about 455° C. Going beyond this temperature until onset crystallization was reached and at the corresponding feeding rate did not provide further significant improvements to the magnetic properties of the alloy. It rather unnecessarily prolonged structural relaxation, which was detrimental to the ductility of the ribbon. Also, core loss was tending to reduce as the ribbon feeding rate was increased along with the treatment temperature, showing the advantages of a higher and short lasting treatment temperature.

When onset crystallization was reached for both alloys, the degree of crystallization was dependant on the adjusted treatment temperature above onset crystallization thus, making possible to use the treatment process of the present invention to initiate and control the degree of crystallization in an amorphous alloy ribbon.

The following examples taken from the series of conducted treatments show the benefits of the present invention to improve magnetic properties of amorphous alloy ribbon such as the 2605SA1 and 2605HB1.

Example 1

Material: Metglas 2605SA1
Ribbon feeding rate: 2.0 meters/sec
Ribbon applied tensile stress: 100 MPa
No pre-heating
Treatment temperature: 480° C.
Natural bending radius after treatment: between 3.0" to 3.5"
Ribbon rolled up tensile stress: 5 MPa
Core weight: 1.04 kg (excluding hub)
Core inner diameter: 5.80 inches (excluding hub)
Core outer diameter: 6.83 inches
Core loss @ 1.3 Tesla, 60 Hz: 0.20 W/kg
Exciting power @ 1.3 Tesla, 60 Hz: 1.76 VA/kg
Peak magnetic field @ 1.3 Tesla, 60 Hz: 80 A/m
$B_{80}$: 1.3 Tesla
$B_{80}/B_{sat}$: 0.83

Example 2

Material: Metglas 2605SA1
Ribbon feeding rate: 5.0 meters/sec
Ribbon applied tensile stress: 100 MPa
Pre-heating angle $\theta_3$: near 180 degrees
Pre-heating roller temperature: 485° C.
Treatment temperature: 485° C.
Natural bending radius after treatment: between 3.0" to 3.5"
Ribbon rolled up tensile stress: 5 MPa
Core weight: 1.04 kg (excluding hub)
Core inner diameter: 5.80 inches (excluding hub)
Core outer diameter: 6.83 inches
Core loss @ 1.3 Tesla, 60 Hz: 0.20 W/kg
Exciting power @ 1.3 Tesla, 60 Hz: 2.37 VA/kg
Peak magnetic field @ 1.3 Tesla, 60 Hz: 97 A/m
$B_{80}$: 1.27 Tesla
$B_{80}/B_{sat}$: 0.81

Example 3

Material: Metglas 2605HB1
Ribbon feeding rate: 2.0 meters/sec
Ribbon treatment applied tensile stress: 75 MPa
Treatment temperature: 455° C.
No pre-heating
Natural bending radius after treatment: between 3.0" to 3.5"
Ribbon rolled up tensile stress: 5 MPa
Core weight: 1.04 kg (excluding hub)
Core inner diameter: 5.80 inches (excluding hub)
Core outer diameter: 6.83 inches
Core loss @ 1.3 Tesla, 60 Hz: 0.14 W/kg
Exciting power @ 1.3 Tesla, 60 Hz: 0.19 VA/kg Peak magnetic field @ 1.3 Tesla, 60 Hz: 6.6 A/m
Core loss @ 1.4 Tesla, 60 Hz: 0.18 W/kg
Exciting power @ 1.4 Tesla, 60 Hz: 0.35 VA/kg
Peak magnetic field @ 1.3 Tesla, 60 Hz: 16.2 Nm
Core loss @ 1.5 Tesla, 60 Hz: 0.22 W/kg
Exciting power @ 1.5 Tesla, 60 Hz: 1.56 VA/kg
Peak magnetic field @ 1.3 Tesla, 60 Hz: 80 A/m
$B_{80}$: 1.5 Tesla
$B_{80}/B_{sat\ t}$: 0.91

Example 4

Material: Metglas 2605HB1
Ribbon feeding rate: 5.0 meters/sec
Ribbon treatment applied tensile stress: 75 MPa
Treatment temperature: 460° C.
Pre-heating angle $\theta_3$: near 180 degrees
Pre-heating roller temperature: 460° C.
Natural bending radius after treatment: between 3.0" to 3.5"
Ribbon rolled up tensile stress: 5 MPa
Core weight: 1.04 kg
Core inner diameter: 5.80 inches (excluding hub)
Core outer diameter: 6.83 inches (excluding hub)
Core loss @ 1.3 Tesla, 60 Hz: 0.13 W/kg
Exciting power @ 1.3 Tesla, 60 Hz: 0.17 VA/kg
Peak magnetic field @ 1.3 Tesla, 60 Hz: 6 A/m
Core loss @ 1.4 Tesla, 60 Hz: 0.18 W/kg
Exciting power @ 1.4 Tesla, 60 Hz: 0.33 VA/kg
Peak magnetic field @ 1.4 Tesla, 60 Hz: 15 A/m
Core loss @ 1.5 Tesla, 60 Hz: 0.22 W/kg
Exciting power @ 1.5 Tesla, 60 Hz: 1.55 VA/kg
Peak magnetic field @ 1.5 Tesla, 60 Hz: 80 A/m
$B_{80}$: 1.5 Tesla
$B_{80}/B_{sat}$: 0.91

The core loss and exciting power measured on the above circular cores made with a rolled up ribbon in-line annealed at 5 m/sec are set forth in table 1 with those reported by the alloy manufacturer with field furnace annealing. Core loss for field furnace annealed 60 g SA1 and HB1 toroidal samples was reported in a table by the alloy manufacturer in an article entitled "Advances in Amorphous and Nanocrystalline Magnetic Materials", by Ryusuke Hasegawa in Journal of Magnetism and Magentic Materials, 2006, vol. 304, 187-191, Table 2. Exciting powers for furnace annealed rectangular-wound-cut cores weighting 73 kg for SA1 and 75 kg for HB1 samples were deduced from plotted curves traced by the alloy manufacturer in an article entitled "Audible Noise From Amorphous Metal and Silicon Steel-Based Transformer Core", by Daichi Azuma and Ryusuke Hasegawa in IEEE Transactions on Magnetics, vol. 44, no. 11, 4104-4106, FIGS. 2 and 4. By comparison, rolling-up-after-annealing cores produced with the present invention using Metglas 2605SA1 and 2605HB1 amorphous alloys are showing significant lower core loss, especially for 2605HB1. Exciting power is lower up to 1.4 Tesla but higher at 1.5 Tesla. The $B_{80}/B_{sat}$ ratio remains higher for furnace annealed cores compared to the present roll of in-line annealed ribbon due to introduction of some allowed stresses in the roll.

The examples disclosed above show the efficiency of the method and apparatus of the present invention to in-line anneal an iron-based amorphous in a post-treatment state which is usable for making rolling-up-after-annealing cores having: reduced core loss compared to conventionally field furnace annealed cores; low exciting power; a $B_{80}$ greater than about 1.3 Tesla; and a $B_{80}/B_{sat}$ greater than 0.80. The 2605HB1 alloy has an even better $B_{80}/B_{sat}$ ratio which is greater than 0.90. As it can be observed, the optimal treatment temperature differs for the 2605SA1 and 2605HB1 at equivalent ribbon feeding rates. This difference is linked to the alloy composition. The optimal setting of the treatment temperature in the present invention is therefore dependant on the alloy composition.

TABLE 1

|  | B = 1.3T 60 Hz | | B = 1.4T 60 Hz | | B = 1.5T 60 Hz | |
| --- | --- | --- | --- | --- | --- | --- |
|  | W/kg | VA/kg | W/kg | VA/kg | W/kg | VA/kg |
| 2605SA1 Furnace annealed | 0.27 | ~0.4 |  |  |  |  |
| 2605SA1 present invention | 0.20 | 2.37 |  |  |  |  |
| 2605HB1 Furnace annealed | 0.24 | ≅0.4 | 0.29 | ≅0.5 | 0.38 | ≅1.0 |
| 2605HB1 present invention | 0.13 | 0.17 | 0.18 | 0.33 | 0.22 | 1.55 |

Examples shown above were conducted on a test bench where the ribbon feeding rate was limited by some of its mechanical and electrical elements rather than by the geometric configuration of the hot and cold rollers. With the high cooling rate obtained in the present invention on cold roller 2, in-line annealing a ribbon at feeding rates up to 20 m/sec is expected with the above test bench by adding a second hot roller 11 and a second cold roller 51, if required. Also, an apparatus to in-line anneal a ribbon for larger circular cores will require scaled-up rollers. As the annealing treatment is mainly a function of temperature and time, a scaled-up design will allow a proportional ribbon feeding rate increase. For example: if a similar setup as shown in FIG. 24 was used for in-line annealing a ribbon in a curved shape having twice the final radius, than the ribbon feeding rate could go up as high as 40 m/sec. Therefore, the apparatus of the present invention can be efficiently used for massively in-line annealing an amorphous alloy ribbon in a curved shape. As the casting process for making an amorphous alloy is performed at a speed near 30 m/sec, adding an in-line annealing unit at the output of the casting line could be foreseen.

In the present invention, the ribbon is continuously in-line annealed at a high feeding rate with an impulse heat treatment which limits the progression of structural relaxation and therefore has a different impact on the ribbon embrittlement compared to conventional field furnace annealing. For ribbons that are continuously in-line annealed with the apparatus of the present invention, once the ribbon exits the treatment, it must be handleable in order to roll up the material on mandrels, and it also needs to be cuttable in order to allow easy switching of the rolling up ribbon from a filled mandrel to an new mandrel, or to continuously roll up ribbon to form cores in series. Any loss of ductility following the annealing treatment of iron-based amorphous alloy ribbons will increase the potential event of a ribbon break, which will lower the yield in the production of annealed ribbon reels or cores, and cause an increase of cost. This yield will reduce further if the ribbon is moving under a significant amount of applied tensile stress.

Amorphous iron-based alloy ribbons, which normally become brittle when annealed in a furnace and that have been annealed with the apparatus of the present invention, show good ductility characteristics. To best qualify the degree of ductility of the ribbons annealed with the apparatus of the present invention, three methods are used.

Ductility is first estimated by performing a bending fracture strain test. The ribbon is bent once over 180 degrees by being squeezed progressively between two parallel plates to measure the gap distance (ribbon bending diameter) at which a visible sudden rupture through the ribbon layer is occurring. The bending fracture strain is expressed by $\epsilon_f$ wherein $\epsilon_f = t/(D-t)$, t is the ribbon thickness and D is the bending diameter of the fractured ribbon. One must also take into account the type of fracture occurring at the bending radius as an additional indicator of the ductility. A fracture can be the occurrence of a local rupture appearing somewhere along the axial bending length or, a sudden ribbon complete rupture. For a same fractured bending diameter, a ribbon rupturing completely is considered more brittle than one rupturing partially. The bending side also influences the bending fracture strain diameter. A brittle ribbon having a natural bending curve in a rest position will be more prone to fracture when bent on the opposite side of its natural curved radius as the bending stress is more intense.

Ductility is also estimated with a shear cutting test. The ductility can be expressed with the ability for the ribbon to be sheared cut in a straight line that follows the cutting blades. A good ductile ribbon will smoothly be cut along the cutting line where both shear blade edges meet. A slightly brittle ribbon will partially rupture sideways at one or several places along the edge of the cutting line. However a very brittle ribbon will suddenly and completely rupture.

Ductility is also estimated with a tearing test. Ductility can be expressed with the ability for the ribbon to be torn apart like doing so with a paper sheet. A good ductile ribbon will smoothly be torn apart from one edge to the other, while a more brittle ribbon would be subject to sudden partial ruptures over a short distance. For a significantly brittle ribbon, an immediate and complete rupture apart will occur.

A "completely ductile" alloy ribbon according to the present invention will never rupture in all three performed tests as opposed to a very brittle alloy ribbon which will always completely and suddenly break.

Before an iron-based amorphous alloy ribbon was annealed with the apparatus of the present invention, a series of as-cast samples were submitted to each of the three tests to ensure that they were completely ductile. After the annealing treatment, a long segment of ribbon was sampled and was tested to estimate its ductility. The following tables give the results for the series of three ductile tests that were performed at normal room temperature on annealed ribbon segments sampled from each run of examples 1 to 4. Each ductility test was done 10 times. For each test, the following expressions are used to describe the ribbon physical behavior under test. The bending fracture strain test is expressed by the $\epsilon_f$ interval and also includes the type of fracture observed: foldable ($\epsilon_f=1$ with no rupture); partial rupture; and not complete rupture. The shear cut test is expressed in terms of: cuttable (smooth progressive cut with no rupture); partial rupture; and complete rupture. Lastly, the tear test result is expressed in terms of: tearable (smooth progressive tear with no rupture); partial rupture; and complete rupture.

TABLE 2

Bending fracture strain test results - opposite side to natural bending curve

| Example | $\epsilon_f$ | Foldable | Partial rupture | Complete rupture |
|---|---|---|---|---|
| 1 | .01-1 | 8 | 2 | 0 |
| 2 | .01-1 | 8 | 2 | 0 |

TABLE 2-continued

Bending fracture strain test results - opposite side to natural bending curve

| Example | $\epsilon_f$ | Foldable | Partial rupture | Complete rupture |
|---|---|---|---|---|
| 3 | .01-1 | 4 | 6 | 0 |
| 4 | .01-1 | 4 | 6 | 0 |

TABLE 3

Bending fracture strain test results - same side to natural bending curve

| Example | $\epsilon_f$ | Foldable | Partial rupture | Complete rupture |
|---|---|---|---|---|
| 1 | 1 | 10 | 0 | 0 |
| 2 | 1 | 10 | 0 | 0 |
| 3 | 1 | 10 | 0 | 0 |
| 4 | 1 | 10 | 0 | 0 |

TABLE 4

Shear cutting test results

| Example | Cuttable | Partial rupture | Complete rupture |
|---|---|---|---|
| 1 | 10 | 0 | 0 |
| 2 | 10 | 0 | 0 |
| 3 | 10 | 0 | 0 |
| 4 | 10 | 0 | 0 |

TABLE 5

Tearing test results

| Example | Tearable | Partial rupture | Complete rupture |
|---|---|---|---|
| 1 | 2 | 5 | 3 |
| 2 | 2 | 7 | 1 |
| 3 | 5 | 5 | 0 |
| 4 | 8 | 2 | 0 |

All iron-based amorphous alloy ribbons that were curved annealed with the in-line annealing apparatus of the present invention and disclosed in the cited examples show good ductility. According to the present invention, a curved annealed ribbon is considered "ductile" if it is cuttable and foldable on the same side of the natural bending curve. The curved annealed iron-based amorphous alloy ribbons in-line annealed with the apparatus of the present invention are ductile at normal room temperature. The annealed ribbon coming out of the in-line annealing apparatus can be continuously rolled up on a mandrel to make reels of ribbon or cores and switch from reels of ribbon or cores at very high production yields. The in-line annealing apparatus of the present invention can be used to massively produce reels of annealed iron-based amorphous alloy ribbons that show excellent magnetic properties and which are acceptable for making cores for distribution transformers, HIF, pulse power cores, and other elements.

Figure 8:
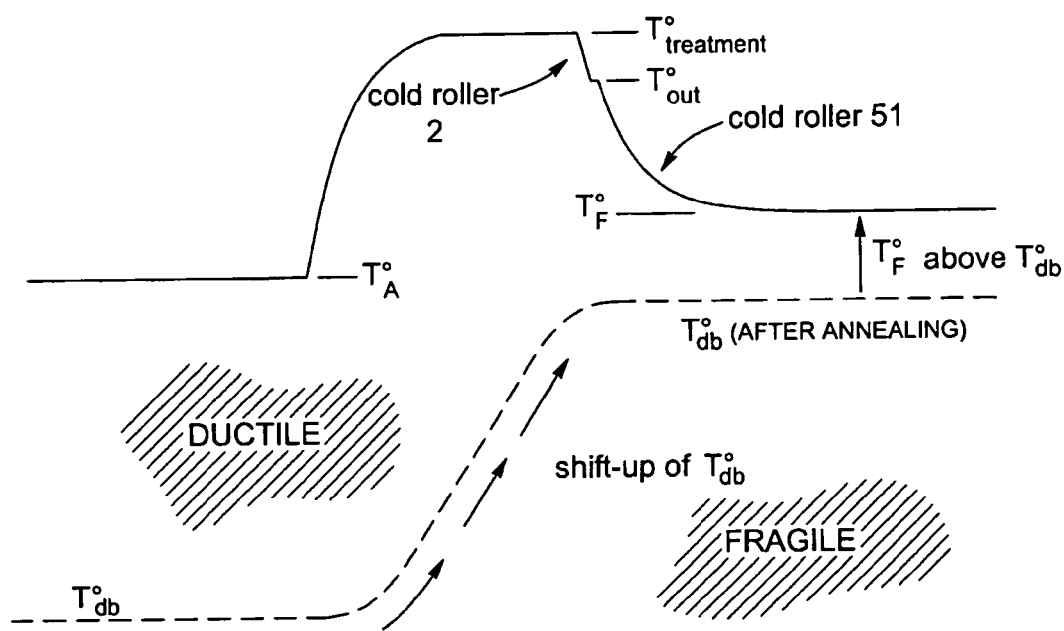
FIG. 8 is a graph showing the temperature profile of the ribbon while moving along a travelling path within the system shown in FIG. 24 when cooling the ribbon to a temperature above the ductile to brittle threshold.
Figure 9:
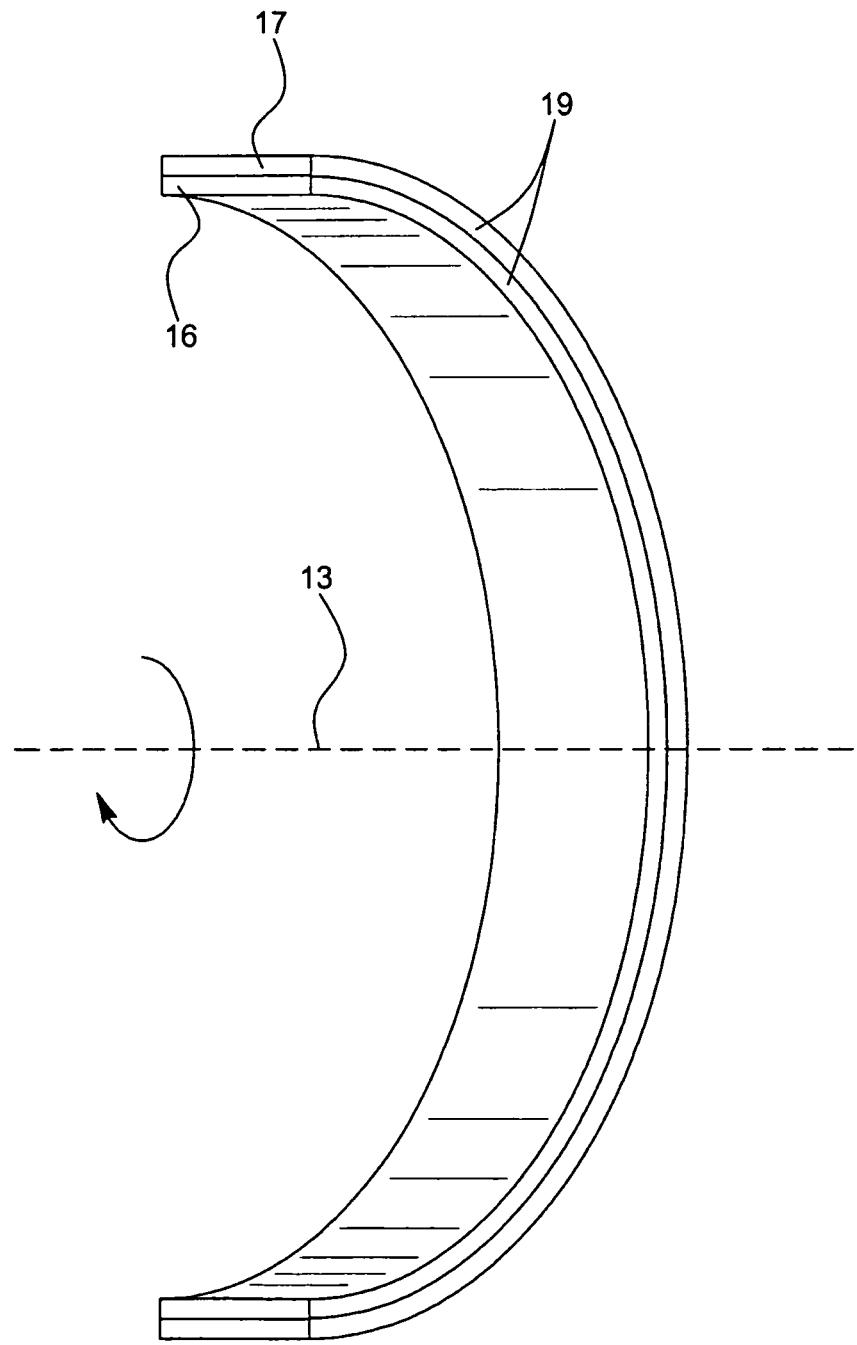
FIG. 9 is a perspective view of inner and outer cladding rings of a hot roller according to a preferred embodiment of the present invention.
Figure 10:
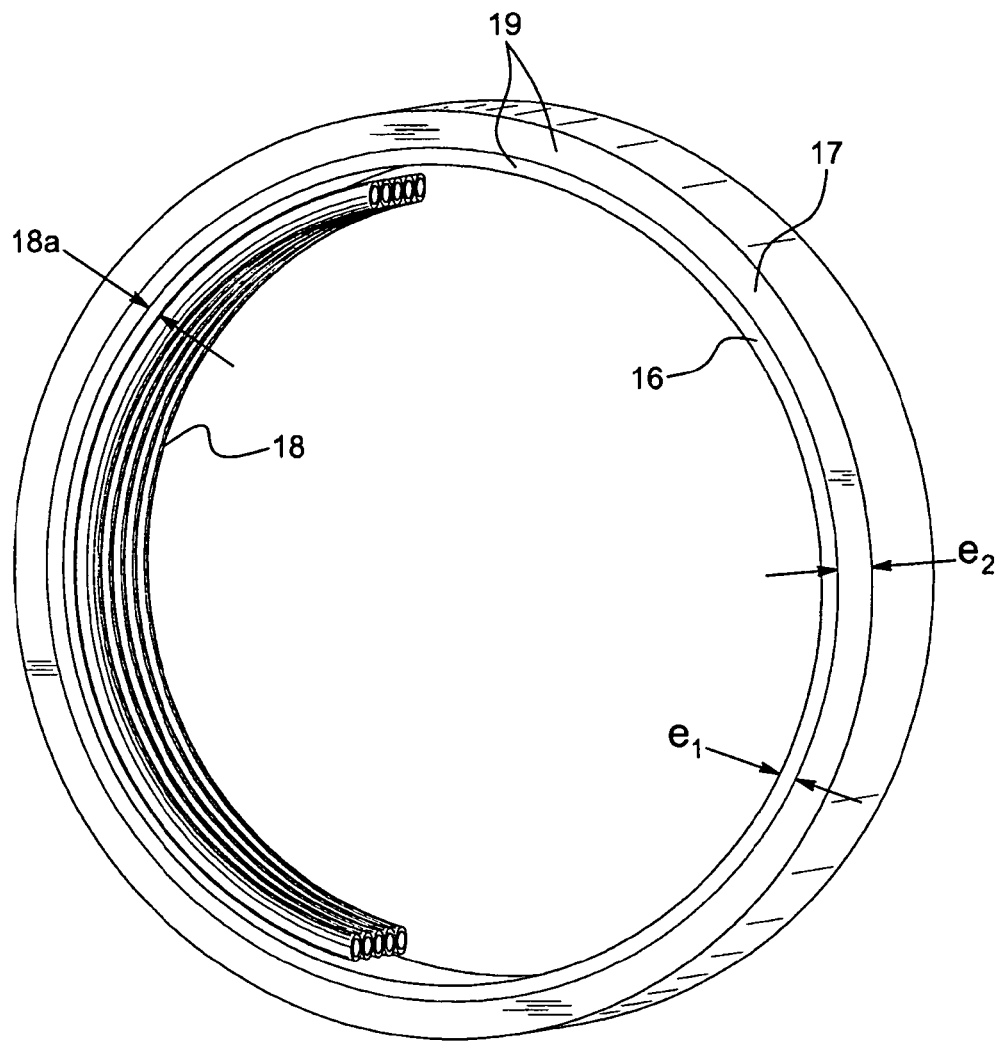
FIG. 10 is a perspective view of inner and outer cladding rings of a hot roller comprising an induction antenna according to a preferred embodiment of the present invention.

Although the treated ribbons in the cited examples are "ductile", they are not "completely ductile" compared to as-cast ribbons. This loss of ductility still represents a small risk of breaking the ribbon after cool down during in-line annealing and after treatment during handling. Based on the fact that most iron-based amorphous alloy ribbons show a ductile-to-brittle transition at a temperature ($T_{db}°$) below which they are brittle and above which they are ductile, the iron-based amorphous alloy ribbons that were annealed with the annealing apparatus of the present invention and disclosed in the cited examples have a ductility level which would correspond to a $T_{db}°$ which has shift-up just below normal room temperature as shown in FIG. 8. Therefore, increasing the temperature of the alloy should render the ribbon more ductile. The ductility of ribbons annealed with the apparatus of the present invention has been found to have a great dependency on temperature. The annealed ribbons were submerged in an oil bath heated at different temperatures and were submitted again to the same ductility tests. The number of observed ruptures significantly started to drop for a few degrees above the normal room temperature. Above 50° C., the numbers of ruptures were down by half. The sensitivity to the temperature was so high that for temperatures at about 100° C., the 2605SA1 alloy ribbons became completely ductile according to the present performed ductile tests. For the 2605HB1, complete ductility was reached at about 80 C. Therefore, the handling, rolling up and cutting of iron-based amorphous alloy ribbons that have been in-line annealed with the apparatus of the present invention can be done at optimal ductility just by handling the ribbon above a temperature a few tens of degrees over normal room temperature, preferably above 80° C. for 2605HB1 and above 100° C. for 2605SA1. As most dielectric materials in transformers are irreversibly deteriorated at temperatures above 150 C, rolling up of the ribbon to form a core around the coils of the transformer could be achieved at a temperature up to 150 C to benefit from a maximum gain in ductility.

In the apparatus shown in FIG. 24, a third infrared sensor 52 has been added to measure the ribbon temperature that exits the treatment apparatus. The flow of coolant through cold roller 51 can be controlled in order for the ribbon to exit the treatment apparatus at a temperature $T_{out}°$ greater than normal room temperature, preferably greater than 80° C. for 2605HB1 and above 100° C. for 2605SA1, so that the ribbon remains optimally ductile for the following post handling operations, as shown in FIG. 8. Since complete ductility is reached at a temperature dependant on the alloy composition, the handling temperature will be set accordingly. To maintain the ribbon temperature during-post handling, any cutting tool or guiding surfaces need to be kept near the same temperature. Once taken-up on a mandrel, the ribbon was allowed to gradually cool down to normal room temperature without any further deterioration of the properties. By keeping the alloy completely ductile all along the forwarded treatment path, risk of a ribbon breakage during treatment is reduced to minimum and production yield is therefore maximized.

The flat or curved annealed and cuttable amorphous ferromagnetic ribbon produced with the in-line annealing apparatus of the present invention applies to building of ferromagnetic cores for use in equipment such as distribution transformers, HIF, pulse power cores, and other elements. With the apparatus of the present invention, the in-line annealing of the amorphous alloy ribbon can be performed at such a high feeding rate that it makes—it more beneficial in term of economies of scale to locate the apparatus next to the amorphous alloy casting system at the alloy manufacturing plant. Because the in-line annealed ribbon remains ductile after treatment, stored ribbons in large reels around a mandrel at the casting plant can then be shipped to the transformer manufacturer using the same methods used for shipping as-cast ribbon. The received in-line annealed reels will then be unrolled by the transformer manufacturer to be rolled again onto a mandrel located around the coils of the transformer. This eliminates all necessary equipments, associated floor space and labour required for making conventional field furnace annealing rectangular-cut-cores and which is normally performed at the transformer manufacturing plant. As it is cuttable, the ribbon could also be used as a magnetic shielding foil for electronic devices, or for making magnetoimpedance sensors, or for making markers for article surveillance systems. The ribbon is flexible and can be punched into the desired shape. The form can either be circular at a given radius $r_a$, or flat, depending if the ribbon has been curved or flat annealed.

A flat annealed iron-based amorphous ferromagnetic alloy ribbon in-line annealed with the apparatus of the present invention can be used for producing stack cores. Reels containing flat cuttable annealed ribbon can be unrolled and cut or punched in segments having a predetermined length or outline. These segments are then stacked and grouped to form cores having a predetermined shape. Stacked cores can be used in the fabrication of transformers. However, amorphous alloy ribbons are very thin and therefore have no stiffness. To be more handleable, a group of segments can be stacked and bound with either an organic or inorganic binder to give a rigidity equivalent to a thick steel sheet. Since the performances of iron-based amorphous ferromagnetic alloys such as Metglas 2605SA1 and 2605HB1 are sensitive to external applied stresses, the binder, when cured, must not introduce significant stresses on the surfaces of the ribbons which would lead to a serious deterioration of magnetic performance. Furthermore, the coefficient of thermal expansion of the binder should match that of the ribbon to avoid the creation of stresses due to differential thermal expansion, which could also lead to serious deterioration of the magnetic performances. Also, a binder can be applied on a curved-in-line-annealed ribbon before it is to be rolled up to from a core to obtain a self consistent core.

A curved annealed ribbon in-line annealed with the apparatus of the present invention can be used for producing circular cores. During rolling up of the ribbon to form a core, a minimal tensile stress must be applied to properly roll up the ribbon. A high ribbon rolling up tensile stress improves the filling factor of the material in the core but introduces stresses that remain in the core once completely rolled up and which can seriously deteriorate the magnetic performances. Therefore, the rolling up tensile stress must be controlled to limit the residual stresses in the final formed core. Also, each rolled up layer of ribbon will have a final bending radius according to its own radial position within the core. There will be a bending stress in each rolled up layer and its intensity will depend on the curvature change imposed on the ribbon compared to the radius $r_a$ where maximum alleviated stresses occur. To minimize the curvature change, the inner to outer radius of the circular core will preferably be close to $r_a$. More preferably, the radius $r_a$ of the curved in-line annealed ribbon of the present invention will be situated between the inner radius and outer radius of the circular formed core. More preferably, $r_a$ will be closer to the outer radius of the circular formed core as the exciting magnetic field gets weaker close to the outer peripheral portion of the core thus, benefiting of a stronger field in the inner peripheral portion of the circular core for compensating the increased force field required to magnetize the slightly deformed ribbon in the inner region of the core. However, magnetic performance of circular cores having a very thick amount of rolled up ribbon can be improved by rolling up successive quantities of ribbons each annealed at a specific radius which increases from one quantity of ribbons to the next ($r_a1 < r_a2 < r_a3 \ldots$).

Part of the core loss produced in a stacked or rolled up ferromagnetic core under an applied AC magnetic field is caused by the induced currents flowing through the inter-laminar contacts. Increasing the frequency of the applied AC field will increase the inter-laminar voltages, which increase the inter-laminar currents and therefore increase the core loss. The inter-laminar voltages also increase with the width of the core. Attenuating these currents will greatly improve the magnetic performances of the core, especially at high frequency. To reduce these inter-laminar currents, it is necessary to increase the ribbon surface resistivity. With the in-line annealed amorphous alloy ribbon of the present invention, because it can be rolled-up-after-annealing, the surface of the ribbon can be coated either with an organic or inorganic insulating coating before it is stacked in a core. However, there is a drawback of coating the ribbon. It will affect the stacking factor of the core as the coating will occupy some space between each layer. Only one side coating is required to increase inter-laminar insulation. On a ribbon having a thickness at about 25 µm, the coating has to be very thin if one wants to keep a good stacking factor. For 60 Hz frequency operations, applying a very thin insulating coating (<1 µm) on the ribbon is enough to increase the inter-laminar electrical resistance and will therefore significantly improve the magnetic performances of the core, especially for wide cores. A slightly thicker insulating layer having a high dielectric strength may be required for providing proper insulation in a pulse power core such as required in a HIF accelerator. However, coating such a very thin insulating layer requires precise control of the coating process.

The E-coat process, also known as Electrocoat, electrophoretic paint, EDP or electrodeposited paint, consists of applying a voltage on the conductive material to be coated when it passes is an emulsion of organic polymers and de-ionized water. The voltage is applied between the conductive material and an auxiliary electrode submerged in the emulsion. Charged polymers within the emulsion will migrate electrophoretically to the target electrode of the opposite charge (the alloy ribbon), become insoluble, and form the coating. The thickness of the coating depends on the applied voltage or the submerged time. Such a coating process can be efficiently used to coat a very thin insulating layer on at least one side of the in-line annealed amorphous alloy ribbon of the present invention. A reel of ribbon is mounted on an insulated hub. The ribbon is then unrolled and plunged into an electrophoretic bath for a predetermined period of time and at a specific voltage to be coated with an organic polymer. The ribbon is then dried and rolled up again on an insulated take-up mandrel. The performances of amorphous ferromagnetic alloys being sensitive to external applied stresses, the coating must not introduce significant stresses on the surfaces of the ribbons, which would lead to a serious deterioration of magnetic performance. Furthermore, the coefficient of thermal expansion of the coating should match that of the ribbon to avoid the creation of stresses due to differential thermal expansion which could also lead to serious deterioration of magnetic performance.

Although preferred embodiments of the present invention have been described in detailed herein and illustrated in the accompanying drawings, it is to be understood that the invention is not limited to these precise embodiments and that various changes and modifications may be effected therein without departing from the scope or spirit of the present invention.

The invention claimed is:

1. A system for treating an amorphous alloy ribbon, comprising:
    a first motor for feeding forward the amorphous alloy ribbon, a second motor for tensioning the amorphous alloy ribbon, and rollers for guiding the amorphous alloy ribbon along a path at a preset feeding rate;
    a heating system for heating the amorphous alloy ribbon at a point along said path at a rate greater than $10^{3\circ}$ C./sec to a temperature to initiate a thermal treatment;
    a first cooling system for cooling the amorphous alloy ribbon at a rate greater than $10^{3\circ}$ C./sec until the thermal treatment ends;
    at least two ribbon bending rollers located on said path for bending the ribbon into a series of different configurations while being forwarded along said path during said thermal treatment until the amorphous alloy ribbon adopts a specific shape at rest after said thermal treatment; and
    a second cooling system for cooling the amorphous alloy ribbon at a rate to preserve said specific shape, after said thermal treatment.

2. The system according to claim 1, wherein the preset feeding rate is greater than 1 m/sec.

3. The system according to claim 1, wherein the heating system comprises at least one first cylinder in contact with the amorphous alloy ribbon, said at least one first cylinder having a first cylindrical surface located along said path, the system further comprising a first tensioning apparatus for tensioning the amorphous alloy ribbon with respect to the first cylindrical surface to obtain a first static contact between the amorphous alloy ribbon and the first cylindrical surface, the first static contact stretching over a first contact angle around the first cylindrical surface, a temperature of said first cylindrical surface being maintained at a temperature greater or equal to said temperature to initiate the thermal treatment, the first cooling system comprises at least one second cylinder in contact with the amorphous alloy ribbon, said at least one second cylinder having a second cylindrical surface located along said path, the system further comprising a second tensioning apparatus for tensioning the amorphous alloy ribbon with respect to the second cylindrical surface to obtain a second static contact between the amorphous alloy ribbon and the second cylindrical surface, the second static contact stretching over a second contact angle around the second cylindrical surface, a temperature of said second cylindrical surface being maintained at a temperature lower than said temperature to initiate the thermal treatment.

4. The system according to claim 1, further comprising a tensioning apparatus for increasing or reducing a tension in the amorphous alloy ribbon along the path, said tensioning apparatus comprising:
    a third motor having a shaft;
    a capstan wheel coupled to the shaft of the third motor, said capstan wheel having a surface making a static contact with the ribbon over an angle, the surface having a static friction coefficient with respect to the ribbon; and
    a controller for controlling torque of said shaft to increase or reduce a tensile stress in the amorphous ribbon.

5. The system according to claim 1, further comprising a guiding apparatus for delivering the ribbon to a target position on a guide roller mounted on a structure, said guiding apparatus comprising:

a body;
a pivoting roller mounted on the body, having a flat peripheral surface lined with lateral guides for supporting and guiding the ribbon, the pivoting roller having a receiving section for receiving the ribbon and a delivering section
a pivot for pivotably mounting the body to the structure, the pivot having a pivot axis tangentially aligned with the delivering section and located at midpoint between the lateral guides of the pivoting roller.

6. The system according to claim 3, wherein said at least two ribbon bending rollers comprise a cylinder of said at least one cylinder of the heating system, and a cylinder of said at least one second cylinder of the first cooling system, for bending the ribbon into said series of different configurations.

* * * * *